US008626685B2

(12) United States Patent
Kobayashi

(10) Patent No.: US 8,626,685 B2
(45) Date of Patent: Jan. 7, 2014

(54) INFORMATION PROCESSSING APPARATUS, INFORMATION PROCESSING METHOD, AND PROGRAM

(75) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 662 days.

(21) Appl. No.: 12/497,813

(22) Filed: Jul. 6, 2009

(65) Prior Publication Data
US 2010/0010947 A1 Jan. 14, 2010

(30) Foreign Application Priority Data

Jul. 14, 2008 (JP) .............................. P2008-183019

(51) Int. Cl.
G06E 1/00 (2006.01)
G06E 3/00 (2006.01)
G06F 15/18 (2006.01)
G06G 7/00 (2006.01)

(52) U.S. Cl.
USPC ................. 706/19; 704/207; 706/45; 706/22; 706/15

(58) Field of Classification Search
None
See application file for complete search history.

(56) References Cited

U.S. PATENT DOCUMENTS

2002/0078429 A1* 6/2002 Yoshida .......................... 716/21
2005/0007159 A1* 1/2005 Kondo et al. .................. 327/100
2005/0246165 A1* 11/2005 Pettinelli et al. .............. 704/207

FOREIGN PATENT DOCUMENTS

JP 2007-122186 5/2007
WO WO 2007/049641 A1 5/2007

OTHER PUBLICATIONS

"A New Facial Feature Extraction Method Based on Linear Combination Model" Yongli Hu, Baocai Yin, Dehui Kong Multimedia and Intelligent Software Technology Lab Beijing University of Technology, Beijing, China 100022 © 2003 IEEE.*
Notification of Reasons for Refusal of Japanese Patent Application No. JP 2008-183019, (May 25, 2010).

* cited by examiner

Primary Examiner — Kakali Chaki
Assistant Examiner — Luis Sitiriche
(74) Attorney, Agent, or Firm — Finnegan, Henderson, Farabow, Garrett & Dunner, L.L.P.

(57) ABSTRACT

An information processing apparatus for configuring algorithms is disclosed. The information processing apparatus includes an algorithm configuring section that configures an algorithm for performing discrimination on an input signal by using a genetic search technique. The algorithm includes feature extraction expressions and an information estimation expression represented by a combination of the feature extraction expressions. The information processing apparatus also includes a tradeoff analyzing section that determines pareto optimal solutions by optimizing the algorithm with respect to evaluation indices by performing tradeoff analysis on the basis of the algorithm. In addition, the information processing apparatus includes a storage for storing the algorithm.

16 Claims, 58 Drawing Sheets

FIG. 4

EXAMPLE OF ABNORMAL-SOUND DISCRIMINATION EXPRESSION:

U = "OUTPUT VALUE OF FEATURE EXTRACTION EXPRESSION 1" × 0.5
  + "OUTPUT VALUE OF FEATURE EXTRACTION EXPRESSION 2" × 0.7
  + "OUTPUT VALUE OF FEATURE EXTRACTION EXPRESSION 5" × 0.1
  + "OUTPUT VALUE OF FEATURE EXTRACTION EXPRESSION 15" × −0.4

$\begin{cases} U > Th: \text{ABNORMAL SOUND} \\ U \leq Th: \text{NORMAL SOUND} \end{cases}$

FIG. 7

FEATURE EXTRACTION EXPRESSION 1
- Wav,16#DownSampling_To;27.999268,16#NormalizeEach,16#Skewness
- Wav,16#DownSampling_To;62.265602,16#DownSampling_To;57.964432,16#StdDev
- Wav,16#HPF_1;0.215608,16#LogAxisOctH;9.528571,16#Order,16#Entropy
- Wav,16#Histogram;33.312595,16#StdDev
- Wav,16#Histogram;39.602398,16#Skewness
- Wav,16#Histogram;46.562855,16#Kurtosis
- Wav,16#IndexLR
- Wav,16#IndexLR0
- Wav,16#Integrate,16#Entropy
- Wav,16#Kurtosis
- Wav,16#LPF_1;0.451690,16#Order,Normalize,16#IndexLR0
- Wav,16#MA;1.444906,16#LogAxis;19.978977,0.260649,16#UVariance
- Wav,16#MMean
- Wav,16#Mean
- Wav,16#Min
- Wav,16#NormalizeEach,16#Window_Hunning,16#MA;1.476930,16#Skewness
- Wav,16#StandardizeEach,16#LogAxisOctH;2.622135,16#Skewness
- Wav,16#Window_Gauss;0.354825;0.112571,Normalize,16#MaxIndex
- Wav,Abs,16#DownSampling_To;43.249527,16#Extract1;0.254782
- Wav,NormalizeAvg,16#Max FEATURE EXTRACTION EXPRESSION m
- Wav,Sign,16#MaxIndex

FIG. 12

| OPERATOR | PROCESSING DESCRIPTION | OPERATOR | PROCESSING DESCRIPTION |
|---|---|---|---|
| Normalize | NORMALIZATION TO 0 – 1 | MMean | HISTOGRAM MEAN |
| NormalizeAvg | NORMALIZATION TO AVERAGE 1 | MStdDev | HISTOGRAM DEVIATION |
| Log | LOG | Entropy | ENTROPY |
| Sqr | SQUARE | IndexLR | LINEAR APPROXIMATION GRADIENT |
| Sqrt | SQUARE ROOT | IndexLR0 | LINEAR APPROXIMATION INTERCEPT |
| Abs | ABSOLUTE VALUE | Continuation | THE NUMBER OF CONTINUING VALUES |
| Sign | SIGN | UVariance | UNBIASED VARIANCE |
| Add:0 To 1 | ADDITION | MaxIndex | MAXIMUM VALUE INDEX |
| Multiply:0 To 10 | MULTIPLICATION | Max | MAXIMUM VALUE |
| NormalizeEach | NORMALIZE FOR EACH AXIS | Min | MINIMUM VALUE |
| NormalizeEachAvg | NORMALIZE FOR EACH AXIS | MaximumNum | THE NUMBER OF MAXIMUM VALUES |
| NormalizeEachZ | Z CONVERSION | MinimumNum | THE NUMBER OF MINIMUM VALUES |
| Differential | DIFFERENTIATION | Difference:-1 To 1 | DIFFERENCE |
| DifferentialPeriodical | DIFFERENTIATION | FFT | FOURIER TRANSFORM |
| Integrate | INTEGRATION | Histogram:2 To 64 | HISTOGRAMS |
| LPF_1:0 To 1 | LOW PASS FILTER | DownSampling:2 To 64 | DOWN SAMPLING |
| HPF_1:0 To 1 | HI PASS FILTER | DownSamplingTo:0 To 1 | DOWN SAMPLING |
| MaximumPeriodical | MAXIMUM VALUE | LogAxis:2^64:0 To 1 | LOGGING OF AXIS |
| MinimumPeriodical | MINIMUM VALUE | LogAxisOctH:2 To 12 | LOGGING OF AXIS |
| MaximumOr0Periodical | 0 OTHER THAN MAXIMUM | Cut:0 To 1:0 To 1 | PARTIAL CUTOUT |
| MinimumOr0Periodical | 0 OTHER THAN MINIMUM | Split:2 To 64 | DATA SPLIT |
| MaximumMinusLR | MAXIMUM EMPHASIS | SplitTo:0 To 1 | DATA SPLIT |
| MinimumMinusLR | MINIMUM EMPHASIS | | |
| DCCut | OFFSET ELIMINATION | | |
| Order | ORDERING | | |
| Window_Hanning | HANNING WINDOW | | |
| Window_Gauss:0 To 1:0 To 1 | GAUSS WINDOW | | |
| MaxPosTo1 | 1 FOR ONLY MAXIMUM VALUE | | |
| TimeImpression_Attack:0 To 1 | ENVELOPE 1 | | |
| TimeImpression_Tone:0 To 1 | ENVELOPE 2 | | |
| Extract1:0 To 1 | EXTRACT ONE PIECE OF DATA | | |
| Mean | MEAN | | |
| StdDev | STANDARD DEVIATION | | |

EXAMPLE OF CROSSING:

FIG. 16

EXAMPLE OF MUTATION:

SELECTED FEATURE EXTRACTION EXPRESSION (MUTATION SOURCE)

Wav,T#LPF_1;0.3,T#IndexLR0

MUTATION EXAMPLE 1: OPERATOR DELETION

Wav,T#IndexLR0

MUTATION EXAMPLE 2: OPERATOR ADDITION

Wav,Sqr,T#LPF_1;0.3,T#IndexLR0

MUTATION EXAMPLE 3: PARAMETER CHANGE

Wav,T#LPF_1;0.7,T#IndexLR0

FIG. 21

| | FEATURE EXTRACTION EXPRESSION 1 | FEATURE EXTRACTION EXPRESSION 2 | FEATURE EXTRACTION EXPRESSION 3 | ... | FEATURE EXTRACTION EXPRESSION m |
|---|---|---|---|---|---|
| DATA $D_1$ | 0.08367706 | 45.22933745 | 0.203405953 | | 0.5 |
| DATA $D_2$ | 0.795004905 | 65.80991124 | 3.27691739 | | 0.5 |
| DATA $D_3$ | 0.980996159 | 94.08183404 | −8.47890872 | | 0.5 |
| ... | | | | | |
| DATA $D_n$ | 0.06041296 | 2.318206641 | −7.74197386 | | 0.5 |

FIG. 22

| | FEATURE EXTRACTION EXPRESSION 1 | FEATURE EXTRACTION EXPRESSION 2 | FEATURE EXTRACTION EXPRESSION 3 | ... | FEATURE EXTRACTION EXPRESSION m | LABEL |
|---|---|---|---|---|---|---|
| DATA $D_1$ | 0.08367706 | 45.22933745 | 0.203405953 | | 0.5 | 1 |
| DATA $D_2$ | 0.795004905 | 65.80991124 | 3.27691739 | | 0.5 | 1 |
| DATA $D_3$ | 0.980996159 | 94.08183404 | -8.47890872 | | 0.5 | 0 |
| ... | | | | | | |
| DATA $D_n$ | 0.06041296 | 2.318206641 | -7.74197386 | | 0.5 | 0 |

LINEAR DISCRIMINATION WITH FEATURE SELECTION TO PERFORM ESTIMATION

FIG. 24

USE COMBINATION OF
FEATURE EXTRACTION EXPRESSIONS | AIC

| # | Vector | AIC |
|---|---|---|
| 1 | 1 0 0 0 0 0 0 0 ... 0 | 235.01 |
| 2 | 0 1 0 0 0 0 0 0 ... 0 | 642.53 |
| 3 | 0 0 1 0 0 0 0 0 ... 0 | 1253.1 |
| 4 | 0 0 0 1 0 0 0 0 ... 0 | 134.35 |
| ⋮ | | |
| m | 0 0 0 0 0 0 0 0 ... 1 | 1785.83 |

FIG. 25

USE COMBINATION OF
FEATURE EXTRACTION EXPRESSIONS | AIC

| # | Vector | AIC |
|---|---|---|
| 1 | 1 0 0 0 0 0 0 0 ... 0 | 235.01 |
| 2 | 0 1 0 0 0 0 0 0 ... 0 | 642.53 |
| 3 | 0 0 1 0 0 0 0 0 ... 0 | 1253.1 |
| 4 | 0 0 0 1 0 0 0 0 ... 0 | 134.35 |
| ⋮ | | |
| m | 0 0 0 0 0 0 0 0 ... 1 | 1785.83 |

FIG. 28

| | AVERAGE CALCULATION TIME | LABEL-DATA CORRELATION COEFFICIENT |
|---|---|---|
| FEATURE EXTRACTION EXPRESSION 1 | 0.24 ms | 0.31 |
| FEATURE EXTRACTION EXPRESSION 2 | 0.15 ms | 0.23 |
| FEATURE EXTRACTION EXPRESSION 3 | 0.11 ms | 0.05 |
| FEATURE EXTRACTION EXPRESSION 4 | 0.5 ms | 0.52 |
| ... | | |
| FEATURE EXTRACTION EXPRESSION m | 0.03 ms | 0.16 |

FIG. 29

| | AVERAGE CALCULATION TIME | LABEL-DATA CORRELATION COEFFICIENT |
|---|---|---|
| FEATURE EXTRACTION EXPRESSION 1 | 0.24 ms | 0.31 |
| FEATURE EXTRACTION EXPRESSION 2 | 0.15 ms | 0.23 |
| FEATURE EXTRACTION EXPRESSION 3 | 0.11 ms | 0.05 |
| FEATURE EXTRACTION EXPRESSION 4 | 0.5 ms | 0.52 |
| ... | | |
| FEATURE EXTRACTION EXPRESSION m | 0.03 ms | 0.16 |

FIG. 30

| | TOTAL CALCULATION TIME | ACCURACY |
|---|---|---|
| SOLUTION 1 | 7.46 ms | 0.7660 |
| SOLUTION 2 | 7.35 ms | 0.7650 |
| SOLUTION 3 | 7.11 ms | 0.7635 |
| SOLUTION 4 | 6.83 ms | 0.7627 |
| SOLUTION 5 | 6.74 ms | 0.7642 |
| SOLUTION 6 | 6.68 ms | 0.7645 |
| ... | | |
| SOLUTION m | 0.45 ms | 0.6933 |

SOLUTION 1: USE OF ALL FEATURE EXTRACTION EXPRESSIONS

SOLUTION m: USE OF ONLY ONE FEATURE EXTRACTION EXPRESSION

X: ANOTHER SOLUTION WITH HIGHER ACCURACY AND SHORTER CALCULATION TIME EXISTS

FIG. 51

|  | TARGET VARIABLES ||
|  | SPEED | BRIGHTNESS |
| --- | --- | --- |
| WAVEFORM DATA $DD_1$ | 4 | 1 |
| WAVEFORM DATA $DD_2$ | 2 | 3 |
| WAVEFORM DATA $DD_3$ | 1 | 5 |
| WAVEFORM DATA $DD_4$ | 4 | 2 |
| ... |  |  |
| WAVEFORM DATA $DD_l$ | 2 | 4 |

TEACHER DATA {

FIG. 52

CALCULATION RESULTS OF FEATURE EXTRACTION EXPRESSIONS

| | FEATURE EXTRACTION EXPRESSION 1 | FEATURE EXTRACTION EXPRESSION 2 | ... | FEATURE EXTRACTION EXPRESSION m |
|---|---|---|---|---|
| WAVEFORM DATA $DD_1$ | 0.142565 | 0.431047 | | 0.713684 |
| WAVEFORM DATA $DD_2$ | 0.104266 | 0.753864 | | 0.931711 |
| WAVEFORM DATA $DD_3$ | 0.868273 | 0.051845 | | 0.720371 |
| ... | | | | |
| WAVEFORM DATA $DD_l$ | 0.322262 | 0.172228 | | 0.90102 |

AVERAGE TIME TAKEN FOR CALCULATING FEATURE EXTRACTION EXPRESSION

| | FEATURE EXTRACTION EXPRESSION 1 | FEATURE EXTRACTION EXPRESSION 2 | ... | FEATURE EXTRACTION EXPRESSION m |
|---|---|---|---|---|
| AVERAGE TIME | 0.2 ms | 0.1 ms | | 1.5 ms |

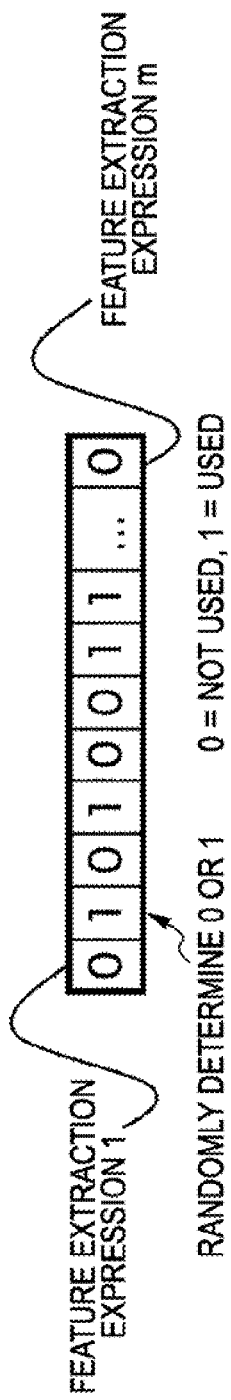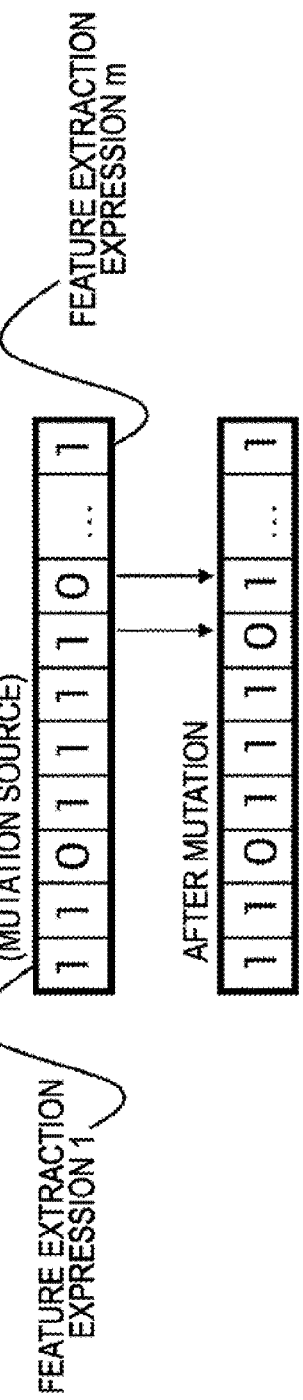
FIG. 53A
FIG. 53B

FIG. 55

| | FEATURE EXTRACTION EXPRESSION 1 | FEATURE EXTRACTION EXPRESSION 2 | FEATURE EXTRACTION EXPRESSION 3 | FEATURE EXTRACTION EXPRESSION 4 | FEATURE EXTRACTION EXPRESSION 5 | FEATURE EXTRACTION EXPRESSION 6 | ... | FEATURE EXTRACTION EXPRESSION m |
|---|---|---|---|---|---|---|---|---|
| AVERAGE TIME | 0.2 ms | 0.1 ms | (0.3 ms) | 0.6 ms | 0.4 ms | 0.1 ms | ... | 1.5 ms |
| | USED | USED | NOT USED | USED | USED | USED | | USED |

TOTAL CALCULATION TIME OF AMOUNTS OF FEATURES OF FEATURE EXTRACTION EXPRESSIONS IN USE ⇒ 7.2 ms

FIG. 56

| SPEED EVALUATION REFERENCE VALUE | BRIGHTNESS EVALUATION REFERENCE VALUE | TOTAL CALCULATION TIME |
|---|---|---|
| 245 | 914 | 7.2 ms |

FIG. 57

| | SPEED EVALUATION REFERENCE VALUE | BRIGHTNESS EVALUATION REFERENCE VALUE | TOTAL CALCULATION TIME | |
|---|---|---|---|---|
| PARETO OPTIMAL SOLUTION 1 | 308 | 403 | 9.3 ms | HELD AS PARETO OPTIMAL SOLUTIONS |
| PARETO OPTIMAL SOLUTION 2 | 212 | 326 | 10.2 ms | |
| PARETO OPTIMAL SOLUTION 3 | 492 | 983 | 8.4 ms | |
| PARETO OPTIMAL SOLUTION 4 | 141 | 245 | 12.2 ms | HELD AS PARETO OPTIMAL SOLUTIONS |
| ... | | | | |
| PARETO OPTIMAL SOLUTION p | 351 | 153 | 8.9 ms | |
| SOLUTION CANDIDATE | 245 | 914 | 7.2 ms | |

X

INFORMATION PROCESSSING APPARATUS, INFORMATION PROCESSING METHOD, AND PROGRAM

BACKGROUND OF THE INVENTION

1. Field of the Invention

The present invention relates to an information processing apparatus, an information processing method, and a program. More particularly, the present invention relates to an information processing apparatus, an information processing method, and a program which can present multiple algorithms having a tradeoff relationship in evaluation indices.

2. Description of the Related Art

There has been proposed a technology (automatic algorithm configuration technology) for automatically configuring an amount-of-feature extraction algorithm for extracting the amount of features representing features of given data by using a genetic search technique. In the automatic algorithm configuration technology, an algorithm for speech recognition, image recognition, and so on can be automatically configured.

For example, the present assignee has proposed a technology for configuring an algorithm that can quickly extract the amount of features with high accuracy from content data, such as music data (e.g., refer to International Patent Publication No. WO2007/049641).

SUMMARY OF THE INVENTION

In the automatic algorithm-configuration technology, only a highest performance (a highest accuracy) algorithm is output. Thus, for example, when two evaluation indices such as performance (accuracy) and speed (processing time) exist, it is difficult to obtain an algorithm that operates at high speed even though the performance may decline somewhat. Although one of the evaluation indices may be reduced once an algorithm is configured, the technology of the related art typically may not deal with changes, such as a desire to increase one of the evaluation indices.

The present invention has been conceived in view of such a situation, and it is desirable to make it possible to present multiple algorithms having a tradeoff relationship in evaluation indices.

According to one embodiment of the present invention, there is provided an information processing apparatus. The information processing apparatus includes: algorithm configuring means for configuring an algorithm for performing discrimination on an input signal by using a genetic search technique; and tradeoff analyzing means for determining Pareto optimal solutions of the algorithm with respect to evaluation indices by performing tradeoff analysis on the basis of the algorithm.

The information processing apparatus may further include optimum-algorithm determining means for determining, of the Pareto optimal solutions, an optimum algorithm that matches a requested condition of the evaluation indices.

The algorithm configured by the algorithm configuring means may have feature extraction expressions and an information estimation expression that is a combination of the feature extraction expressions.

The tradeoff analyzing means may generate Pareto optimal solutions in an initial state by using algorithms having different numbers of feature extraction expressions, the algorithms being created by deleting the feature extraction expressions one by one from the algorithm configured by the algorithm configuring means.

The tradeoff analyzing means may use, as a Pareto optimal solution in an initial state, the algorithm configured by the algorithm configuring means.

The tradeoff analyzing means may update the Pareto optimal solutions by randomly changing use or not-use of each feature extraction expression in the Pareto optimal solutions in the initial state.

The optimum-algorithm determining means may determine, of the Pareto optimal solutions, the optimum algorithm on the basis of requested processing time and accuracy.

The information processing apparatus may further includes evaluation-value calculating means for determining evaluation values of the feature extraction expressions in the information estimation expression, and the algorithm configuring means may update the feature extraction expressions in the information estimation expression on the basis of the determined evaluation values of the feature extraction expressions.

When the algorithm configuring means configures multiple information estimation expressions as algorithms, a total value of contribution rates of the same feature extraction expressions in the information estimation expressions may be used as the evaluation value of the corresponding feature extraction expression.

According to another embodiment of the present invention, there is provided an information processing method for an information processing apparatus having algorithm configuring means for configuring an algorithm and tradeoff analyzing means for determining Pareto optimal solutions of the algorithm. The information processing method includes the steps of: configuring the algorithm for performing discrimination on an input signal by a genetic search technique; and determining Pareto optimal solutions of the algorithm with respect to evaluation indices by performing tradeoff analysis on the basis of the algorithm.

According to still another embodiment of the present invention, there is provided a program. The program causes a computer to function as: algorithm configuring means for configuring an algorithm for performing discrimination on an input signal by using a genetic search technique; and tradeoff analyzing means for determining Pareto optimal solutions of the algorithm with respect to evaluation indices by performing tradeoff analysis on the basis of the algorithm.

According to the embodiment of the present invention, an algorithm for performing discrimination on an input signal is configured, and tradeoff analysis is performed on the basis of the configured algorithm. As a result, multiple Pareto optimal solutions of the algorithm with respect to evaluation indices are determined.

According to the embodiment of the present invention, it is possible to present multiple algorithms having a tradeoff relationship in evaluation indices.

BRIEF DESCRIPTION OF THE DRAWINGS

FIG. 4 shows the structure of an abnormal-sound discrimination expression;

FIG. 7 shows examples of feature extraction expressions;

FIG. 12 illustrates types of operator;

FIG. 16 illustrates mutation generation;

FIG. 21 shows an example of the amounts of features calculated by an amount-of-feature calculating section;

FIG. 22 shows an example of data supplied to a machine learning section;

FIG. 24 illustrates processing performed by the machine learning section;

FIG. 25 illustrates processing performed by the machine learning section;

FIG. 28 illustrates Pareto-optimal-solution initialization;

FIG. 29 illustrates the Pareto-optimal-solution initialization;

FIG. 30 illustrates the Pareto-optimal-solution initialization;

FIG. 51 shows an example of teacher data;

FIG. 52 shows an example of the amount of features and an average time which are supplied to an evaluation-value calculating section;

FIGS. 53A and 53B show examples of use/not-use of each amount of features;

FIG. 55 shows an example of calculation of a total calculation time;

FIG. 56 shows an example of a speed evaluation reference value, a brightness evaluation reference value, and a total calculation time;

FIG. 57 illustrates Pareto-optimal-solution update;

DESCRIPTION OF THE PREFERRED EMBODIMENTS

Figure 1:
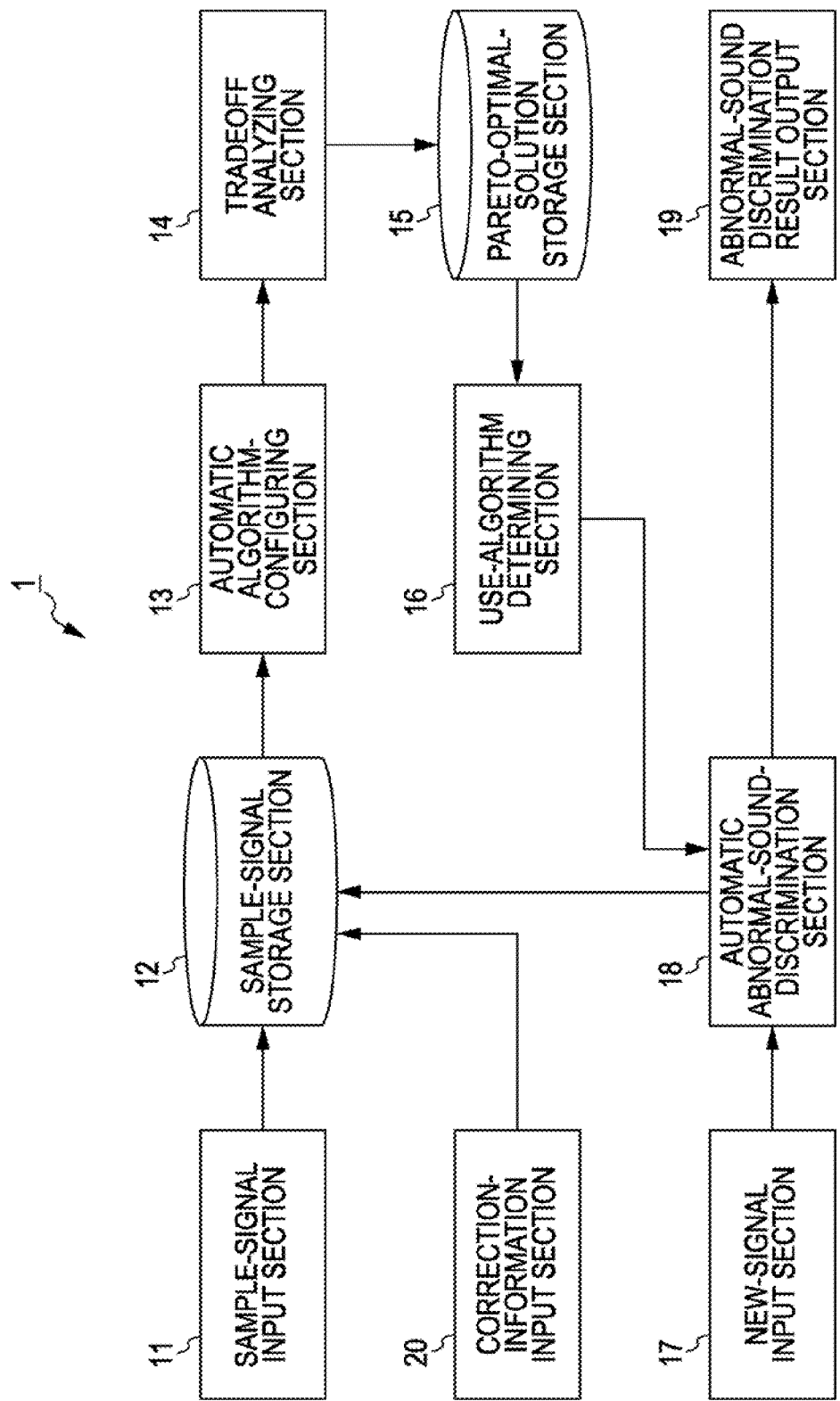
FIG. 1 is a block diagram showing an example of the configuration of an information processing apparatus according to an embodiment of the present invention.

FIG. 1 shows an example of the confirmation of an information processing apparatus according to one embodiment of the present invention.

An information processing apparatus 1 performs processing for detecting abnormal sounds, automatically configures algorithms on the basis of a sample signal with which whether or an abnormal sound or a normal sound is known, the sample signal being input as learning data. The information processing apparatus 1 determines whether or not a new input signal (hereinafter referred to as a "new signal") has an abnormal sound or a normal sound in accordance with the automatically configured algorithm.

The information processing apparatus 1 includes a sample-signal input section 11, a sample-signal storage section 12, an automatic algorithm-configuring section 13, a tradeoff analyzing section 14, a Pareto-optimal-solution storage section 15, a use-algorithm determining section 16, a new-signal input section 17, an automatic abnormal-sound-discrimination section 18, an abnormal-sound discrimination result output section 19, and a correction-information input section 20.

The sample signal for algorithm configuration is input from another block (not shown) in the information processing apparatus 1 or from another apparatus to the sample-signal input section 11. In response to the sample signal for algorithm configuration, the sample-signal input section 11 supplies the sample signal to the sample-signal storage section 12.

The sample-signal storage section 12 stores, as teacher data, the sample signal supplied from the sample-signal input section 11. The automatic abnormal-sound-discrimination section 18 and the correction-information input section 20 supplies signals (described below) to the sample-signal storage section 12.

Data indicating whether or not the sample signal input to the sample-signal input section 11 has a normal sound or an abnormal sound is attached, as a label, to the sample signal.

Figure 2:
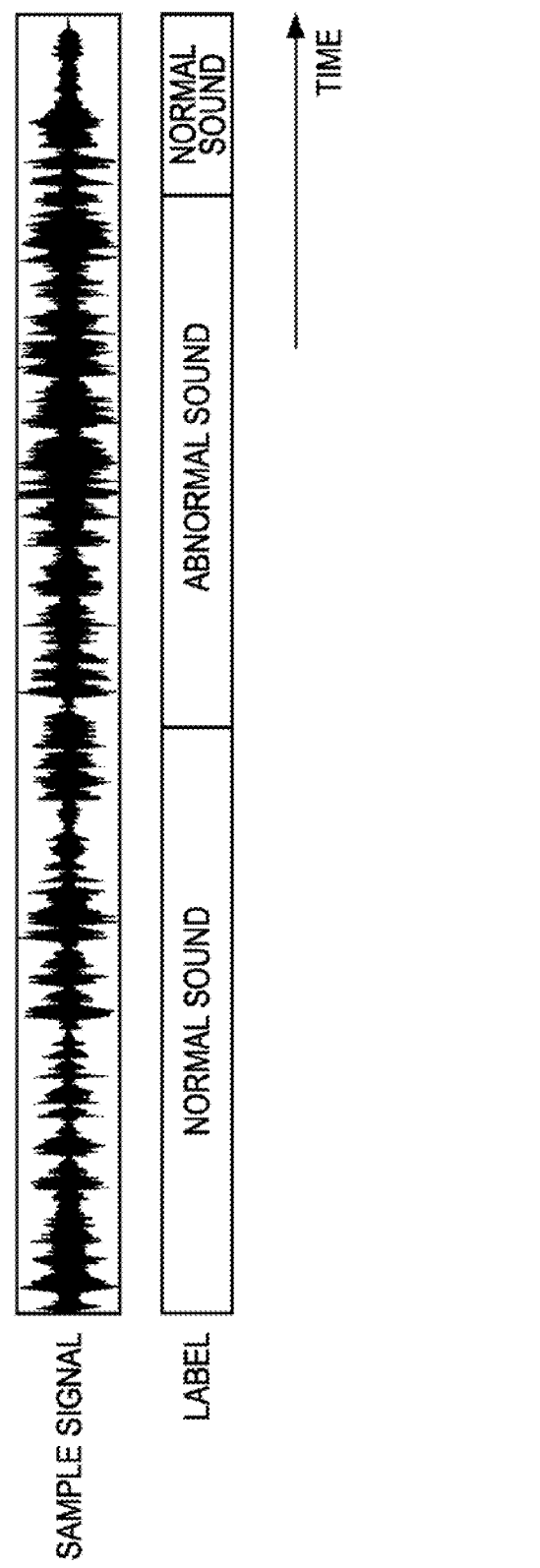
FIG. 2 shows an example of a sample signal input to the information processing apparatus.

FIG. 2 is an example of a sample signal input to the sample-signal input section 11. In FIG. 2, the horizontal axis indicates time, and the sample signal and the label has a one-to-one correspondence at each point in time. The label indicating whether the sample signal is a normal sound or an abnormal sound can be given as a signal having a high level or low level.

By performing learning based on a genetic search technique, the automatic algorithm-configuring section 13 configures (generates) an algorithm for discriminating between an abnormal sound or a normal sound with respect to a new signal with which whether an abnormal sound or a normal sound is unknown. The algorithm configured is an algorithm (an amount-of-feature extraction algorithm) for extracting the amount of features indicating predetermined features of an input signal and making it possible to discriminate between an abnormal sound and a normal sound on the basis of whether (the value of) the amount of features extracted by the algorithm is larger than or equal to a predetermined threshold. Details of the algorithm configuration are described below with reference to FIG. 3 and subsequent figures.

The tradeoff analyzing section 14 determines Pareto optimal solutions, as algorithms, by performing tradeoff analysis on the basis of the algorithm configured by the automatic algorithm-configuring section 13. The tradeoff analyzing section 14 then supplies the multiple algorithms, which are the Pareto optimal solutions, to the Pareto-optimal-solution storage section 15. The Pareto-optimal-solution storage section 15 stores the multiple algorithms (which are the Pareto optimal solutions) supplied from the tradeoff analyzing section 14.

The use-algorithm determining section 16 determines, of the multiple algorithms stored in the Pareto-optimal-solution storage section 15, an optimum algorithm that matches requested conditions for evaluation indices, and supplies the determined optimum algorithm to the automatic abnormal-sound-discrimination section 18. The evaluation indices include, for example, a currently available resource status and requested performance of the information processing apparatus 1.

The new-signal input section 17 receives an input new signal that is to be subjected to abnormal-sound discrimination and supplies the received new signal to the automatic abnormal-sound-discrimination section 18.

The automatic abnormal-sound-discrimination section 18 uses the algorithm, supplied from the use-algorithm determining section 16, to discriminate between an abnormal sound and a normal sound with respect to the new signal supplied from the new-signal input section 17, and supplies a discrimination result to the abnormal-sound discrimination result output section 19. The automatic abnormal-sound-discrimination section 18 also adds, as a label, the discrimination result to the new signal supplied from the new-signal input section 17, and supplies the resulting signal to the sample-signal storage section 12 for storage. Thus, the new signal supplied from the new-signal input section 17 is stored in the sample-signal storage section 12 as a new sample signal.

The abnormal-sound discrimination result output section 19 outputs the discrimination result, supplied from the automatic abnormal-sound-discrimination section 18, in the form of sound or image. For example, when the new signal has an abnormal sound, the abnormal-sound discrimination result output section 19 outputs a sound indicating an abnormal sound or displays, on a screen, video showing character "normal sound" or "abnormal sound".

When the label of the sample signal stored in the sample-signal storage section 12 has error, the correction-information input section 20 corrects the label. That is, the correction-information input section 20 re-writes the label of the sample signal in response to a user operation.

Thus, not only the label-added sample signal from the sample-signal input section 11 but also a label-added sample signal from the automatic abnormal-sound-discrimination section 18 is input to the sample-signal storage section 12. When the label of the sample signal supplied from the automatic abnormal-sound-discrimination section 18 has error, the correction-information input section 20 corrects the label.

The algorithm configuration performed by the automatic algorithm-configuring section 13 will be described next in detail.

Figure 3:
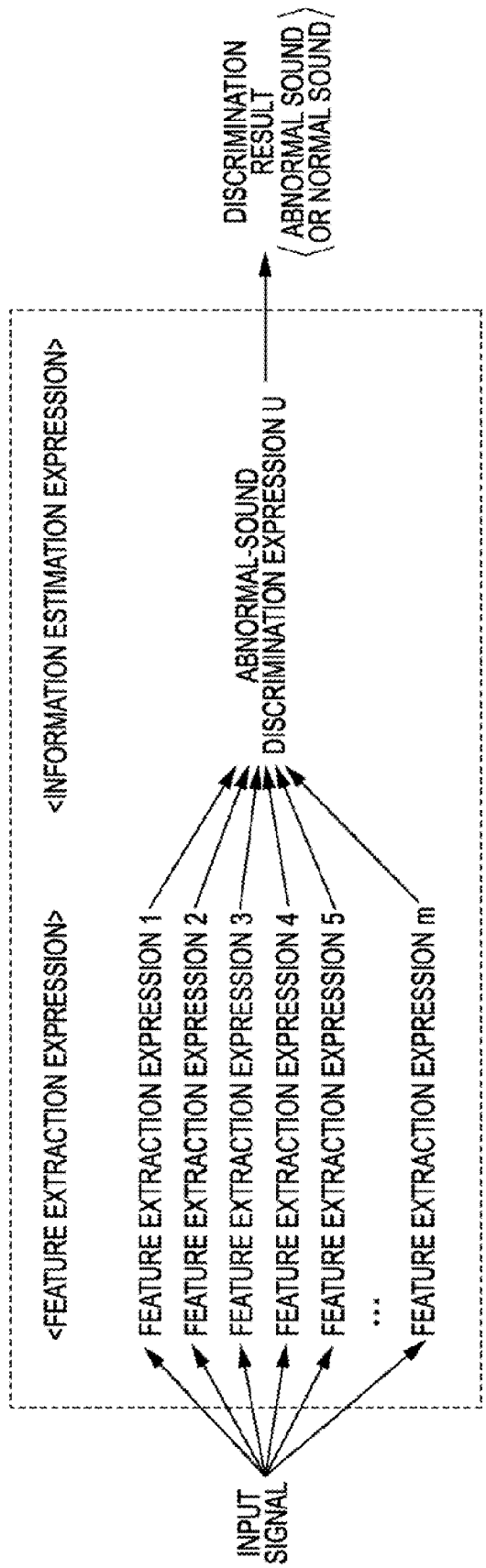
FIG. 3 is a diagram illustrating a structure of an algorithm to be generated.

FIG. 3 is a diagram illustrating the structure of an algorithm to be configured.

The configured algorithm includes m feature extraction expressions 1 to m (m is an integer greater than 1) and an information estimation expression represented by a linear combination expression of the m feature extraction expressions 1 to m. Each feature extraction expressions perform predetermined computations on the input signal and output first-order values as computation results. The information estimation expression uses the first-order values output from the feature extraction expressions to estimate information indicating features of the input signal. The automatic algorithm-configuring section 13 determines an abnormal-sound discrimination expression U as the information estimation expression.

FIG. 4 shows a specific example of the abnormal-sound discrimination expression U. The discrimination result to be output is a binary indicating an abnormal sound or a normal sound. Thus, whether the input signal has an abnormal sound or a normal sound is discriminated based on whether the computation result of the abnormal-sound discrimination expression U is smaller than or equal to a predetermined threshold Th or is larger than the predetermined threshold Th. For example, as shown in FIG. 4, when the computation result of the abnormal-sound discrimination expression U is smaller than or equal to the predetermined threshold Th, the discrimination result to be output indicates that the input signal has a normal sound, and when the computation result of the abnormal-sound discrimination expression U is larger than the predetermined threshold Th, the discrimination result to be output indicates that the input signal has an abnormal sound. In the example of the abnormal-sound discrimination expression U shown in FIG. 4, only feature extraction expressions 1, 2, 5, and 15 of the feature extraction expressions 1 to m are used. This is because linear combination coefficients of the other feature extraction expressions are zero.

Figure 5:
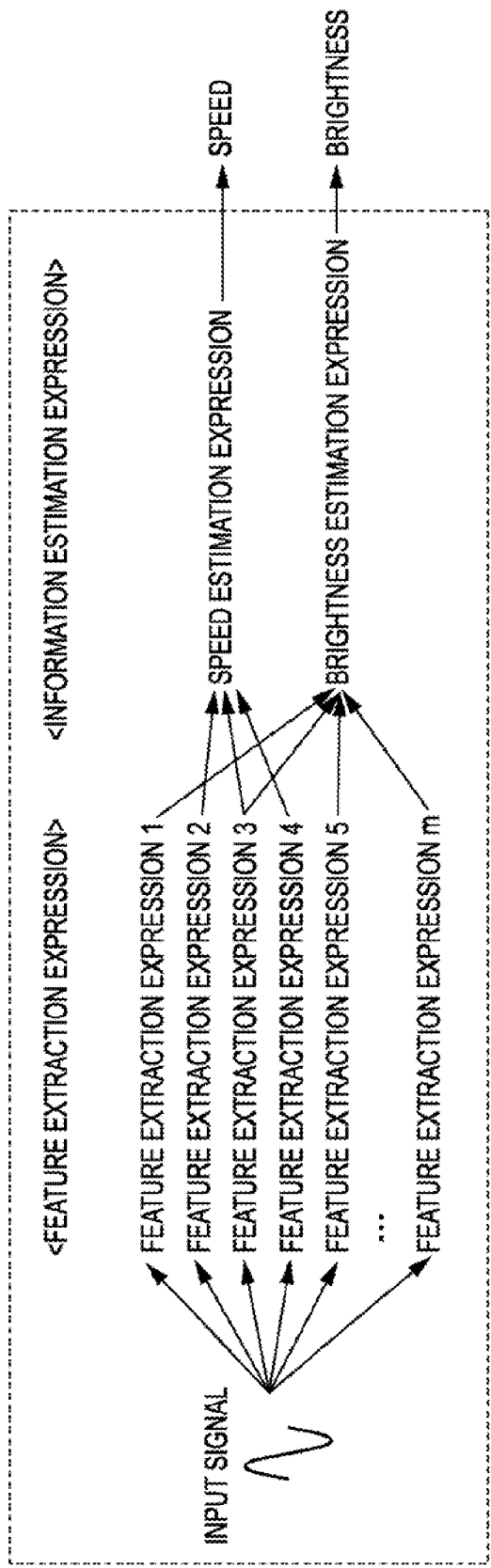
FIG. 5 is a diagram illustrating another structure of the algorithm to be generated.

The algorithm to be configured may be an algorithm for estimating, for example, numeric values in predetermined ranges, such as the degrees (levels) of music speed and brightness, instead of the binary indicating an abnormal sound or a normal sound. In such a case, as shown in FIG. 5, a value indicating the speed of the input signal is determined from a computation result of a speed estimation expression represented by a linear combination expression of m feature extraction expressions 1 to m, and a value indicating the brightness of the input signal is determined from a computation result of a brightness estimation expression represented by a linear combination expression of m feature extraction expressions 1 to m.

Figure 6:
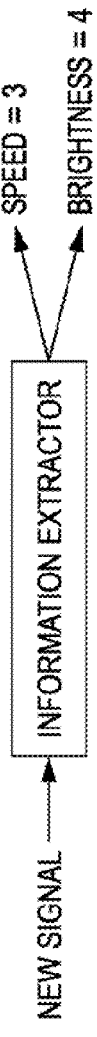
FIG. 6 is a block diagram showing an example of the configuration of an information extractor.

An example in which an algorithm used as a feature extractor for extracting the values of speed and brightness when a new signal is input is configured as shown in FIG. 6 is described in a next embodiment describe below with reference to FIG. 50 and subsequent figures.

FIG. 7 shows examples of the feature extraction expressions 1 to m.

Figure 8:
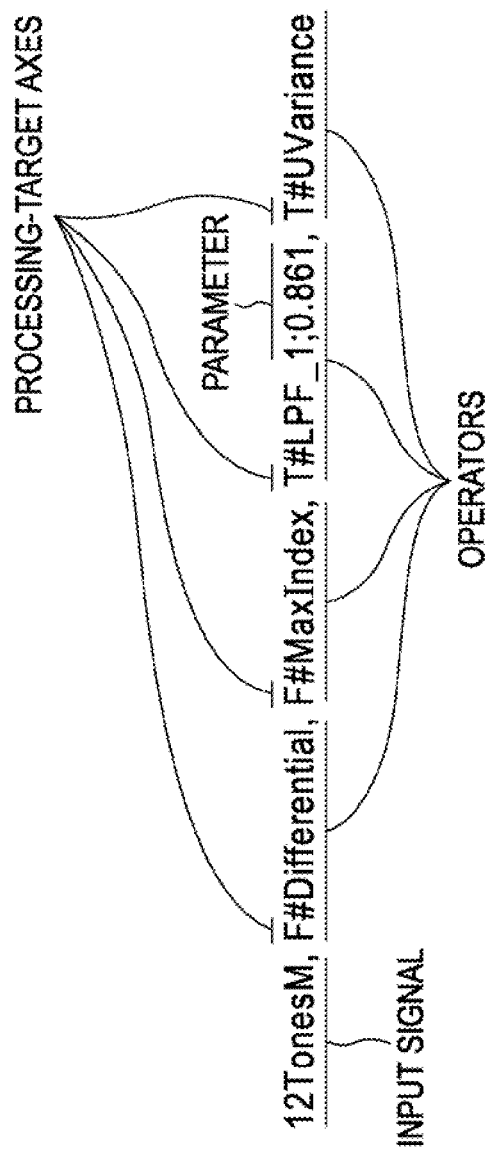
FIG. 8 shows an example of one feature extraction expression.

The feature extraction expressions can process an input signal, which can be expressed in multiple order values, until it has one value, that is, it has a scalar quantity. FIG. 8 shows one example of the feature extraction expressions.

This feature extraction expression shown in FIG. 8 is constituted by information indicating the type of an input signal and operators that provide information indicating signal processing to be performed on the input signal. Each operator includes a processing-target axis and a processing description and optionally includes a parameter for the processing. In the example shown in FIG. 8, "12TonesM" is information indicating the type of an input signal and is followed by four operators "F#Differential", "F#MaxIndex", "T#LPF_1; 0.861", and "T#UVariance".

The information indicating the type of an input signal includes, for example, "wav" resenting a waveform and "Spectrum" representing a two-dimensional image (which shows a sound spectrum), in addition to "12TonesM" (shown in the example in FIG. 8) indicating that monaural PCM (pulse coded modulation) sound source waveform data is subjected to interval-analysis along the time axis.

The feature extraction expression indicates that the signal processing expressed by the operators is sequentially performed on the input signal, starting from the information closer to the information indicating the type of the input signal. The beginning of each operator indicates an axis to be processed (a processing-target axis). In the axis to be processed, T indicates a time direction and F indicates a frequency (an interval) direction.

With regard to the processing description that follows the processing-target axis of the operator, "Differential" indicates differentiation, "MaxIndex" indicates acquiring a maximum-value index, "LPF_1" indicates low-pass filtering, and "UVariance" indicates computing an unbiased variance. Each operator may be given a parameter, as appropriate. In the example shown in FIG. 8, the processing of "LPF_1" (low-pass filtering) is given a parameter "0.861".

Thus, the feature extraction expression shown in FIG. 8 is to differentiate data, obtained by performing interval analysis on PCM waveform data in a time axis, in an interval direction; to calculate "Index" indicating a maximum value in the interval direction (i.e., to obtain the number of an interval having the strongest sound"); to apply a low pass filter in the time axis direction; and to lastly calculate an unbiased variance. The result of the calculation is output.

In the present embodiment, "wav" indicating a waveform in a sound-representing signal is employed for the input signal, but the feature extraction expression may have not only a sound signal but also any signal that can be expressed in a matrix form (in a form of a multi-dimensional matrix having values). Examples include a signal for a still image and a signal for a moving image.

Figure 9:
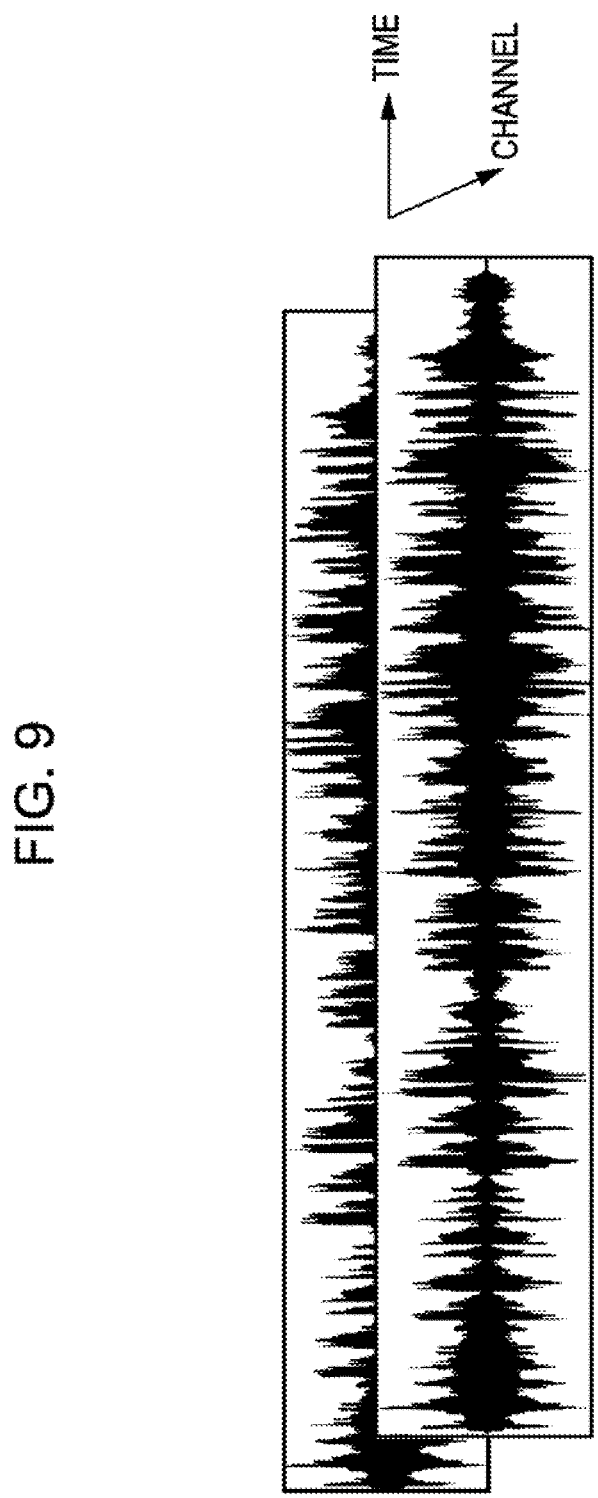
FIG. 9 illustrates a type of input signal.
Figure 10:
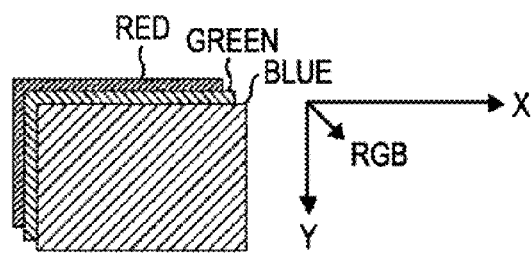
FIG. 10 illustrates a type of input signal.
Figure 11:
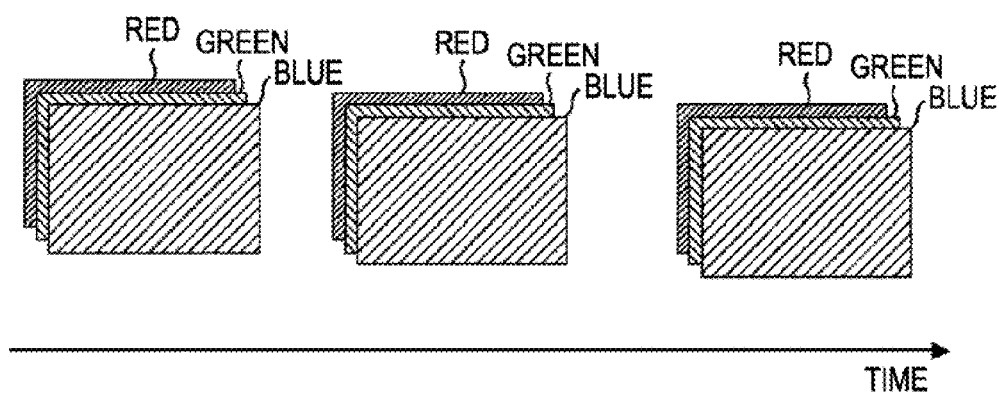
FIG. 11 illustrates types of input signal.

For example, the input signal may be an audio-waveform signal regarded as a matrix of amplitude, time, and channel, as shown in FIG. 9, may be an image signal regarded as a matrix of X and Y axes of a frame and RGB (R: red, G: green, and B: blue), as shown in FIG. 10, or may be a moving-image signal regarded as a matrix of X and Y axes of a frame, RGB, and time, as shown in FIG. 11. In addition, the input signal may be, for example, binary data that can be represented by a matrix.

The types of operators are shown in FIG. 12 by way of example. For example, the types of operators include mean value (Mean), fast Fourier transform (FFT), standard deviation (StDev), appearance ratio (Ratio), low-pass filter (LPF_1), high-pass filter (HPF_1), absolute value (ABS), square (Sqr), square root (Sqrt), normalization (Normalize), differentiation (Differential), integration (Integrate), maximum value (MaxIndex), unbiased variance (UVariance), and down sampling (DownSampling). The processing-target axis may be fixed depending on the determined operator. In such a case, the fixed processing-target axis is used for the operator. When an operator that uses a parameter is determined, the parameter is also determined to have a random or preset value.

Next, a flow of automatic algorithm generation that the automatic algorithm-configuring section 13 performs on the basis of a genetic search technique will be described with reference to FIGS. 13 to 18.

Figure 13:
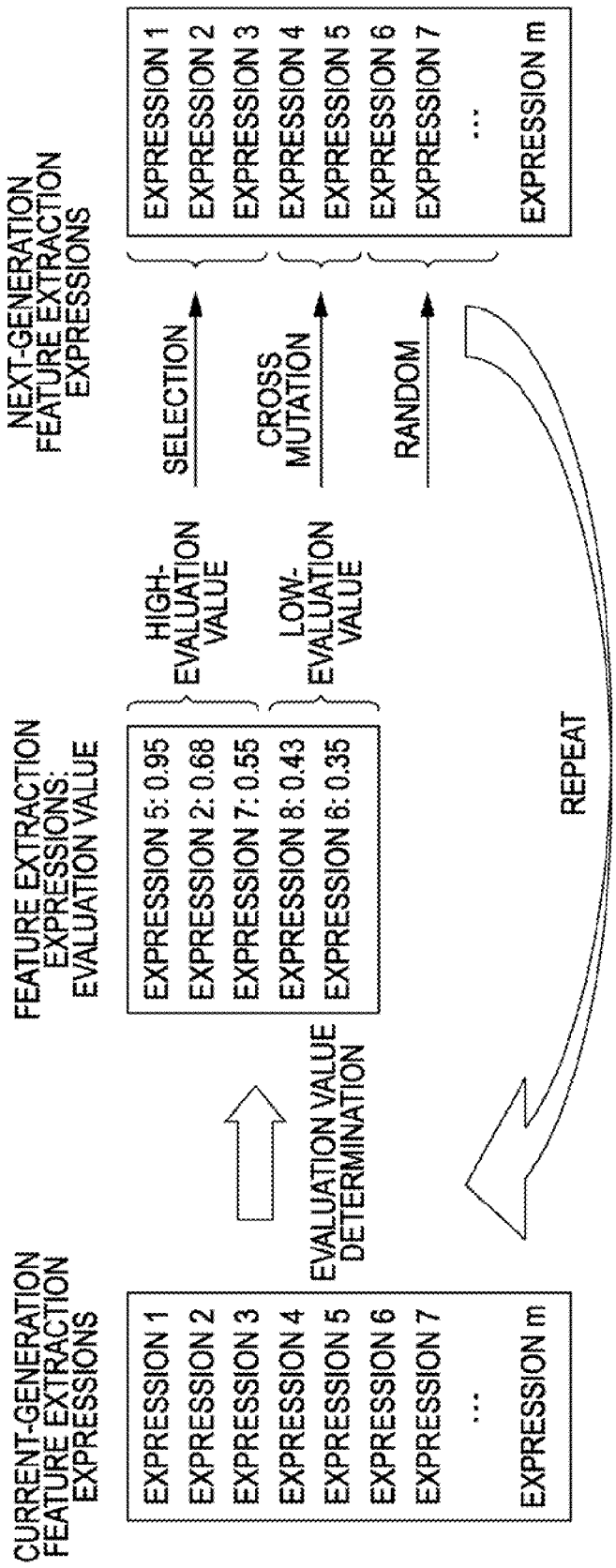
FIG. 13 is a diagram showing an example of an automatic algorithm configuration performed by an automatic algorithm-configuring section.

As shown in FIG. 13, with respect to the current-generation feature extraction expressions 1 to m, the automatic algorithm-configuring section 13 determines evaluation values for evaluating the feature extraction expressions. The automatic algorithm-configuring section 13 rearranges the current-generation feature extraction expressions 1 to m in descending order of the evaluation values, and then performs selection generation, cross generation, mutation generation, and random generation to generate next-generation feature extraction expressions 1 to m. The reason why the current-generation feature extraction expressions 1 to m are rearranged in descending order of the evaluation values is to allow feature extraction expressions for generating the next-generation feature extraction expressions to be selected in descending order of the evaluation values. Thus, processing in which the next-generation feature extraction expressions 1 to m become current-generation feature extraction expressions 1 to m and next-generation feature extraction expressions 1 to m are generated based on the current-generation feature extraction expressions 1 to m is repeated.

The selection generation, the cross generation, the mutation generation, and the random generation will now be described in detail.

The term "selection generation" refers to generating new feature extraction expressions by selecting, from the current-generation feature extraction expressions, a predetermined number of feature extraction expressions in descending order of the evaluation values and directly using the selected feature extraction expressions as the next-generation feature extraction expressions.

Figure 14:
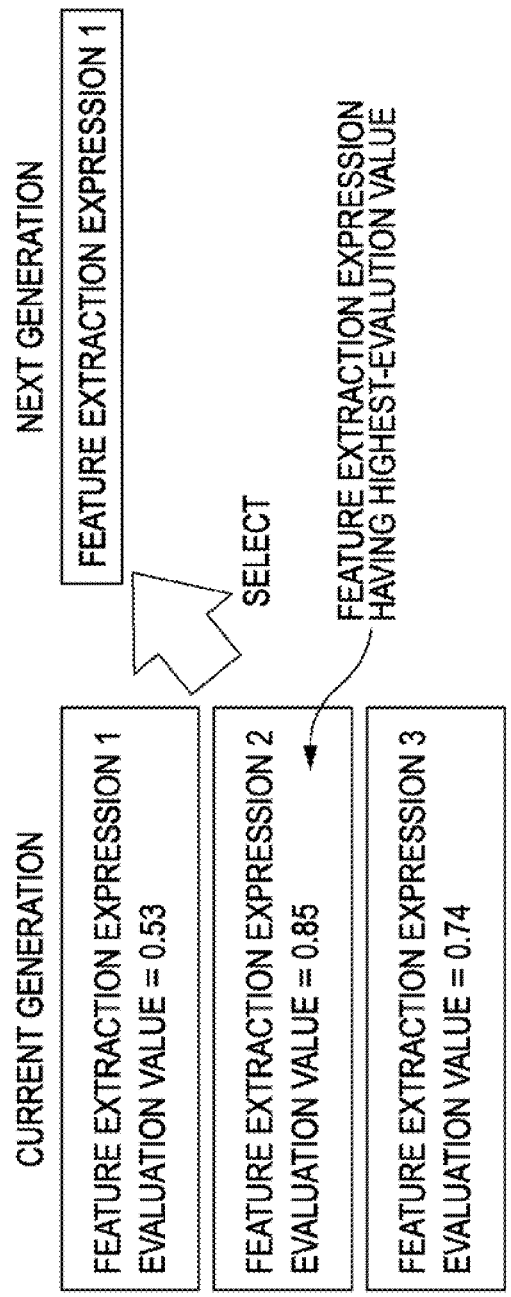
FIG. 14 illustrates selection generation.

For example, as shown in FIG. 14, when the evaluation values of the current-generation feature extraction expressions 1, 2, and 3 are 0.53, 0.85, and 0.74, respectively, the current-generation feature extraction expression 2 having the highest-evaluation value is selected and is used as a next-generation feature extraction expression 1.

The term "cross generation" refers to generating a new feature extraction expression by randomly selecting two feature extraction expressions with a weight being assigned so as to facilitate selection of a feature extraction expression having a higher-evaluation value and exchanging (crossing) the selected feature extraction expressions at random positions.

Figure 15:
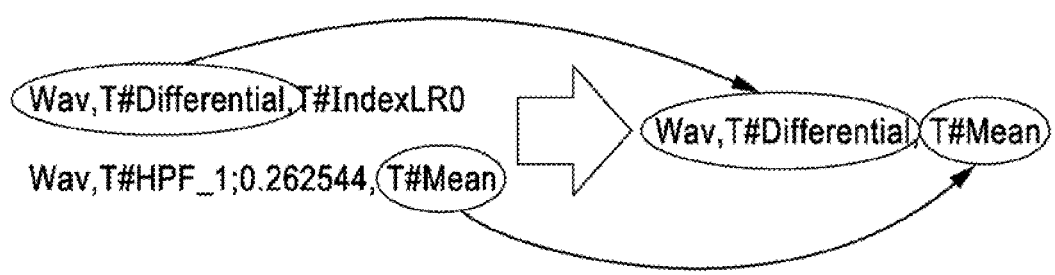
FIG. 15 illustrates cross generation.

For example, as shown in FIG. 15, a first feature extraction expression "Wav,T#Differential,T#IndexLR0" and a second feature extraction expression "Wav,T#HPF_1;0.262544, T#Mean", the first and second feature extraction expressions having high-evaluation values, are selected and portion "Wav, T#Differential" in the first feature extraction expression and portion "T#Mean" in the second feature extraction expression are combined, in other words, portion"T#IndexLR0" in the first feature extraction expression is exchanged with the portion "T#Mean" in the second feature extraction expression, to thereby generate a new feature extraction expression.

The term "mutation generation" refers to generating a new feature extraction expression by randomly selecting a feature extraction expression with a weight being assigned so as to facilitate selection of a feature extraction expression having a higher-evaluation value and randomly changing a part of the selected feature extraction expression.

For example, as shown in FIG. 16, a feature extraction expression "Wav,T#LPF_1;0.3,T#IndexLR0" having a high-evaluation value is selected as a mutation source, and one operator "T#LPF_1;0.3" in the selected feature extraction expression is deleted (mutation example 1), an operator "Sqr" is added (mutation example 2), or a parameter of one operator "T#LPF_1;0.3" in the feature extraction expression is changed to 0.7 (mutation example 3) to thereby generate a new feature extraction expression.

The term "random generation" refers to generating a new feature extraction expression by randomly combining operators so that an input signal has one value (a scalar quantity). First-generation feature extraction expressions 1 to m have no previous-generation feature extraction expressions that become sources thereof, and thus are all generated through random generation.

Figure 17:
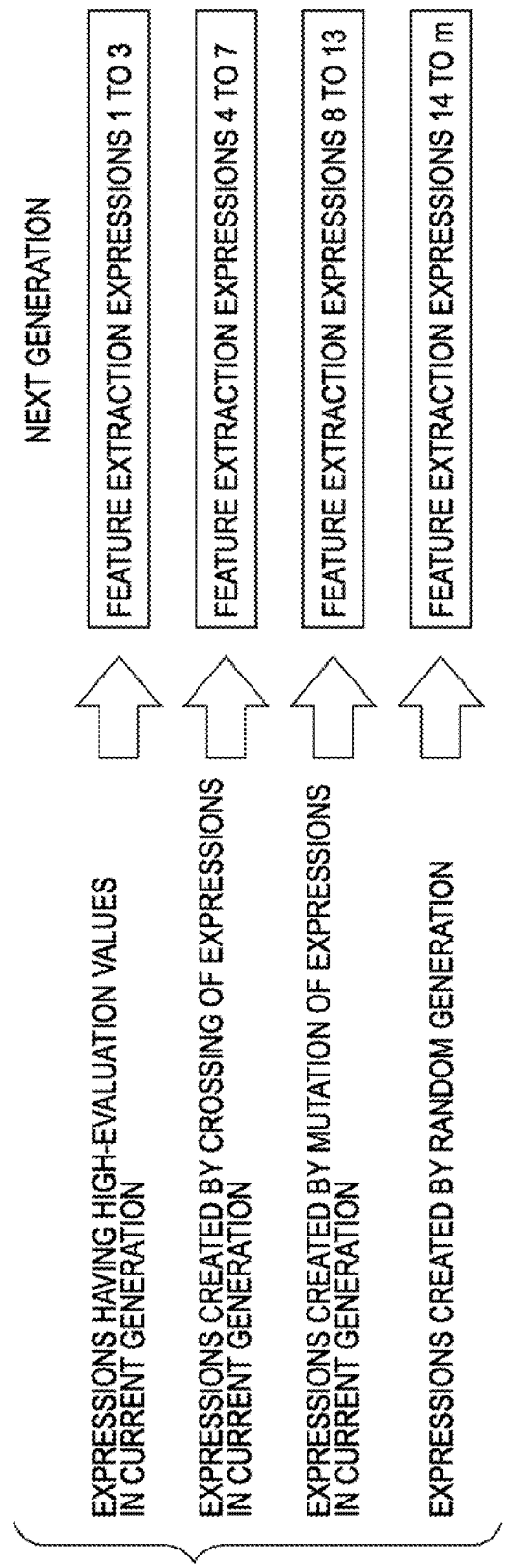
FIG. 17 illustrates an example of generation of next-generation feature extraction expressions.

For example, as shown in FIG. 17, the automatic algorithm-configuring section 13 uses the selection generation to determine next-generation feature extraction expressions 1 to 3, uses the cross generation to determine next-generation feature extraction expressions 4 to 7, uses the mutation generation to determine next-generation feature extraction expressions 8 to 13, and uses the random generation to determine next-generation feature extraction expressions 14 to m.

Figure 18:
FIG. 18 illustrates next-generation feature extraction expressions.

FIG. 18 shows an example in which next-generation feature extraction expressions 1 to m are generated from current-generation feature extraction expressions 1 to m.

Figure 19:
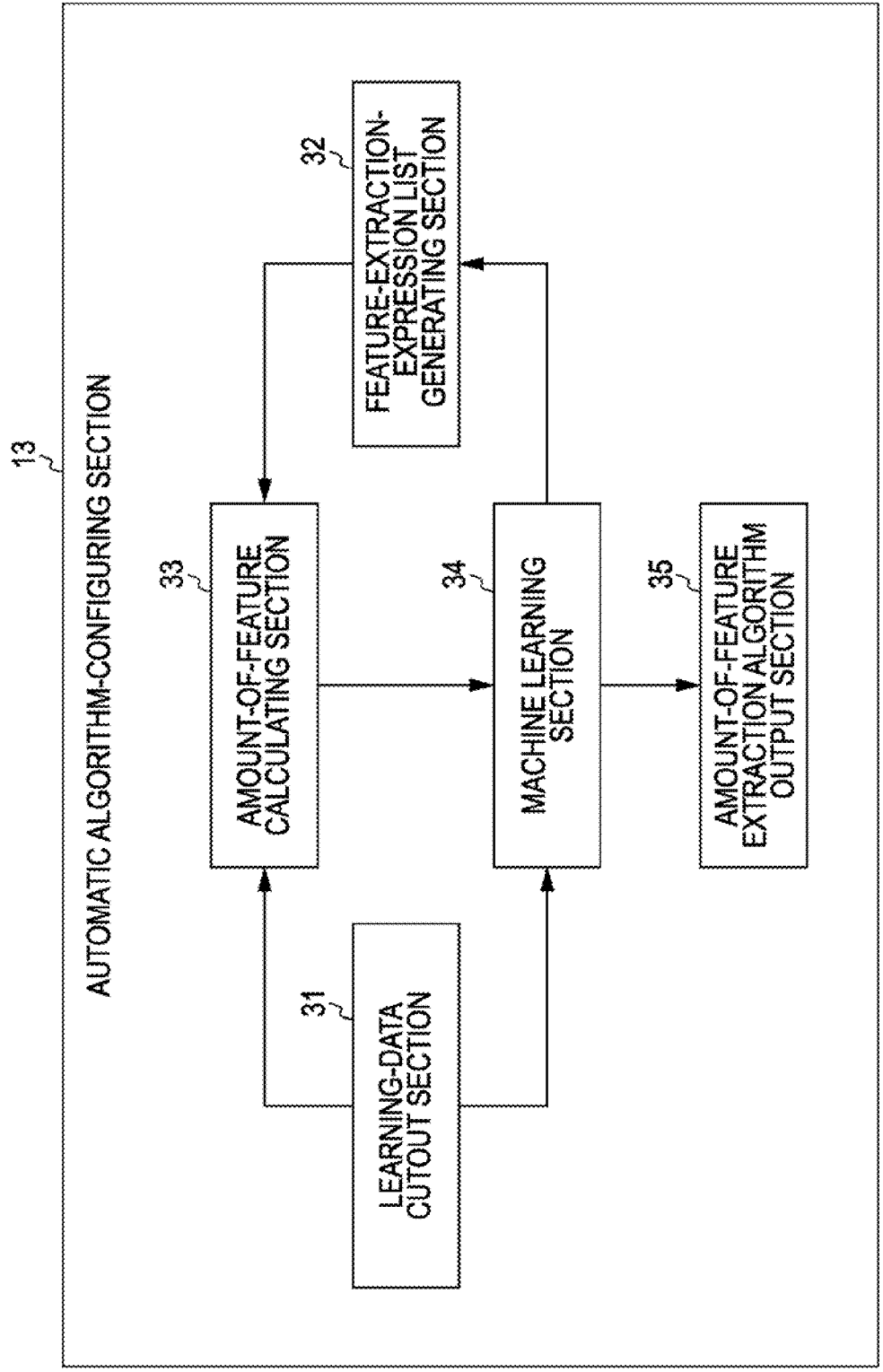
FIG. 19 is a block diagram showing an example of a detailed configuration of the automatic algorithm-configuring section.

FIG. 19 is a block diagram showing an example of a detailed configuration of an automatic algorithm-configuring section 13.

The automatic algorithm-configuring section 13 includes a learning-data cutout section 31, a feature-extraction-expression list generating section 32, an amount-of-feature calculating section 33, a machine learning section 34, and an amount-of-feature extraction algorithm output section 35.

The learning-data cutout section 31 cuts out learning data stored in the sample-signal storage section 12 and supplies the learning data to the amount-of-feature calculating section 33 and the machine learning section 34. More specifically, the learning-data cutout section 31 divides the sample signal, stored in the sample-signal storage section 12, and the label of the sample signal into portions in predetermined unit times and supplies the divided sample signals in the respective unit times to the amount-of-feature calculating section 33 and also supplies the divided labels in the unit times to the machine learning section 34.

Figure 20:
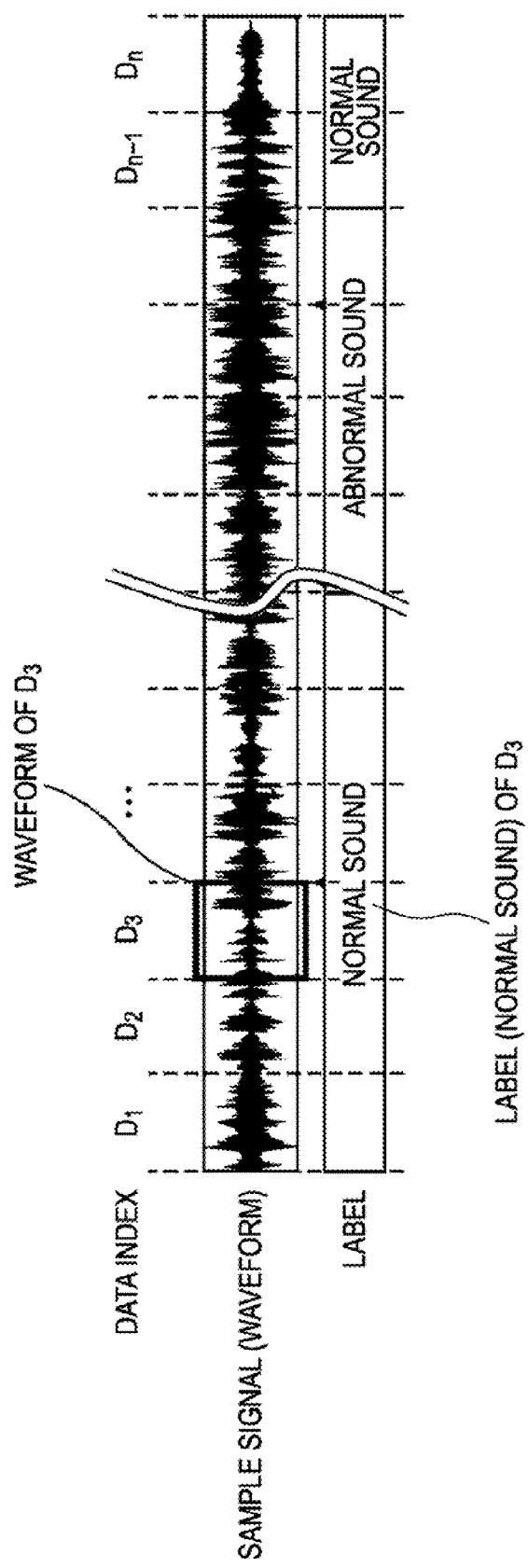
FIG. 20 illustrates processing performed by a learning-data cutout section.

It is now assumed that, as shown in FIG. 20, the learning-data cutout section 31 divides a sample signal, stored in the sample-signal storage section 12, and the label of the sample signal into n portions in n unit times. The first to nth sample signals in the unit times are referred to as data $D_1$ to $D_n$, respectively, and the labels associated with the data $D_1$ to $D_n$ are referred to as label data. In this case, the learning-data cutout section 31 supplies the data $D_1$ to $D_n$ to the amount-of-feature calculating section 33 and supplies the label data of the data $D_1$ to $D_n$ to the machine learning section 34.

The machine learning section 34 supplies evaluation values of current-generation feature extraction expressions 1 to m to the feature-extraction-expression list generating section 32. On the basis of the evaluation values, the feature-extraction-expression list generating section 32 generates next-generation feature extraction expressions 1 to m and supplies the generated next-generation feature extraction expressions 1 to m to the amount-of-feature calculating section 33. More specifically, the feature-extraction-expression list generating section 32 rearranges the current-generation feature extraction expressions 1 to m in descending order of the evaluation values, and then performs the selection generation, cross generation, mutation generation, and random generation on predetermined feature extraction expressions in the current generation to thereby generate next-generation feature extraction expressions 1 to m.

With respect to the respective data $D_1$ to $D_n$ supplied from the learning-data cutout section 31, the amount-of-feature calculating section 33 performs calculation of the feature extraction expressions 1 to m supplied from the feature-extraction-expression list generating section 32 and supplies calculation results, i.e., the amounts of features of the data $D_1$ to $D_n$, to the machine learning section 34.

FIG. 21 shows an example of the amounts of features calculated by the amount-of-feature calculating section 33 and supplied to the machine learning section 34.

By using the amounts of features of the data $D_1$ to $D_n$ and the label data thereof, the amounts being supplied from the amount-of-feature calculating section 33 and the label data being supplied from the learning-data cutout section 31, the machine learning section 34 performs linear discrimination with feature selection to estimate an abnormal-sound discrimination expression U. In other words, by using the amounts of features of the data $D_1$ to $D_n$, the amounts being supplied from the amount-of-feature calculating section 33, the machine learning section 34 estimates an abnormal-sound discrimination expression U that uses feature extraction expressions and that best matches the label data of the data $D_1$ to $D_n$, the label data being supplied from the learning-data cutout section 31. The machine learning section 34 determines evaluation values of the respective feature extraction expressions when the estimated abnormal-sound discrimination expression U is used and supplies the determined evaluation values to the feature-extraction-expression list generating section 32.

The processing performed by the machine learning section 34 will now be described in more detail.

FIG. 22 shows an example of data supplied from the amount-of-feature calculating section 33 and the learning-data cutout section 31 to the machine learning section 34.

The machine learning section 34 evaluates which of the current-generation feature extraction generations 1 to m are to be used to best match the label data of the data $D_1$ to $D_n$, and determines an optimum combination of the feature extraction expressions to be used.

Figure 23A:
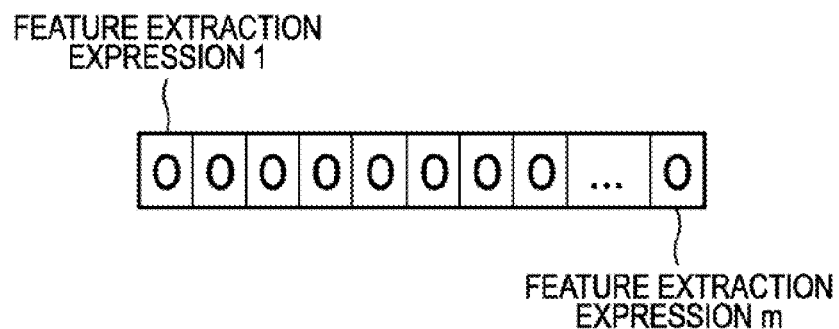
FIGS. 23A and 23B illustrate processing performed by the machine learning section.
Figure 23B:
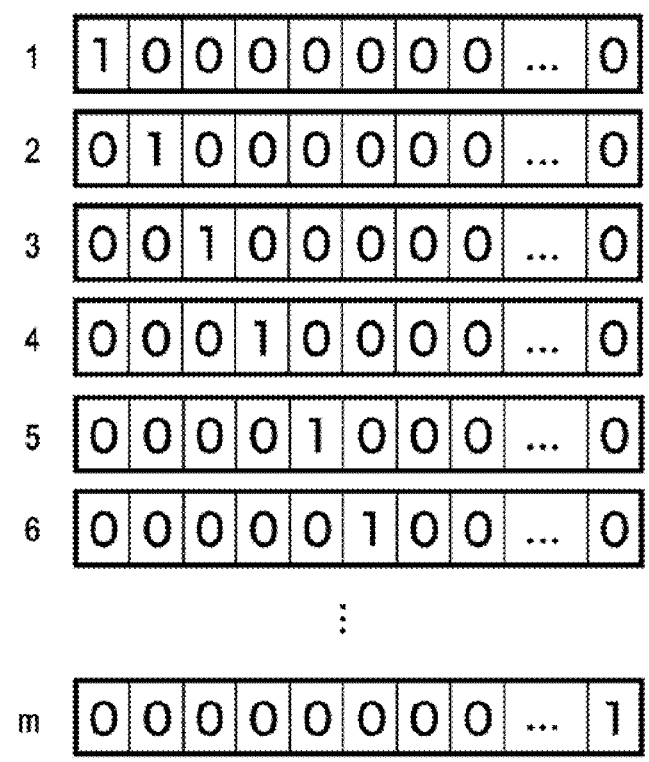

First, on the basis of a reference state (shown in FIG. 23A) in which any of the current-generation feature extraction expressions 1 to m is not used (i.e., the feature extraction expressions 1 to m are not in use), the machine learning section 34 determines a use combination of m feature extraction expressions (shown in FIG. 23B), use/not-use of each feature extraction expression being sequentially inverted. In FIGS. 23A and 23B, in the arrangement of 0s and 1 in one row, "1" indicates a case in which each of the feature extraction expressions 1 to m is used and "0" indicates a case in which each of the feature extraction expressions 1 to m is not used, and use or not-use of the feature extraction expressions 1, 2, 3, ..., and m is represented sequentially from the left side in one row.

Next, the machine learning section 34 generates (estimates) an abnormal-sound discrimination expression U with respect to each of the use combinations of the m feature extraction expressions. The abnormal-sound discrimination expression U is given by:

$$U=b_1X_1+b_2X_2+b_3X_3+,\ldots,+b_mX_m+b_0 \quad (1)$$

where $X_1$ to $X_m$ indicate the amounts of features resulting from the feature extraction expressions 1 to m, $b_1$ to $b_m$ indicate linear combination coefficients, and $b_0$ indicates an intercept.

In expression (1), the value of the linear combination coefficient for the amount of features of each feature extraction expression that is not used is zero.

A least-squares method can be used in order to determine the linear combination coefficients $b_1$ to $b_m$ and the intercept $b_0$. That is, when the kth one (true value) of the label data of the data $D_1$ to $D_n$, the label data being supplied from the amount-of-feature calculating section 33, is represented by $U_k$ and an estimation value of the true value $U_k$ obtained from expression (1) is represented by $U_k'$, an estimation error $e_k$ therefor can be given by: $e_k=(U_k-U_k')$. Determining the linear combination coefficients $b_1$ to $b_m$ and the intercept $b_0$ with which squared error "$E=\Sigma e_k^2$" of the estimation errors $e_k$ with respect to each label data of the data $D_1$ to $D_n$ becomes the smallest makes it possible to determine an optimum linear combination coefficients $b_1$ to $b_m$ and an optimum intercept $b_0$.

For example, the determined abnormal-sound discrimination expression U is given by:

$$U=0.5\times X_1+0.3\times X_2-0.0\times X_3+,\ldots,+0.7X_m+0.2.$$

In this example of the abnormal-sound discrimination expression U, the linear combination coefficients, $b_1$, $b_2$, $b_3$, ..., and $b_m$ are 0.5, 0.3, 0.0, ..., and 0.7, respectively, the intercept $b_0$ is 0.2, and the amount of features resulting from the feature extraction expression 3 for which the linear combination coefficient is zero is not used.

Next, the machine learning section 34 calculates an evaluation value of the abnormal-sound discrimination expression U generated with respect to each of the use combinations of the m feature extraction expressions. Hereinafter, the evaluation value of the abnormal-sound discrimination expression U is referred to as an "evaluation reference value" so that it is distinguished from the evaluation value of each feature extraction expression.

For example, AIC (Akaike Information Criterion) can be employed for an evaluation function for determining the evaluation reference value. AIC is a function expressing that a smaller value is better (i.e., has a higher evaluation) and is given by:

$$AIC = n \times (\log(2 \times PI) + 1 + \log(\|E\|^2 \div n)) + 2 \times (m' + 1) \quad (2)$$

where n indicates the number of pieces of teacher data, i.e., the number of pieces of data supplied from the learning-data cutout section 31, and pI indicates the circumference of a circle. "$\|E\|^2 \div n$" indicates a mean square error for each piece of data $D_1$ to $D_n$, and m' indicates the number of feature extraction expressions used.

FIG. 24 shows evaluation reference values of respective abnormal-sound discrimination expressions U generated with respect to the use combinations of the m feature extraction expressions shown in FIG. 23B.

The machine learning section 34 selects, as a next reference state, the use-combination of feature extraction expressions which has a highest evaluation (which has a smallest evaluation reference value). In the example shown in FIG. 24, the evaluation reference value of the abnormal-sound discrimination expression U for the use combination in which only the feature extraction expression 4 is used is the smallest. Thus, as shown in FIG. 25, the machine learning section 34 selects, as a next reference state, the use combination in which only the feature extraction expression 4 is used.

Figure 26:
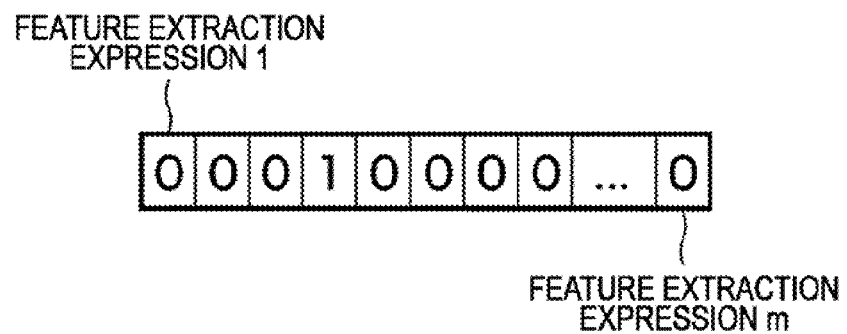
FIGS. 26A and 26B illustrate processing performed by the machine learning section.

With respect to the use combination (the reference state shown in FIG. 26A) in which only the feature extraction expression 4 is used, the machine learning section 34 determines use combinations of m feature extraction expressions, the use/not-use of each feature extraction expression being sequentially inverted, as shown in FIG. 26B.

The machine learning section 34 repeats processing for determining a next reference state by generating (estimating) abnormal-sound discrimination expressions U for the determined use combinations of the m feature extraction expressions and calculating evaluation reference values of the abnormal-sound discrimination expressions U. The above-described determination of the reference state, generation of the abnormal-sound discrimination expressions U, and calculation of the evaluation reference values thereof are repeated until no more evaluation reference value is updated, that is, until a smaller evaluation reference value is not calculated.

When an abnormal-sound discrimination expression U for which no more evaluation reference value is updated is obtained, the machine learning section 34 determines evaluation values of the feature extraction expressions 1 to m, on the basis of the linear combination coefficients for the obtained abnormal-sound discrimination expression U.

Specifically, the machine learning section 34 calculates a contribution rate $C_i$ of the ith amount of features as an evaluation value of the feature extraction expression i, as given by:

$$C_i=b_i \div \text{StDev}(X_i) \times \text{StDev}(T) \times \text{Correl}(X_i,T) \quad (3).$$

where $\text{StDev}(X_i)$ indicates a standard deviation of the value (the amount of features $X_i$) of the feature extraction expression i for the data $D_1$ to $D_n$ and $\text{StDev}(T)$ indicates standard deviations of label data T of the data $D_1$ to data $D_n$. $\text{Correl}(T)$ indicates a Pearson's correlation coefficient between the value (the amount of features $X_i$) of the feature extraction expression i for the data $D_1$ to $D_n$ and the label data T thereof.

The evaluation values of the feature extraction expressions 1 to m calculated as described above are supplied, together with the generated abnormal-sound discrimination expression U, to the feature-extraction-expression list generating section 32.

When a predetermined completion condition is satisfied, for example, when processing for generating a next-generation feature extraction expression is performed a predetermined number of times, the machine learning section 34 supplies the last-generation feature extraction expressions and the abnormal-sound discrimination expression U to the amount-of-feature extraction algorithm output section 35. The last-generation feature extraction expressions are obtained from the feature-extraction-expression list generating section 32 or the amount-of-feature calculating section 33.

The amount-of-feature extraction algorithm output section 35 supplies the last-generation feature extraction expressions and the abnormal-sound discrimination expression U, supplied from the machine learning section 34, to the tradeoff analyzing section 14 (shown in FIG. 1).

Detailed processing of the tradeoff analyzing section 14 will be described next.

By using the algorithm (the abnormal-sound evaluation expression U) configured by the automatic algorithm-configuring section 13 as the first Pareto optimum solution, the tradeoff analyzing section 14 determines new Pareto optimal solutions by performing tradeoff analysis using two evaluation indices, i.e., an algorithm execution speed and an accuracy. For search of the Pareto optimal solutions to determine the new Pareto optimal solutions, the tradeoff analyzing section 14 employs a simple genetic algorithm for generating a next Pareto optimal solution candidate through only mutation from an amount-of-feature extraction algorithm that is a current Pareto optimum solution.

The Pareto optimal solutions will now be described with reference to FIG. 27.

For evaluating an algorithm by using two evaluation indices, when another solution having a high evaluation in all evaluation indices does not exist, the solution in question can be regarded as a Pareto optimal solution. In contrast, when another solution having a high evaluation in all evaluation indices exists, the solution in question is not a Pareto optimal solution. In FIG. 27, black circles represent Pareto optimal solutions and white circles represent non-Pareto optimal solutions.

Figure 27:
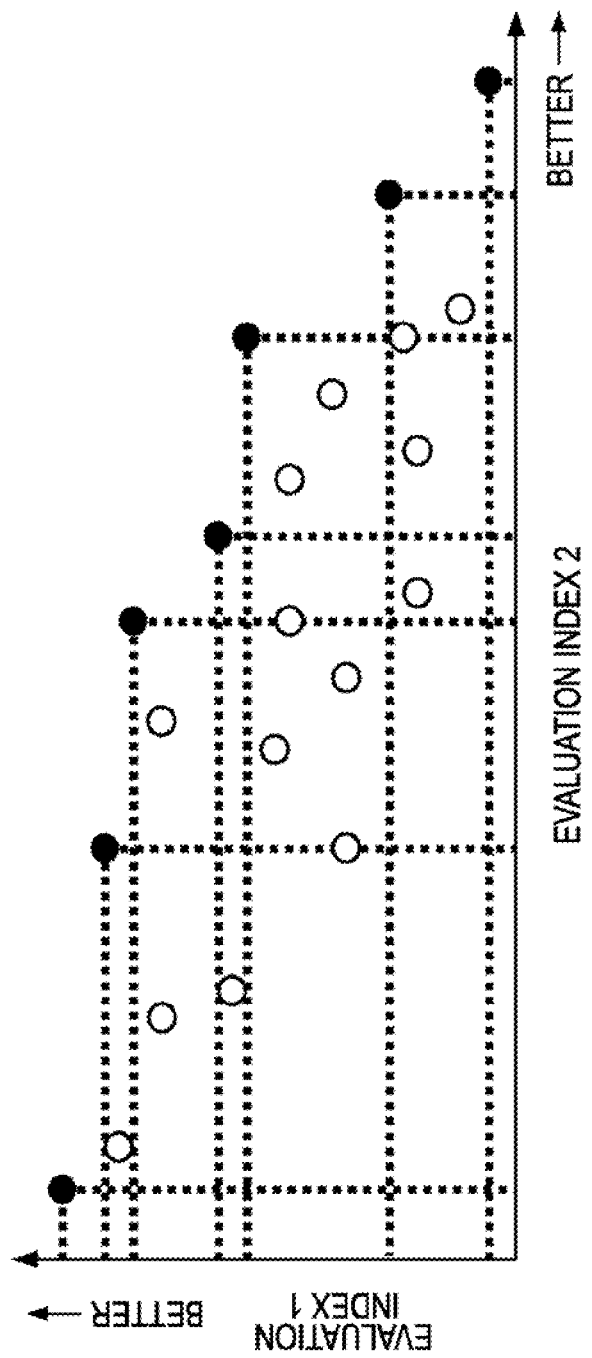
FIG. 27 illustrates Pareto optimal solutions.

In order to determine abnormal-sound discrimination expressions U as Pareto optimal solutions, as shown in FIG. 27, the tradeoff analyzing section 14 first initializes Pareto optimal solutions. That is, the tradeoff analyzing section 14 sequentially sets the feature extraction expressions, included in the abnormal-sound discrimination expression U configured by the automatic algorithm-configuring section 13, one by one in ascending order of label-data correlations (Correl (T) noted above) of the feature extraction expressions so that the feature extraction expressions are not used. By doing so, the tradeoff analyzing section 14 generates multiple abnormal-sound discrimination expressions U in which the number of feature extraction expressions used are different from each other by one. In this case, the maximum number of feature extraction expressions is the number of feature extraction expressions included in the abnormal-sound determination expression U configured by the automatic algorithm-configuring section 13 and the minimum number of feature extraction expressions is one.

Generating abnormal-sound discrimination expressions U, each having a different number of feature extraction expressions to be used, on the basis of the abnormal-sound discrimination expression U configured by the automatic algorithm-configuring section 13 is referred to as Pareto-optimal-solution initialization. Since the abnormal-sound discrimination expression U supplied from the automatic algorithm-configuring section 13 does not necessarily use all feature extraction expressions, the number of feature extraction expressions included in the abnormal-sound discrimination expression U configured by the automatic algorithm-configuring section 13 may be smaller than m. In the present embodiment, however, for simplification of description, a description will be given assuming that the abnormal-sound discrimination expression U supplied from the automatic algorithm-configuring section 13 uses all feature extraction expressions.

The Pareto-optimal-solution initialization will be further described with reference to FIGS. 28 to 31.

As shown in FIG. 28, the tradeoff analyzing section 14 creates a list including average times (average calculation times) taken for calculating the respective feature extraction expressions and label-data correlation coefficients calculated using the respective feature extraction expressions. The average calculation times can be determined by calculating the input data $D_1$ to $D_n$ and the correlation coefficients can be determined by Correl(T) in expression (3).

Next, the tradeoff analyzing section 14 sets, of feature extraction expressions in use, a feature extraction expression having a smallest correlation coefficient so that the feature extraction expression is not used, and uses only the amounts of features extracted using the remaining feature extraction expressions to determine linear combination coefficients $b_1$ to $b_m$ and intercept $b_0$ and determines a new abnormal-sound discrimination expression U. The tradeoff analyzing section 14 also calculates a time (a total calculation time) taken and an accuracy (estimated accuracy) obtained when the newly determined abnormal-sound discrimination expression U is used to perform abnormal-sound discrimination.

In the example of the data shown in FIG. 28, the correlation coefficient of the feature extraction expression 3 is 0.05, which is the lowest, and thus, the feature extraction expression 3 is set so that it is not used, as shown in FIG. 29. Subsequently, a new abnormal-sound discrimination expression U and an accuracy thereof when the feature extraction expressions 1 to m except the feature extraction expression 3 are used are determined, and a total calculation time excluding the calculation time (0.11 ms) taken for the feature extraction expression 3 is calculated.

Similarly, the feature extraction expressions are sequentially set one by one in ascending order of the correlation coefficients so that the feature extraction expressions are not used, new abnormal-sound discrimination expressions U are determined, and total calculation times and accuracies are calculated. A list of Pareto optimal solution candidates shown in FIG. 30 is then created.

The tradeoff analyzing section 14 extracts only Pareto optimal solutions (i.e., deletes non-Pareto optimal solutions) from the Pareto-optimal-solution candidate list shown in FIG. 30. More specifically, of the abnormal-sound discrimination expressions U including a solution 1 using m feature extraction expressions to a solution m using only one feature extraction expression (each solution is a Pareto optimal solution candidate), solutions 3 to 5 each having another solution with a higher accuracy and a shorter total calculation time are deleted as non-Pareto optimal solutions and the remaining solutions are used as Pareto optimal solutions.

Figure 31:
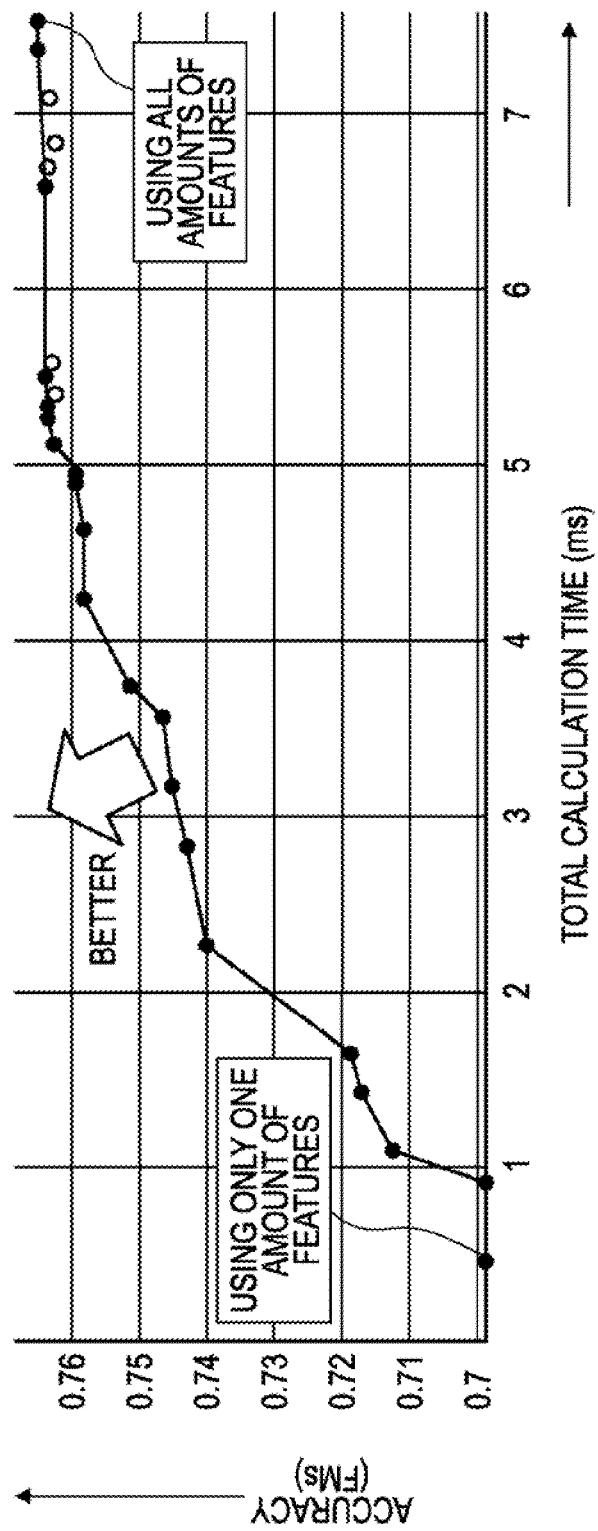
FIG. 31 illustrates the Pareto-optimal-solution initialization.

In general, when the number of feature extraction expressions decreases, the accuracy tends to decrease although the amount of the total calculation time becomes small. Thus, the total calculation times and the accuracies of the abnormal-sound discrimination expressions U generated by the Pareto-optimal-solution initialization can be plotted onto a graph as shown in FIG. 31. The horizontal axis on the graph in FIG. 31 indicates a total calculation time (ms) and the vertical axis indicates an accuracy in F value (FMs: F-measures).

As a result of the Pareto-optimal-solution initialization described above, Pareto optimal solutions in an initial state are determined.

Next, the tradeoff analyzing section 14 causes mutation of the Pareto optimal solutions in the initial state to generate new solutions to thereby perform Pareto-optimal-solution update for searching for better Pareto optimal solutions. When the Pareto optimal solutions are updated to better Pareto optimal solutions, the line connecting the Pareto optimal solutions shifts in the upper left direction, as shown by an arrow in FIG. 31.

More specifically, the tradeoff analyzing section 14 randomly selects one of the Pareto optimal solutions in the initial state, and generates a new solution in which use or not-use of (e.g., one to three) feature extraction expressions of the selected solution is randomly changed.

Figure 32:
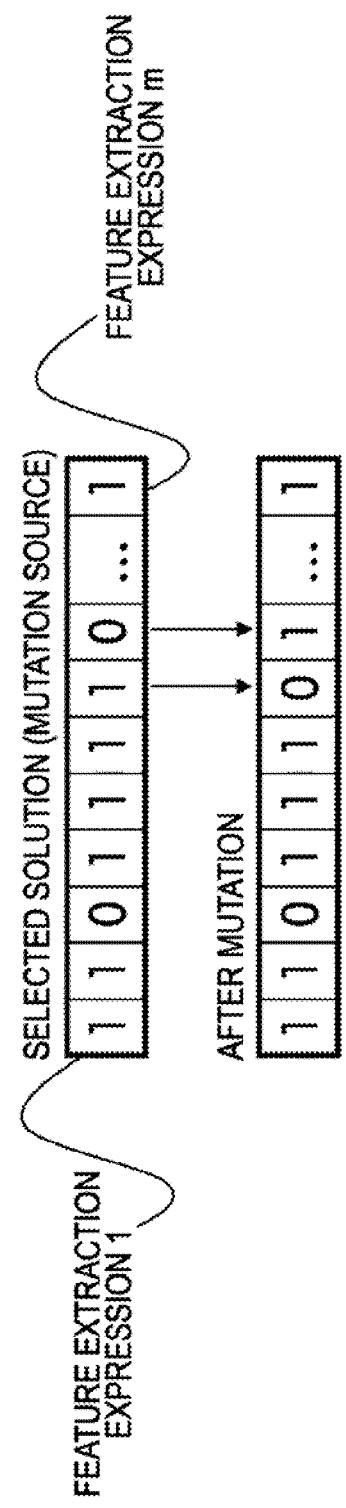
FIG. 32 illustrates Pareto-optimal-solution update.

FIG. 32 shows an example of mutation in which the feature extraction expression 7 in the selected solution is changed from "use" to "not-use" and the feature extraction expression 8 is changed from "not-use" to "use" to thereby generate a new solution.

The tradeoff analyzing section 14 then calculates a total calculation time and an accuracy with respect to the new solution, recreates the list shown in FIG. 30, and deletes non-Pareto optimal solutions.

The tradeoff analyzing section 14 executes processing for searching for better Pareto optimal solutions by randomly reselecting one of the remaining Pareto solutions and generating a new solution through mutation on the basis of the selected solution, until a completion condition is satisfied, for example, until the processing is repeated a predetermined number of times.

Figure 33:
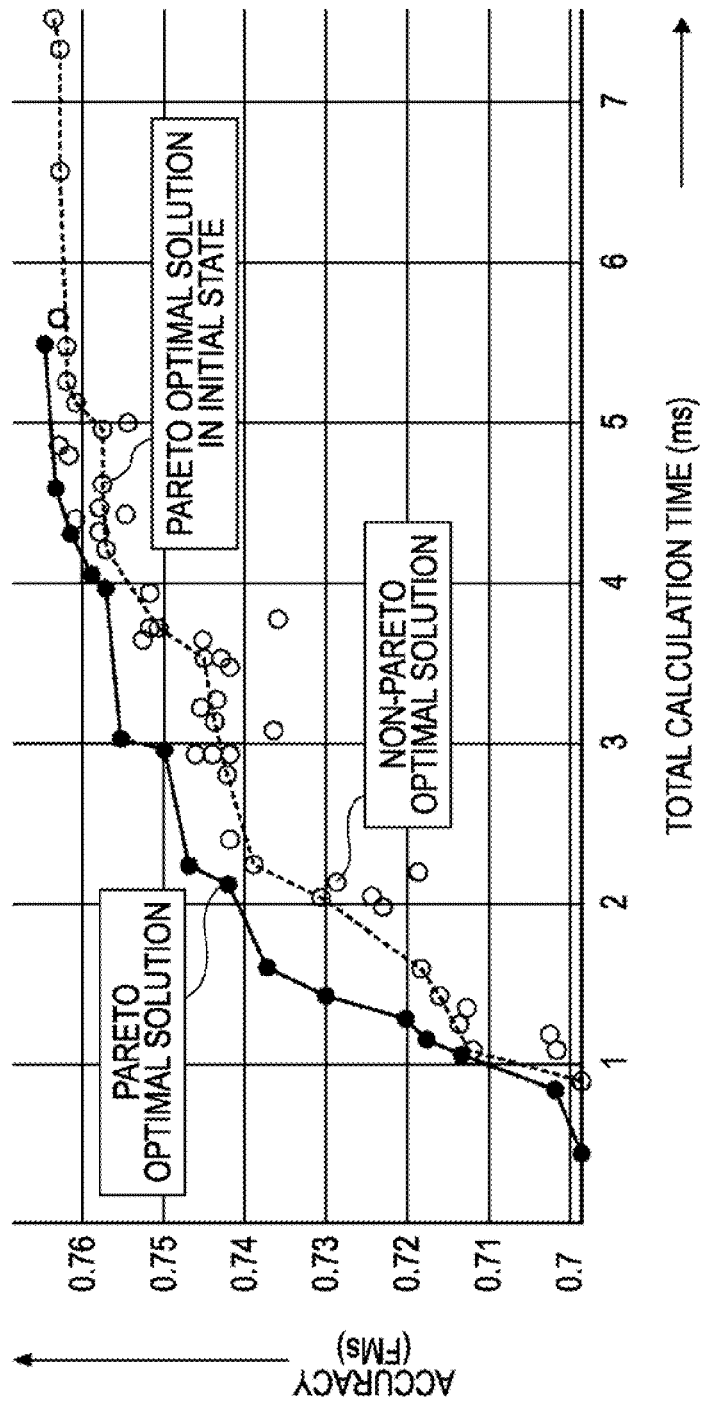
FIG. 33 is a graph illustrating the Pareto-optimal-solution update.

FIG. 33 shows Pareto optimal solutions obtained after the processing for searching for Pareto optimal solutions is repeated 200 times from the Pareto optimal solutions in the initial state.

In FIG. 33, a solid line connecting black circles represents Pareto optimal solutions obtained after the processing is repeatedly executed 200 times and a dotted line represents the Pareto optimal solutions in the initial state. White circles (○) represent non-Pareto optimal solutions calculated by the Pareto-optimal-solution search processing.

Figure 34:
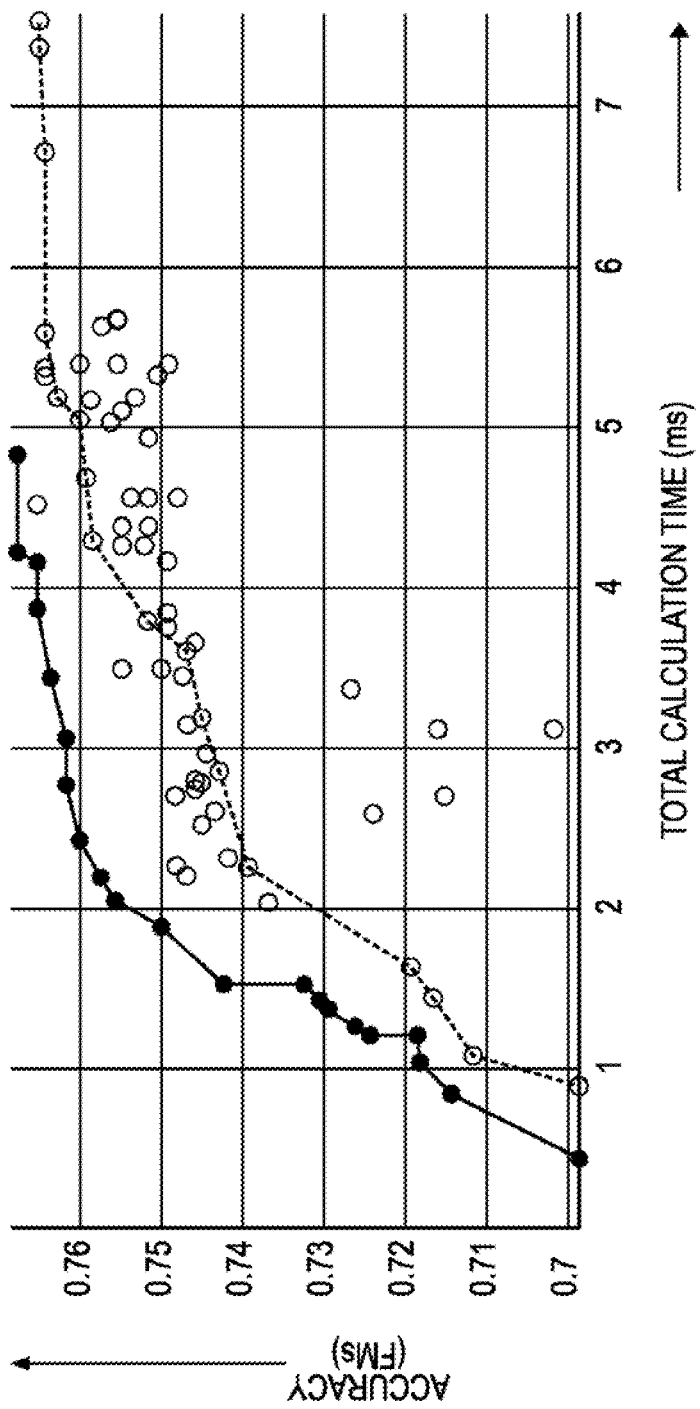
FIG. 34 is a graph illustrating the Pareto-optimal-solution update.
Figure 35:
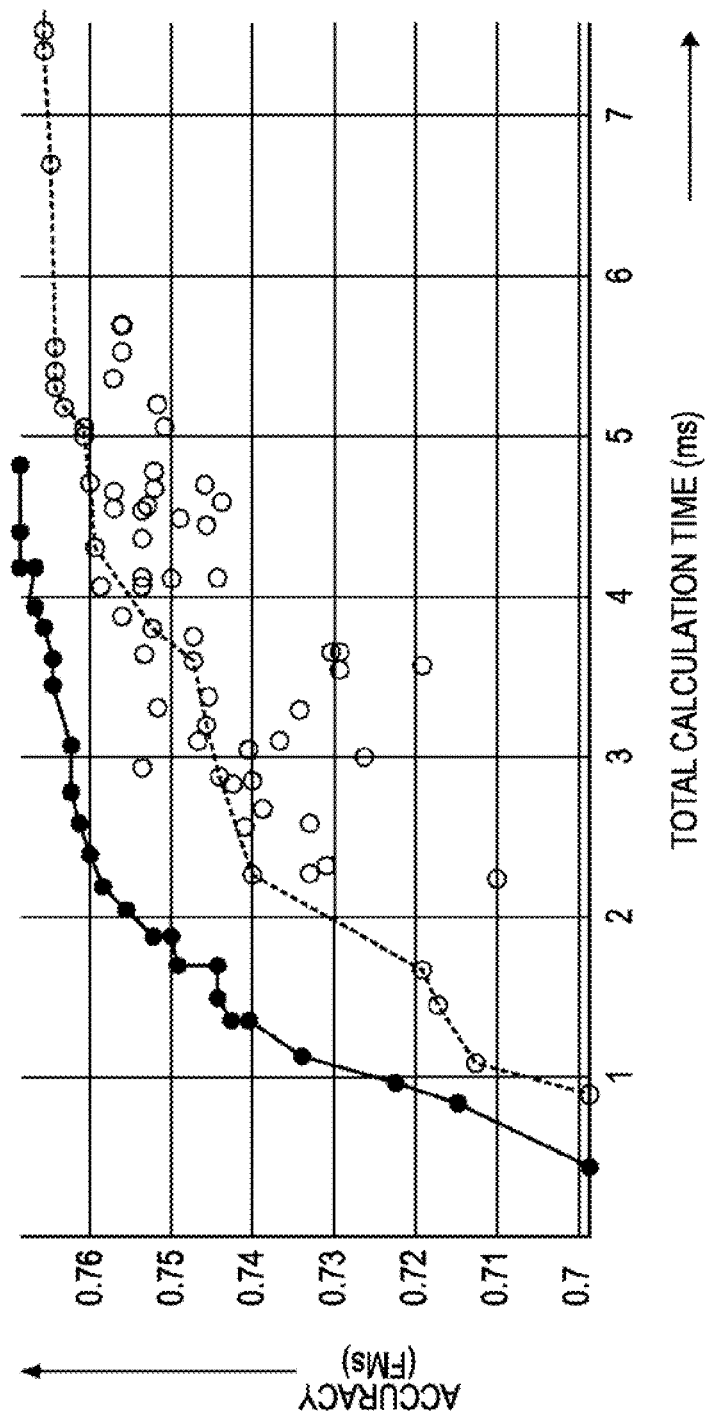
FIG. 35 is a graph illustrating the Pareto-optimal-solution update.

Similarly, FIG. 34 shows Pareto optimal solutions after the Pareto-optimal-solution search processing is repeatedly executed 1000 times and FIG. 35 shows Pareto optimal solutions after the search processing is repeatedly executed 5000 times. The larger number of times the search processing is repeated, the better Pareto optimal solutions can be obtained. However, a significant difference is not recognized between the case in which the processing is executed 1000 times and the case in which the processing is executed 5000 times, and it can thus be understood that satisfactory Pareto optimal solutions can be obtained by executing the processing a predetermined number of times.

Next, a description will be given of processing of the use-algorithm determining section 16 and the automatic abnormal-sound-discrimination section 18.

On the basis of the requested processing time and the accuracy, the use-algorithm determining section 16 determines an optimum algorithm out of the algorithms (the abnormal-sound discrimination expressions U) serving as Pareto optimal solutions determined by the tradeoff analyzing section 14 and stored in the Pareto-optimal-solution storage section 15, as described above. The use-algorithm determining section 16 then supplies the determined optimum algorithm to the automatic abnormal-sound-discrimination section 18.

Figure 36:
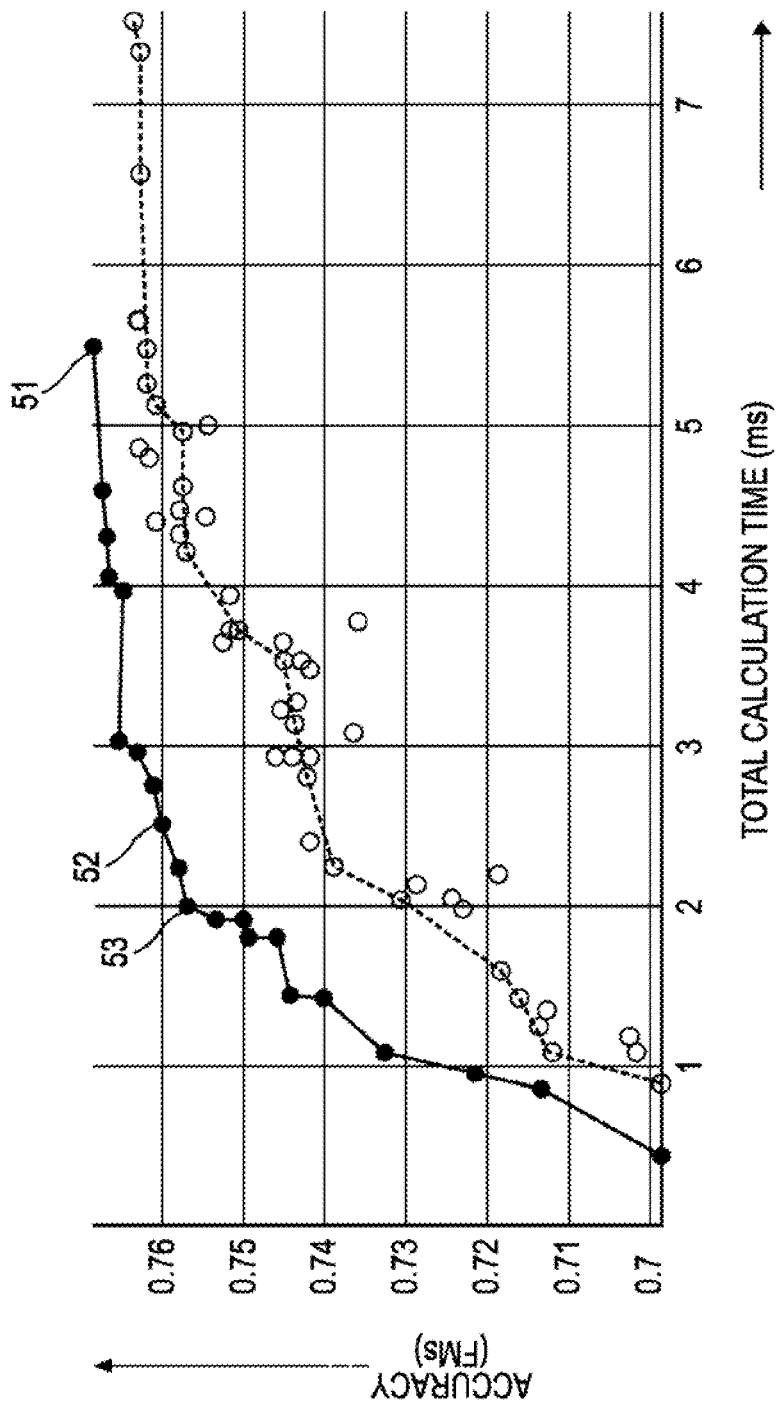
FIG. 36 illustrates optimum algorithm determination.

For example, when there are sufficient resources and there is a request for a highest performance (a highest accuracy) even with an increased amount of processing time, the use-algorithm determining section 16 determines an algorithm (an abnormal-sound discrimination expression U) of a Pareto optimal solution 51 having a highest accuracy, as shown in FIG. 36, and supplies the determined algorithm to the automatic abnormal-sound-discrimination section 18.

For example, when it is requested that the accuracy be 0.76 (FMs) or more, the use-algorithm determining section 16 determines an algorithm (an abnormal-sound discrimination expression U) of a Pareto optimal solution 52 having a shortest total calculation time (processing time) while satisfying the request, and supplies the determined algorithm to the automatic abnormal-sound-discrimination section 18.

In addition, when it is requested that the processing time per piece of data be 2 ms or less as the total calculation time (processing time), the use-algorithm determining section 16 determines an algorithm (an abnormal-sound discrimination expression U) of a Pareto optimal solution 53 and supplies the determined algorithm to the automatic abnormal-sound-discrimination section 18.

Figure 37:
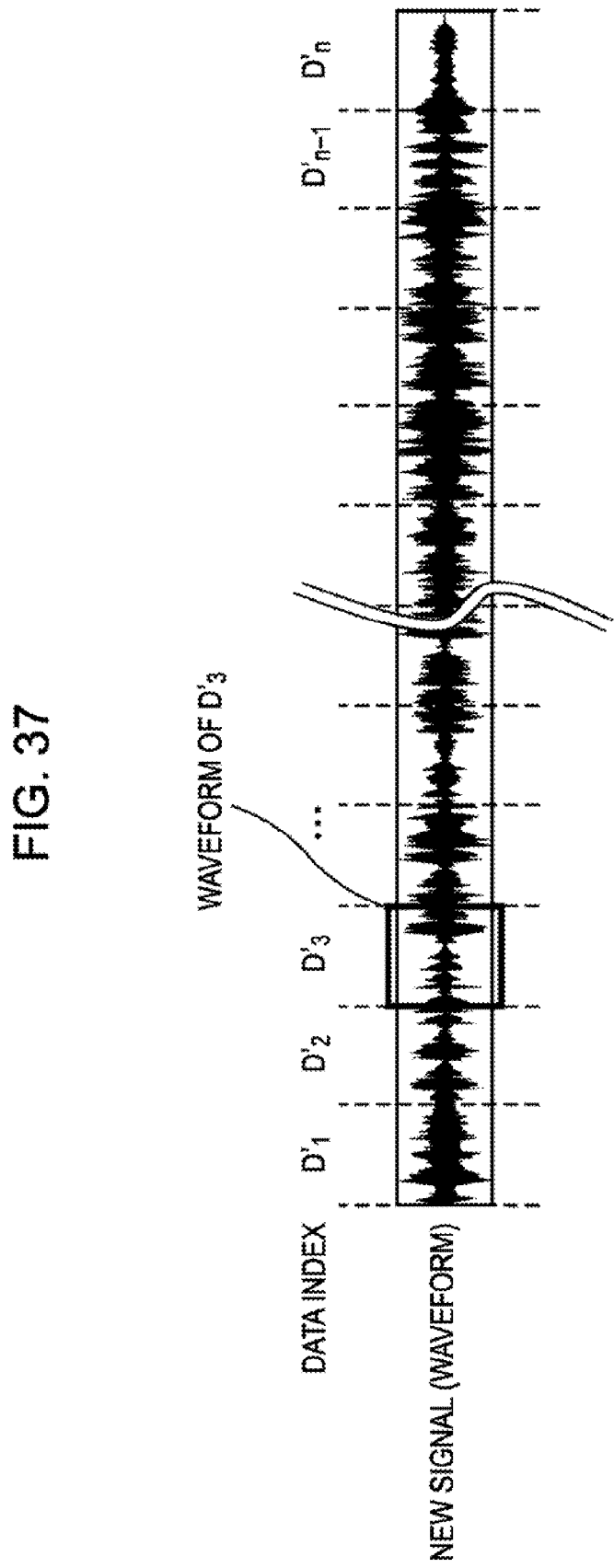
FIG. 37 illustrates abnormal-sound discrimination processing.

As shown in FIG. 37, the automatic abnormal-sound-discrimination section 18 divides a new signal, supplied from the new-signal input section 17, into signals in unit times which are similar to those in the learning-data cutout section 31. The automatic abnormal-sound-discrimination section 18 then discriminates whether or not each divided new signal per unit time is an abnormal sound or a normal sound by using the algorithm supplied from the use-algorithm determining section 16, and supplies a discrimination result to the abnormal-sound discrimination result output section 19. As described above, the discrimination result of the new signal per unit time is also supplied to the sample-signal storage section 12 for storage.

The automatic algorithm-configuration processing performed by the automatic algorithm-configuring section 13 will be described next with reference to a flowchart shown in FIG. 38.

First, in step S1, the learning-data cutout section 31 cuts out learning data stored in the sample-signal storage section 12 and supplies the learning data to the amount-of-feature calculating section 33 and the machine learning section 34. More specifically, the learning-data cutout section 31 cuts out data $D_1$ to $D_n$ from learning data, supplies the data $D_1$ to $D_n$ to the amount-of-feature calculating section 33, and supplies the label data of the data $D_1$ to $D_n$ to the machine learning section 34.

In step S2, on the basis of evaluation values of current-generation feature extraction expressions 1 to m, the evaluation values being supplied from the machine learning section 34, the feature-extraction-expression list generating section 32 executes feature-extraction-expression list generation processing for generating next-generation feature extraction expressions 1 to m (a feature-extraction-expression list). The processing in step S2 is repeatedly performed. When the processing in step S2 is performed for the first time, the current-generation feature extraction expressions 1 to m do not exist and thus next-generation feature extraction expressions 1 to m are generated through the random generation. Details of the feature-extraction-expression list generation processing are described below with reference to FIG. 39.

In step S3, the amount-of-feature calculating section 33 executes amount-of-feature calculation processing. That is, with respect to the respective data $D_1$ to $D_n$ supplied from the learning-data cutout section 31, the amount-of-feature calculating section 33 performs calculation in accordance with the feature extraction expressions 1 to m supplied from the feature-extraction-expression list generating section 32, and supplies calculation results, i.e., the amounts of features of the data $D_1$ to $D_n$, to the machine learning section 34. Details of the amount-of-feature calculation processing are described below with reference to FIG. 46.

In step S4, the machine learning section 34 executes machine learning processing. That is, by using the amounts of features of the data $D_1$ to $D_n$, the amounts being supplied from the amount-of-feature calculating section 33, the machine learning section 34 estimates an abnormal-sound discrimination expression U that uses feature extraction expressions and that best matches the label data of the data $D_1$ to $D_n$ supplied from the learning-data cutout section 31. The machine learning section 34 determines evaluation values of the respective feature extraction expressions when the estimated abnormal-sound discrimination expression U is used and supplies the determined evaluation values to the feature-extraction-expression list generating section 32. Details of the machine learning processing are described below with reference to FIG. 47.

In step S5, the machine learning section 34 determines whether or not a completion condition is satisfied. More specifically, for example, when the processing in step S2 to S4 is repeatedly executed a predetermined number of times or when an operation for stopping is detected, the machine learning section 34 determines that the completion condition is satisfied.

When it is determined in step S5 that the completion condition is not satisfied, the process returns to step S2 and the processing subsequent thereto is repeated.

On the other hand, when it is determined in step S5 that the completion condition is satisfied, the process proceeds to step S6. In step S6, the machine learning section 34 supplies the last-generation feature extraction expressions and the abnormal-sound discrimination expression U to the amount-of-feature extraction algorithm output section 35. The amount-of-feature extraction algorithm output section 35 then outputs the last-generation feature extraction expressions and the abnormal-sound discrimination expression U to the tradeoff analyzing section 14, thereby ending the processing.

The feature-extraction-expression list generation processing executed in step S2 shown in FIG. 38 will be described next with reference to a flowchart shown in FIG. 39.

In step S21, the feature-extraction-expression list generating section 32 determines whether or not a feature-extraction-expression list to be generated is a second generation or later.

When it is determined in step S21 that the feature-extraction-expression list to be generated is not a second generation or later, that is, is a first generation, the process proceeds to step S22. In step S22, the feature-extraction-expression list generating section 32 executes random generation processing, which is described below with reference to FIG. 40.

When it is determined in step S21 that the feature-extraction-expression list is a second generation or later, the process proceeds to step S23. In step S23, the feature-extraction-expression list generating section 32 executes next-generation list generation processing, which is described below with reference to FIG. 41.

After the processing in step S22 or S23 is completed, the process proceeds to step S24 in which the feature-extraction-expression list generating section 32 supplies the feature-extraction-expression list, generated by the processing in step S22 or S23, to the amount-of-feature calculating section 33. The process then returns to step S2 shown in FIG. 38 and proceeds to step S3.

As described above, for the first generation, all feature extraction expressions are randomly generated, and for the second generation or later, a next-generation list generation processing is performed using the genetic search technique.

Figure 39:
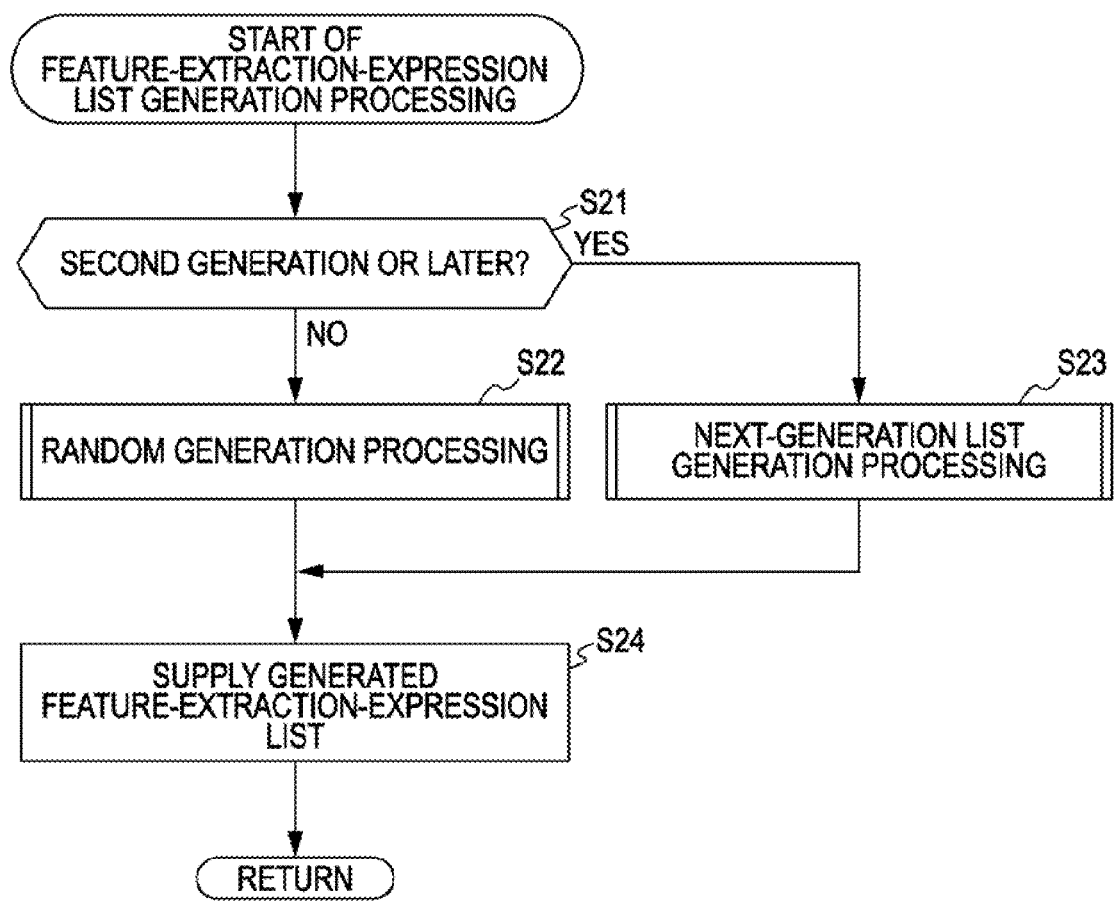
FIG. 39 is a flowchart illustrating feature-extraction-expression list generation processing.
Figure 40:
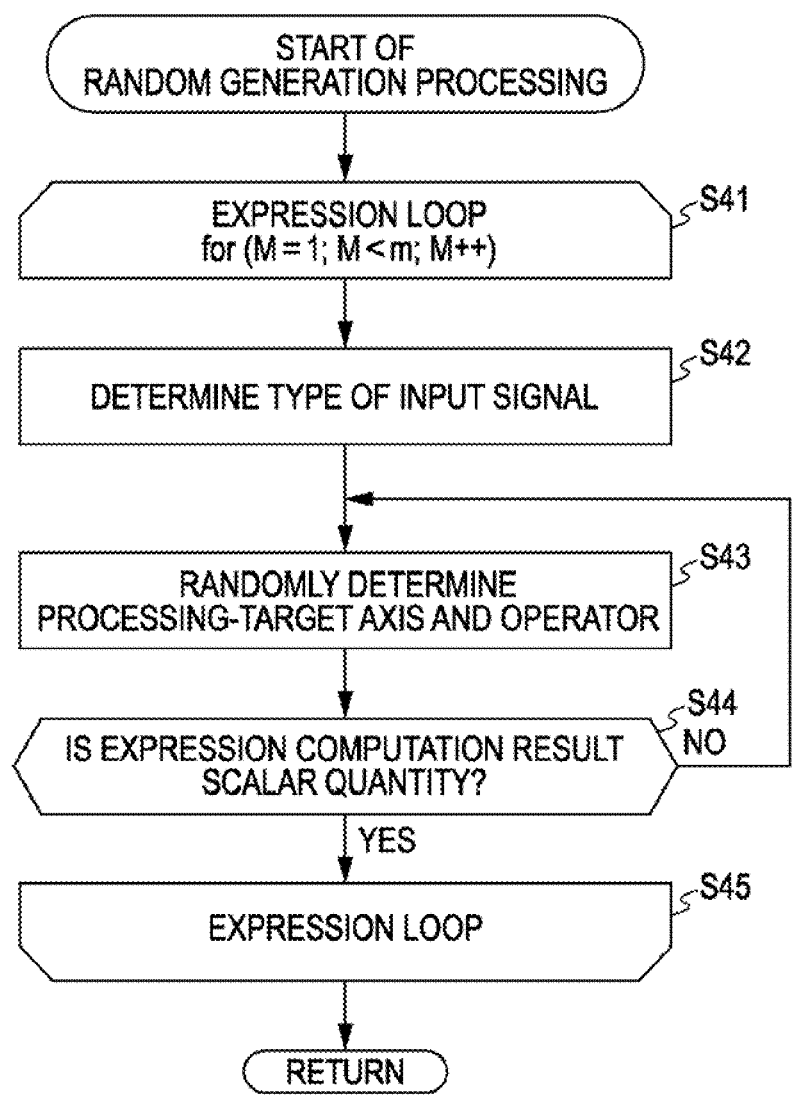
FIG. 40 is a flowchart illustrating random generation processing.

The random generation processing executed in step S22 shown in FIG. 39 will be described next with reference to a flowchart shown in FIG. 40.

In step S41, the feature-extraction-expression list generating section 32 initializes an expression loop parameter M to 1 and starts an expression loop. The expression loop is repeated a number of times corresponding to the number "m" of feature extraction expressions included in the feature-extraction-expression list.

In step S42, the feature-extraction-expression list generating section 32 determines a type of an input signal of the Mth feature extraction expression (hereinafter, also referred to as "feature extraction expression [M]"). In the present embodiment, it is determined that the type of the input signal is "wav" representing a waveform.

In step S43, the feature-extraction-expression list generating section 32 randomly determines a processing-target axis and one operator for the feature extraction expression [M] to be generated.

In step S44, the feature-extraction-expression list generating section 32 determines whether or not a computation result of the feature-extraction expression [M] that has been generated up to the current point in time is a scalar quantity (a first order value). When it is determined in step S44 that the computation result is not a scalar quantity, the process returns to step S43 and the processing subsequent thereto is repeated, so that one operator is added.

When it is determined in step S44 that the computation result is a scalar quantity, the process proceeds to step S45 in which the feature-extraction-expression list generating section 32 determines whether or not the expression loop parameter M is smaller than the maximum value m. When it is determined in step S45 that the expression-loop parameter M is smaller than the maximum value m, the expression loop parameter M is incremented by 1. The process then returns to step S42 and the processing subsequent thereto is repeated.

On the other hand, when it is determined in step S45 that the expression loop parameter M is not smaller than the maximum value m (i.e., is equal to the maximum value m), the expression loop is exited. The process then returns to step S22 in FIG. 39 and proceeds to step S24.

As a result of the above-described processing, the first-generation feature-extraction-expression list is generated.

Figure 41:
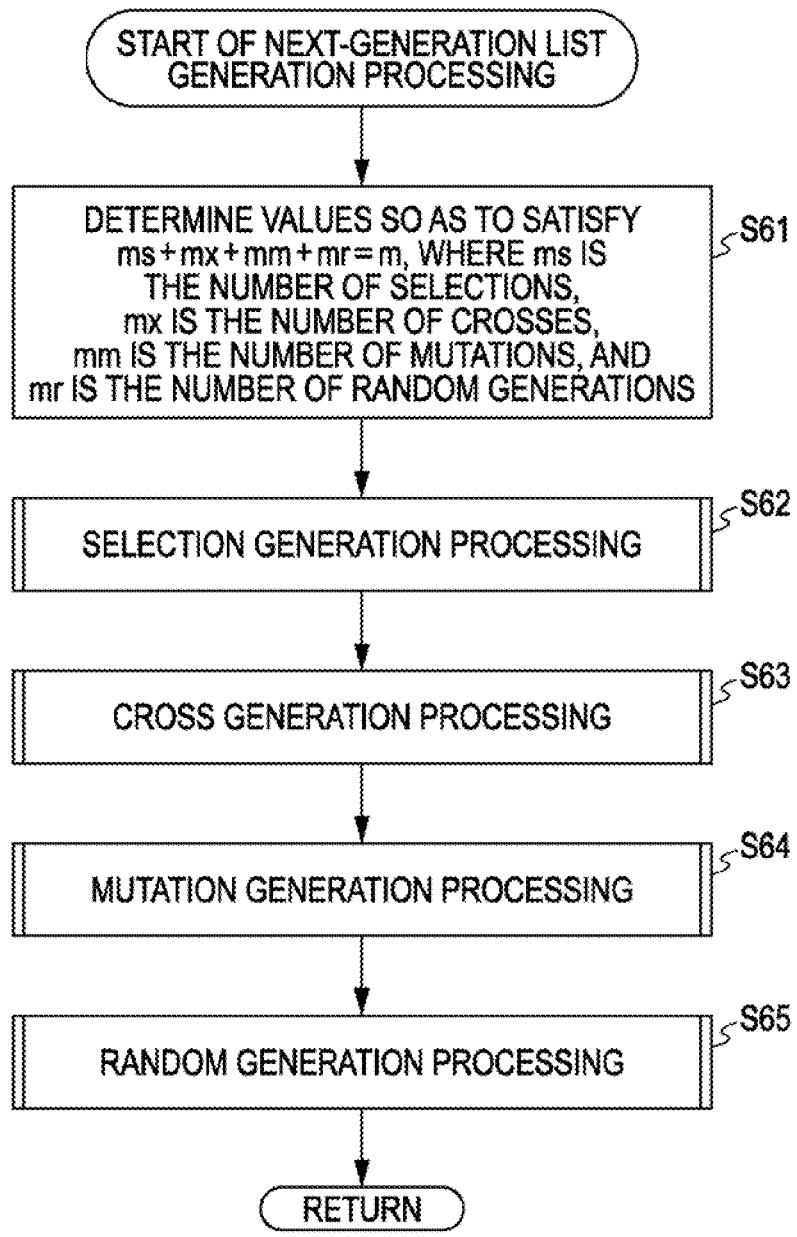
FIG. 41 is a flowchart illustrating next-generation list generation processing.

The next-generation list generation processing executed in step S23 shown in FIG. 39 will be described next with reference to a flowchart shown in FIG. 41.

In step S61, the feature-extraction-expression list generating section 32 determines values so as to satisfy ms+mx+mm+mr=m (the total number of feature extraction expressions), where ms indicates the number of feature extraction expressions (the number of selections) generated by the selection generation processing, mx indicates the number of feature extraction expressions (the number of crosses) generated by the cross generation processing, mm indicates the number of feature extraction expressions (the number of mutations) generated by the mutation generation processing, and mr indicates the number of feature extraction expressions (the number of random generations) generated by the random generation processing.

The ratios of the values may be predetermined or the values may be randomly determined so as to satisfy ms+mx+mm+mr=m.

Figure 42:
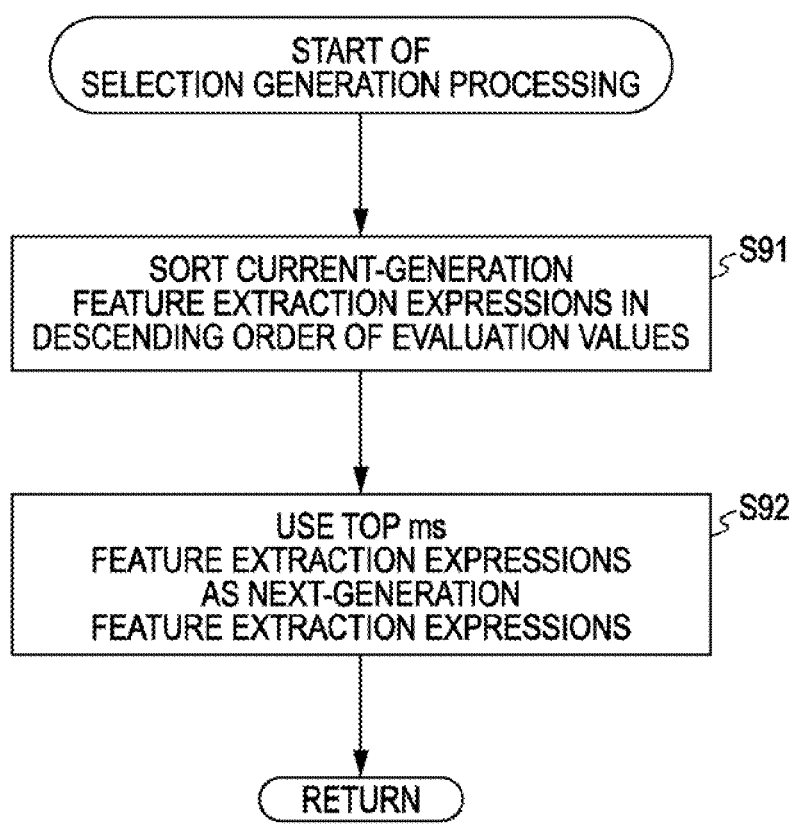
FIG. 42 is a flowchart illustrating selection generation processing.

In step S62, the feature-extraction-expression list generating section 32 executes selection generation processing, which is described below with reference to FIG. 42.

Figure 43:
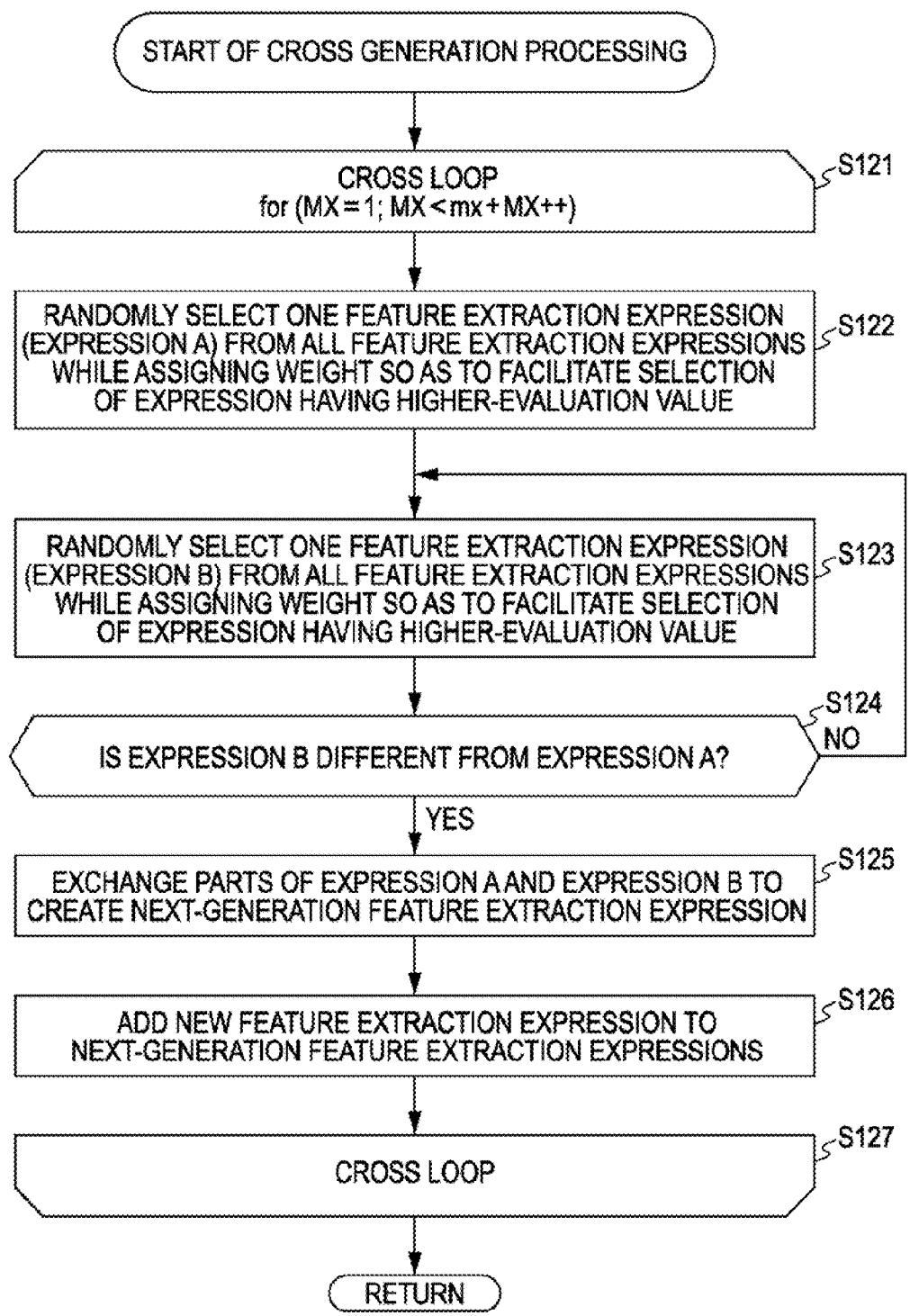
FIG. 43 is a flowchart-illustrating cross generation processing.

In step S63, the feature-extraction-expression list generating section 32 executes cross generation processing, which is described below with reference to FIG. 43.

Figure 44:
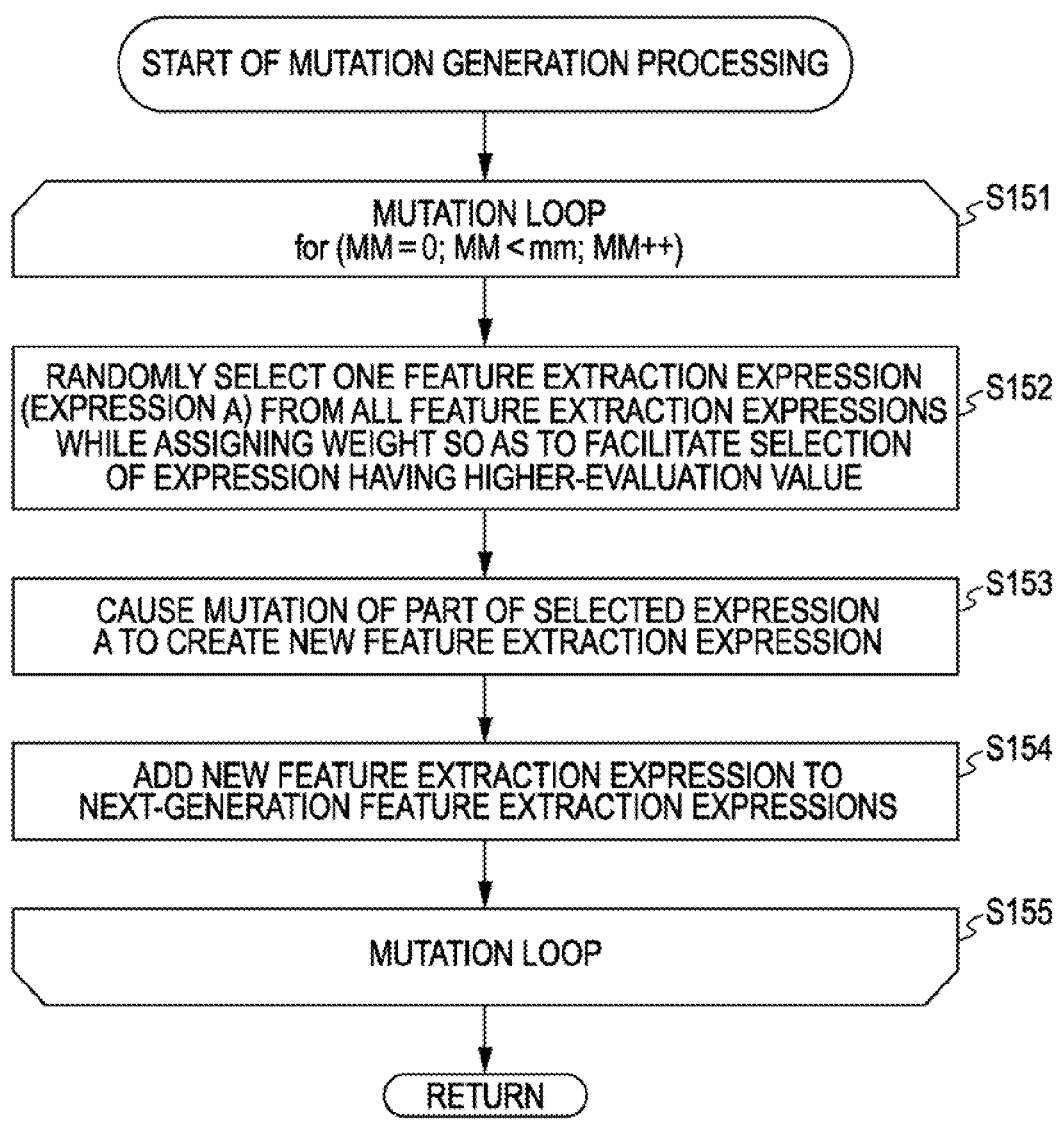
FIG. 44 is a flowchart illustrating mutation generation processing.

In step S64, the feature-extraction-expression list generating section 32 executes mutation generation processing, which is described below with reference to FIG. 44.

Figure 45:
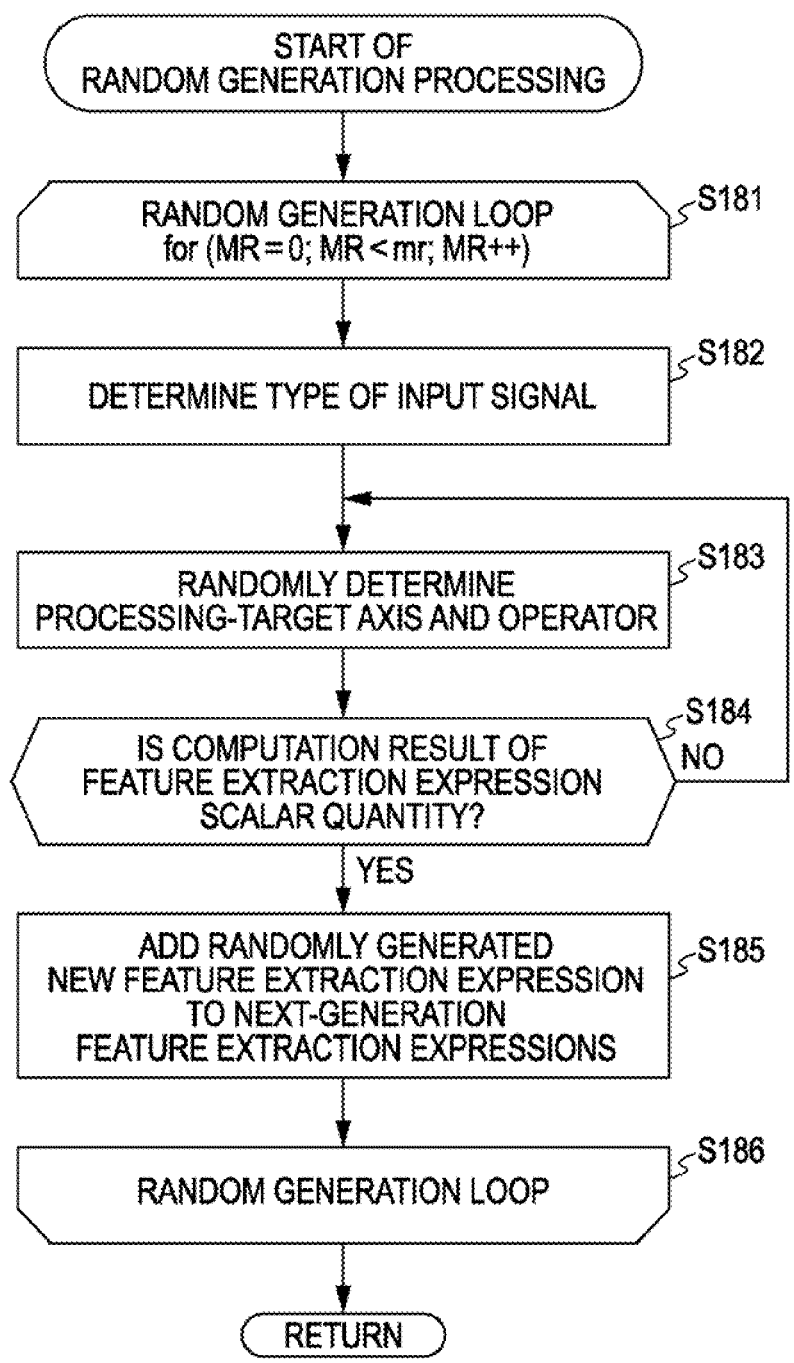
FIG. 45 is a flowchart illustrating random generation processing.

In step S65, the feature-extraction-expression list generating section 32 executes random generation processing, which is described below with reference to FIG. 45. After the random generation processing is competed, the process returns to step S23 in FIG. 39 and proceeds to step S24.

As a result of the above-described processing, the second-generation feature-extraction expression list or later is generated based on the genetic search technique.

The selection generation processing executed in step S62 shown in FIG. 41 will be described next with reference to a flowchart shown in FIG. 42.

In step S91, the feature-extraction-expression list generating section 32 sorts the current-generation feature extraction expressions in descending order of the evaluation values.

In step S92, the feature-extraction-expression list generating section 32 uses top ms feature extraction expressions as next-generation feature extraction expressions. The process then returns to step S62 in FIG. 41 and proceeds to step S63.

As a result of the processing, the feature extraction expressions having higher-evaluation values can be selected and can be copied to the next-generation feature-extraction-expression list.

The cross generation processing executed in step S63 shown in FIG. 41 will be described next with reference to a flowchart shown in FIG. 43.

In step S121, the feature-extraction-expression list generating section 32 initializes a cross loop parameter MX to 1 and starts a cross loop. The cross loop is repeated a number of times corresponding to the number "mx" of crosses.

In step S122, the feature-extraction-expression list generating section 32 randomly selects one expression (referred to as "expression A") from all feature extraction expressions included in the current-generation feature-extraction-expression list while assigning a weight so as to facilitate selection of a feature extraction expression having a higher-evaluation value.

In step S123, the feature-extraction-expression list generating section 32 randomly selects one expression (referred to as "expression B") from all feature extraction expressions included in the current-generation feature-extraction-expression list while assigning a weight so as to facilitate selection of a feature extraction expression having a higher-evaluation value.

In step S124, the feature-extraction-expression list generating section 32 determines whether or not expression B is different from expression A. When it is determined in step S124 that expression B is not different from expression A, the process returns to step S123 and the processing subsequent thereto is repeated, so that expression B is newly selected until it is determined that expression B is different from expression A.

When it is determined in step S124 that expression B is different from expression A, the process proceeds to step S125 in which the feature-extraction-expression list generating section 32 exchanges parts of expressions A and B to create a new feature extraction expression.

In this case, the feature-extraction-expression list generating section 32 combines parts of expressions A and B so that a scalar quantity can be obtained from the input data by computing a feature extraction expression after the combination, that is, so that no contradiction in the processing axes occurs when computation processing is sequentially performed from the beginning.

In step S126, the feature-extraction-expression list generating section 32 adds the new feature extraction expression generated in step S125 to the next-generation feature extraction expressions.

In step S127, the feature-extraction-expression list generating section 32 determines whether or not the cross loop parameter MX is smaller than the number "mx" of crosses, the number "mx" being the maximum value of the cross loop parameter MX. When it is determined in step S127 that the cross-loop parameter MX is smaller than the number "mx" of crosses, the cross loop parameter MX is incremented by 1. The process then returns to step S122 and the processing subsequent thereto is repeated. On the other hand, when it is determined in step S127 that the cross loop parameter MX is not smaller than the number "mx" of crosses, i.e., is equal to the number "mx" of crosses, the cross loop is exited. Thus, the process returns to step S63 in FIG. 41 and proceeds to step S64.

Each time the processing in steps S122 to S126, which form the cross loop, is executed once, one feature extraction expression to be included in the feature extraction expressions in the next-generation feature-extraction-expression list is generated. When the cross loop is completed, mx feature extraction expressions of the feature extraction expressions included in the feature-extraction-expression list are generated.

In such processing, feature extraction expressions in the current-generation feature-extraction-expression list are selected while a weight is being assigned so as to facilitate selection of feature extraction expressions having higher-evaluation values, and the selected feature extraction expressions are used to perform cross generation processing to generate a feature extraction expression included in the next-generation feature-extraction-expression list.

The mutation generation processing executed in step S64 shown in FIG. 41 will be described next with reference to a flowchart shown in FIG. 44.

In step S151, the feature-extraction-expression list generating section 32 initializes a mutation loop parameter MM to 1 and starts a mutation loop. The mutation loop is repeated a number of times corresponding to the number "mm" of mutations.

In step S152, the feature-extraction-expression list generating section 32 randomly selects one feature extraction expression (referred to as "expression A") from all feature extraction expressions included in the current-generation feature-ture-extraction-expression list while assigning a weight so as to facilitate selection of a feature extraction expression having a higher-evaluation value.

In step S153, the feature-extraction-expression list generating section 32 causes mutation by performing processing, for example, changing or deleting a part of the selected expression A or changing a parameter therein, to thereby create a new feature extraction expression.

In this case, the feature-extraction-expression list generating section 32 changes a part of the expression by using such a method that a scalar quantity can be obtained from the input data by computing a feature extraction expression after changing the part of the expression, that is, by using such a method that no contradiction in the processing axes occurs when computation processing is sequentially performed from the beginning.

In step S154, the feature-extraction-expression list generating section 32 adds the new feature extraction expression generated in step S153 to the next-generation feature extraction expressions.

In step S155, the feature-extraction-expression list generating section 32 determines whether or not the mutation loop parameter MM is smaller than the number "mm" of mutations, the number "mm" being the maximum value of the mutation loop parameter MM. When it is determined in step S155 that the mutation loop parameter MM is smaller than the number "mm" of mutations, the mutation loop parameter MM is incremented by 1. The process then returns to step S152 and the processing subsequent thereto is repeated. On the other hand, when it is determined in step S155 that the mutation loop parameter MM is not smaller than the number "mm" of mutations, i.e., is equal to the number "mm" of mutations, the mutation loop is exited. Thus, the process returns to step S64 in FIG. 41 and proceeds to step S65.

Each time the processing in steps S152 to S154, which form the mutation loop, is executed once, one feature extraction expression to be included in the next-generation feature-extraction-expression list is generated. When the mutation loop is completed, mm feature extraction expressions of the feature extraction expressions included in the feature-extraction-expression list are generated.

In such processing, feature extraction expressions in the current-generation feature-extraction-expression list are selected from the current-generation feature-extraction-expression list while a weight is being assigned so as to facilitate selection of a feature extraction expression having a higher-evaluation value, and the selected feature extraction expression is used to perform mutation generation processing to generate a feature extraction expression to be included in the next-generation feature-extraction-expression list.

The random generation processing executed in step S65 shown in FIG. 41 will be described next with reference to a flowchart shown in FIG. 45.

In step S181, the feature-extraction-expression list generating section 32 initializes a random generation loop parameter MR to 1 and starts a random generation loop. The random generation loop is repeated a number of times corresponding to the number "mr" of feature extraction expressions included in the feature-extraction-expression list.

In step S182, the feature-extraction-expression list generating section 32 determines a type of an input signal of the MRth feature extraction expression (hereinafter, also referred to as "feature extraction expression [MR]"). In the present embodiment, it is determined that the type of the input signal is "wav" representing a waveform.

In step S183, the feature-extraction-expression list generating section 32 randomly determines a processing-target axis and one operator for the feature extraction expression [MR] to be generated.

In step S184, the feature-extraction-expression list generating section 32 determines whether or not a computation result of the feature-extraction expression [MR] that has been generated up to the current point in time is a scalar quantity (a first order value). When it is determined in step S184 that the computation result is not a scalar quantity, the process returns to step S183 and the processing subsequent thereto is repeated, so that one operator is added.

When it is determined in step S184 that the computation result is a scalar quantity, the process proceeds to step S185 in which the feature-extraction-expression list generating section 32 determines whether or not the random generation loop parameter MR is smaller than the maximum value mr. When it is determined in step S185 that the random generation loop parameter MR is smaller than the maximum value mr, the random generation loop parameter MR is incremented by 1. The process then returns to step S182 and the processing subsequent thereto is repeated. On the other hand, when it is determined in step S185 that the random generation loop parameter MR is not smaller than the maximum value mr (i.e., is equal to the maximum value mr), the random generation loop is exited. The process then returns to step S65 in FIG. 41, further returns to step S23 in FIG. 39, and proceeds to step S24.

Each time the processing in steps S182 to S185, which form the random generation loop, is executed once, one feature extraction expression to be included in the next-generation feature-extraction-expression list is generated. When the random generation loop is completed, mr feature extraction expressions of the feature extraction expressions included in the feature-extraction-expression list are generated.

In such processing, some of the feature extraction expressions to be included in the next-generation feature-extracting-feature list are generated through the random generation processing.

Figure 46:
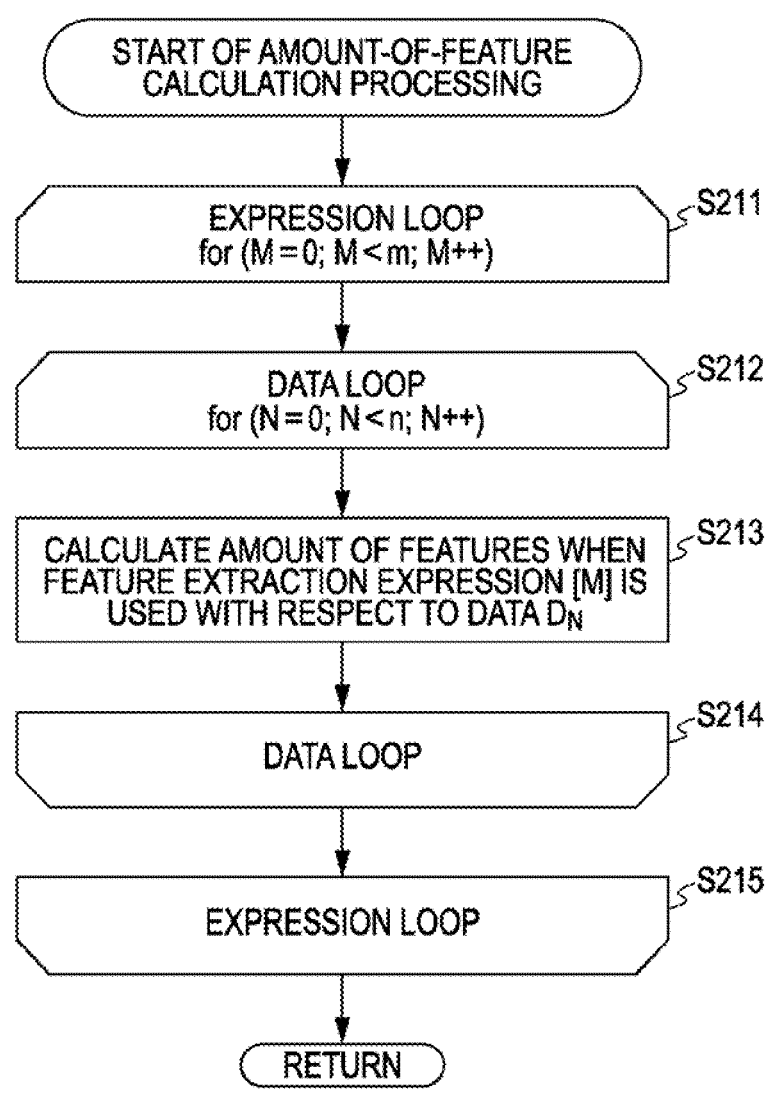
FIG. 46 is a flowchart illustrating amount-of-feature calculation processing.

The amount-of-feature calculation processing executed in step S3 shown in FIG. 38 will be described next with reference to a flowchart shown in FIG. 46.

In step S211, the amount-of-feature calculating section 33 obtains the feature-extraction-expression list from the feature-extraction-expression list generating section 32, initializes an expression loop parameter M to 1, and starts an expression loop. The expression loop is repeated a number of times corresponding to the number "m" of feature extraction expressions included in the feature-extraction-expression list.

In step S212, the amount-of-feature calculating section 33 initializes a data loop parameter N to 1 and starts a data loop. The data loop is repeated a number of times corresponding to the number "n" of pieces of data D cut out by the learning-data cutout section 31.

In step S213, with respect to data $D_N$, the amount-of-feature calculating section 33 calculates an amount of features when the Mth feature extraction expression (the feature extraction expression [M]) is used.

In step S214, the amount-of-feature calculating section 33 determines whether or not the data loop parameter N is smaller than a maximum value n. When it is determined in step S214 that the data loop parameter N is smaller than the maximum value n, the data loop parameter N is incremented by 1. The process then returns to step S213 and the processing subsequent thereto is repeated.

On the other hand, when it is determined in step S214 that the data loop parameter N is not smaller than the maximum value n, (i.e., is equal to the maximum value n), the data loop is exited and the process proceeds to step S215.

In step S215, the amount-of-feature calculating section 33 determines whether or not the expression loop parameter M is smaller than the maximum value m. When it is determined in step S215 that the expression loop parameter M is smaller than the maximum value m, the expression loop parameter M is incremented by 1. The process then returns to step S212 and the processing subsequent thereto is repeated. On the other hand, when it is determined in step S215 that the expression loop parameter M is not smaller than the maximum value m (i.e., is equal to the maximum value m), the expression loop is exited. The process then returns to step S3 in FIG. 38 and proceeds to step S4.

As a result of the above-described processing, the amount of features extracted using each feature extraction expression is calculated.

Figure 47:
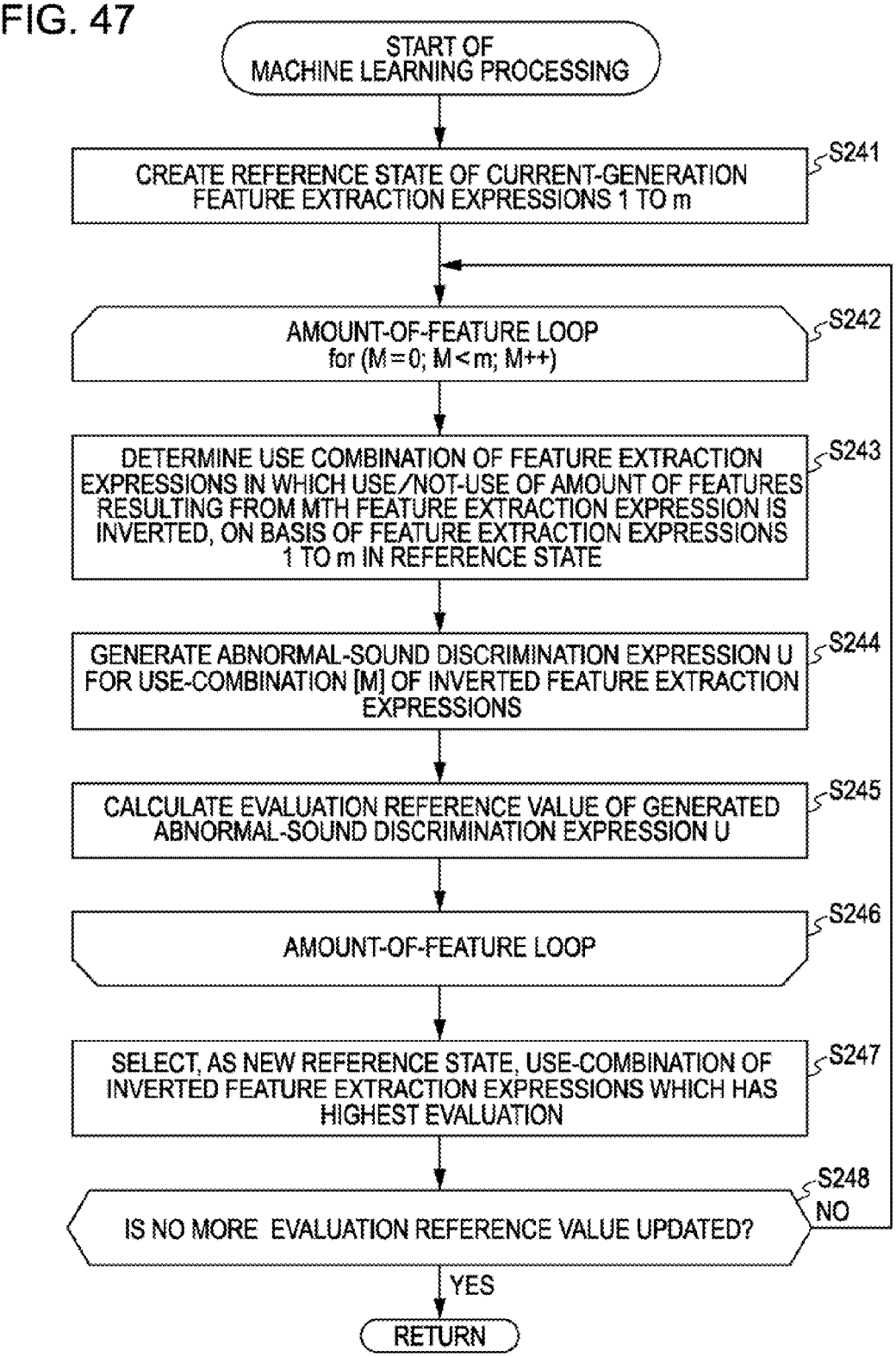
FIG. 47 is a flowchart illustrating machine learning processing.

The machine learning processing executed in step S4 shown in FIG. 38 will be described next with reference to a flowchart shown in FIG. 47.

In step S241, the machine learning section 34 creates a reference state of the current-generation feature extraction expressions 1 to m. That is, the machine learning section 34 sets all current-generation feature extraction expressions 1 to m to so that they are not used.

In step S242, the machine learning section 34 initializes an amount-of-feature loop parameter M to 1 and starts an amount-of-feature loop. The amount-of-feature loop is repeated a number of times corresponding to the number "m" of feature extraction expressions included in the feature-extraction-expression list.

In step S243, on the basis of the feature extraction expressions 1 to m in the reference state, the machine learning section 34 determines a use combination of feature extraction expressions in which use/not-use of the amount of features resulting from the Mth feature extraction expression is inverted (the use combination may also be referred to as the "use combination [M] of the feature extraction expressions, hereinafter).

In step S244, the machine learning section 34 generates (estimates) an abnormal-sound discrimination expression U for the use combination [M] of the inverted feature extraction expressions.

In step S245, the machine learning section 34 calculates an evaluation reference value (AIC) of the generated abnormal-sound discrimination expression U.

In step S246, the machine learning section 34 determines whether or not the amount-of-feature loop parameter M is smaller than the maximum value m. When it is determined in step S246 that the amount-of-feature loop parameter M is smaller than the maximum value m, the amount-of-feature loop parameter M is incremented by 1. The process then returns to step S243 and the processing subsequent thereto is repeated. On the other hand, when it is determined in step S246 that the amount-of-feature loop parameter M is not smaller than the maximum value m, (i.e., is equal to the maximum value m), the amount-of-feature loop is exited and the process proceeds to step S247.

In step S247, the machine learning section 34 selects, as a new reference state, a use combination of inverted feature extraction expressions which has a highest evaluation (i.e., which has a smallest evaluation reference value).

In step S248, the machine learning section 34 determines whether or not no more evaluation reference value of the generated abnormal-sound discrimination expression U is updated. When it is determined in step S248 that the evaluation reference value is still updated, the process returns to step S242 and the processing subsequent thereto is repeated.

Figure 38:
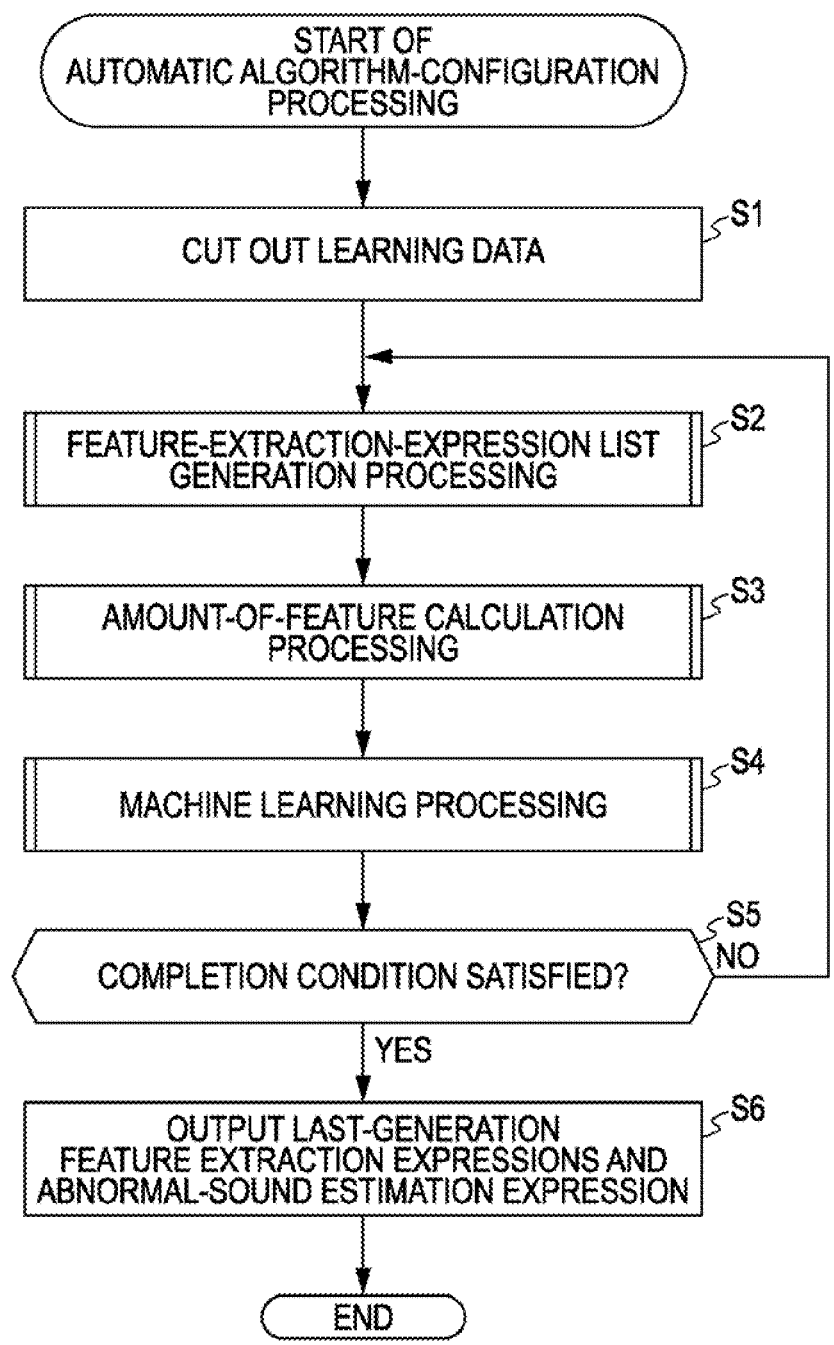
FIG. 38 is a flowchart illustrating automatic algorithm-configuration processing.

On the other hand, when it is determined in step S248 that the no more evaluation reference value is updated, the process returns step S4 shown in FIG. 38 and proceeds to step S5.

Figure 48:
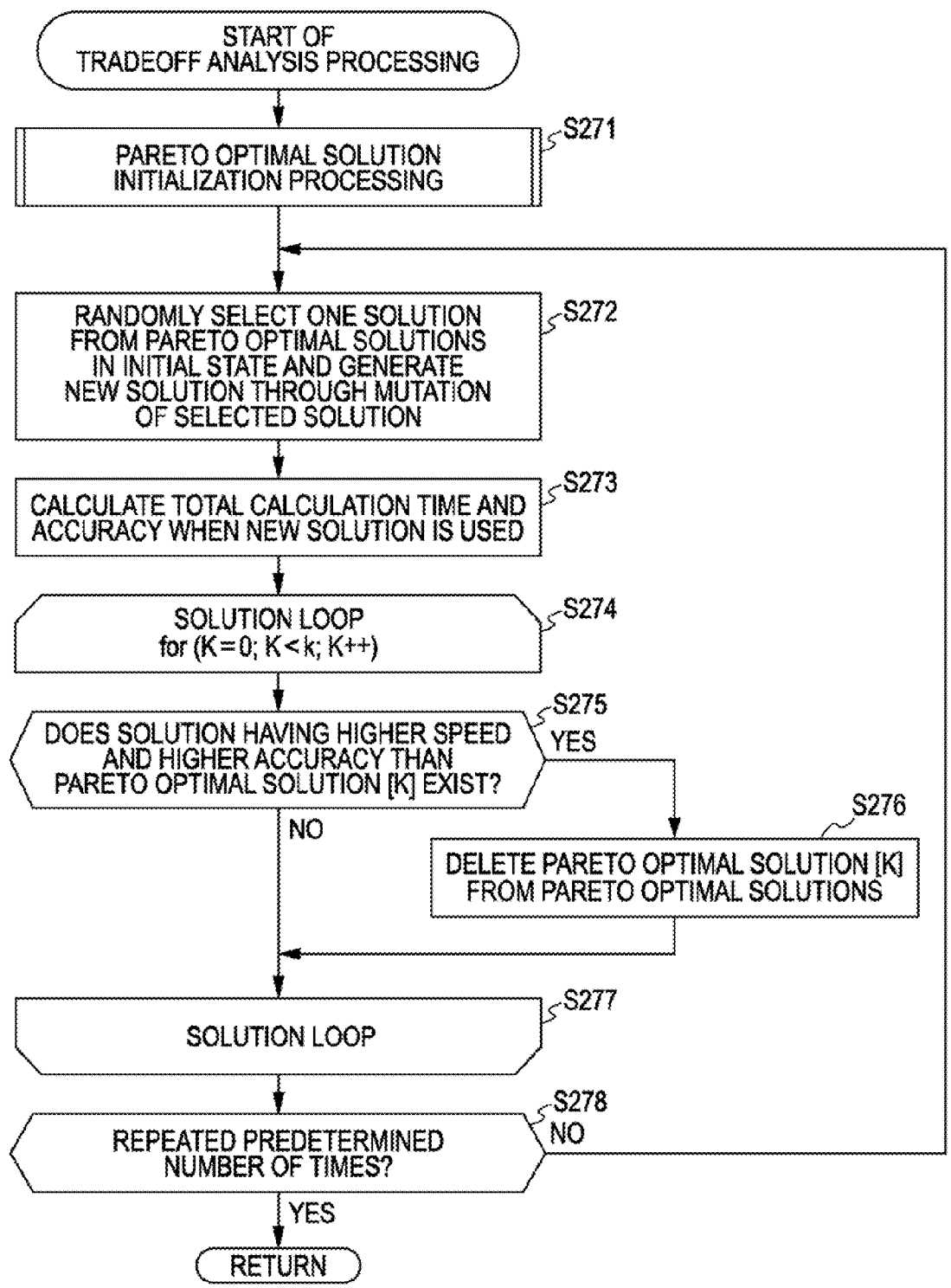
FIG. 48 is a flowchart illustrating tradeoff analysis processing.

The tradeoff analysis processing executed by the tradeoff analyzing section 14 will now be described with reference to a flowchart shown in FIG. 48.

Figure 49:
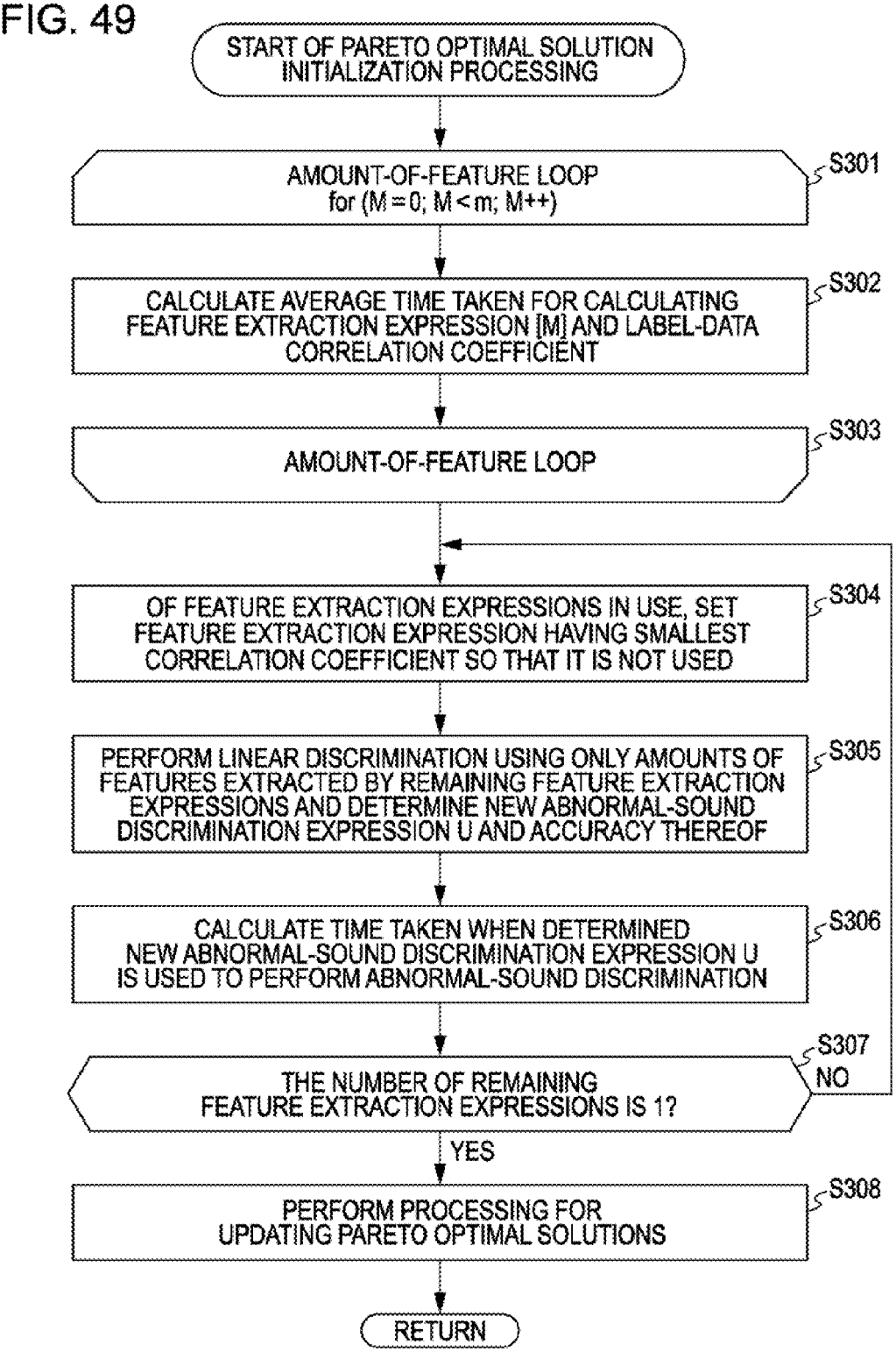
FIG. 49 is a flowchart illustrating Pareto-optimal-solution initialization processing.

In step S271, the tradeoff analyzing section 14 performs Pareto optimal solution initialization processing, which is described below with reference to FIG. 49. In the initialization processing, multiple Pareto optimal solutions in an initial state are generated.

In step S272, the tradeoff analyzing section 14 randomly selects one of the Pareto optimal solutions in the initial state and generates a new solution through mutation of the selected solution. For example, with respect to one to three feature extraction expressions in the selected solution, the tradeoff analyzing section 14 generates a new solution in which use/not-use is randomly changed.

In step S273, the tradeoff analyzing section 14 calculates a total calculation time and an accuracy when the new solution is used.

Subsequently, in steps S274 to S277, the tradeoff analyzing section 14 updates the Pareto optimal solutions. That is, in step S274, the tradeoff analyzing section 14 adds the new solution to the Pareto optimal solutions, initializes a solution loop parameter K to 1, and starts a solution loop. The solution loop is repeated a number of times corresponding to the total number "k" of currently held Pareto optimal solutions.

In step S275, the tradeoff analyzing section 14 determines whether or not a solution having a higher speed and a higher accuracy than the Kth Pareto optimal solution (hereinafter, also referred to as the "Pareto optimal solution [K]") exists. When it is determined in step S275 that a solution having a higher speed and a higher accuracy than the Pareto optimal solution [K] exists, the process proceeds to step S276. In step S276, the tradeoff analyzing section 14 deletes the Pareto optimal solution [K] from the Pareto optimal solutions.

When it is determined in step S275 that no solution having a higher speed and a higher accuracy than the Pareto optimal solution [K] exists, the process proceeds to step S277. In step S277, the tradeoff analyzing section 14 determines whether or not the solution loop parameter K is smaller than a maximum value k. When it is determined in step S277 that the solution loop parameter K is smaller than the maximum value k, the solution loop parameter K is incremented by 1. The process then returns to step S275 and the processing subsequent thereto is repeated.

On the other hand, when it is determined that the solution loop parameter K is not smaller than the maximum value k, (i.e., is equal to the maximum value k), the solution loop is exited and the process proceeds to step S278.

In step S278, the tradeoff analyzing section 14 determines whether or not a Pareto optimal solution is searched for by performing the processing in which a new solution is generated through mutation from the Pareto optimal solutions has been repeated a predetermined number of times. When it is determined in step S278 that the processing in which a Pareto optimal solution is searched for has not been repeated the predetermined number of times, the process returns to step S272 and the processing subsequent thereto is repeated.

On the other hand, when it is determined in step S278 that the processing in which a Pareto optimal solution is searched for has been repeated the predetermined number of times, the processing ends.

The Pareto-optimal-solution initialization processing executed in step S271 shown in FIG. 48 will be described next with reference to a flowchart shown in FIG. 49.

In step S301, the tradeoff analyzing section 14 initializes an amount-of-feature loop parameter M to 1 and starts an amount-of-feature loop. The amount-of-feature loop is repeated a number of times corresponding to the number "m" of feature extraction expressions included in the feature-extraction-expression list.

In step S302, the tradeoff analyzing section 14 calculates an average time (average calculation time) taken for calculating the Mth feature extraction expression (hereinafter, may also be referred to as "feature extraction expression [M]") and label-data correlation coefficient.

In step S303, the tradeoff analyzing section 14 determines whether or not the amount-of-feature loop parameter M is smaller than the maximum value m. When it is determined in step S303 that the amount-of-feature loop parameter M is smaller than the maximum value m, the amount-of-feature loop parameter M is incremented by 1. The process then returns to step S302 and the processing subsequent thereto is repeated. On the other hand, when it is determined in step S303 that the amount-of-feature loop parameter M is not smaller than the maximum value m, (i.e., is equal to the maximum value m), the amount-of-feature loop is exited and the process proceeds to step S304.

In step S304, the tradeoff analyzing section 14 sets, of the feature extraction expressions in use, a feature extraction expression having a smallest correlation coefficient so that the feature extraction expression is not used.

In step S305, the tradeoff analyzing section 14 performs linear discrimination using only the amounts of features extracted by the remaining feature extraction expressions, except the feature extraction expression set as not being used, and determines a new abnormal-sound discrimination expression U. In step S305, the tradeoff analyzing section 14 also calculates an accuracy when the determined new abnormal-sound discrimination expression U is used to perform abnormal-sound discrimination.

In step S306, the tradeoff analyzing section 14 calculates a time (a total calculation time) taken when the determined new abnormal-sound discrimination expression U is used to perform abnormal-sound discrimination, and adds the determined total calculation time to a list of Pareto optimal solution candidates.

In step S307, the tradeoff analyzing section 14 determines whether or not the number of remaining feature extraction expressions is one. When it is determined in step S307 that the number of remaining feature extraction expressions is not one, the process returns to step S304 and the processing subsequent thereto is repeated.

On the other hand, when it is determined that the number of remaining feature extraction expressions is one, the process proceeds to step S308 in which the tradeoff analyzing section 14 performs processing for updating the Pareto optimal solutions. This Pareto-optimal-solution update processing is analogous to the processing in steps S274 to S277 described above and shown in FIG. 48, and thus descriptions thereof are not given hereinafter. After step S308, the process returns to step S271 in FIG. 48 and proceeds to step S272.

As described above, after the Pareto solution solutions are initialized, more appropriate Pareto optimal solutions are searched for, so that update is performed.

On the basis of information such as the currently available resource state and requested performance of the information processing apparatus 1, the use-algorithm determining section 16 determines an optimum algorithm out of the algorithms (the abnormal-sound discrimination expressions U) serving as Pareto optimal solutions determined by the above-described tradeoff analysis processing and stored in the Pareto-optimal-solution storage section 15. The use-algorithm determining section 16 then supplies the determined optimum algorithm to the automatic abnormal-sound-discrimination section 18. On the basis of the algorithm supplied from the use-algorithm determining section 16, the automatic abnormal-sound-discrimination section 18 discriminates whether the input new signal has an abnormal sound or a normal sound.

Thus, the information processing apparatus 1 can present multiple algorithms having a tradeoff relationship in evaluation indices, such as the available resource status (processing speed) and the requested performance (accuracy). Depending on the current situation, the information processing apparatus 1 can also determine an optimal one of the algorithms having a tradeoff relationship in the evaluation indices and can perform discrimination using the determined algorithm.

Other embodiments using the concept of the above-described Pareto optimal solutions will now be described.

Figure 50:
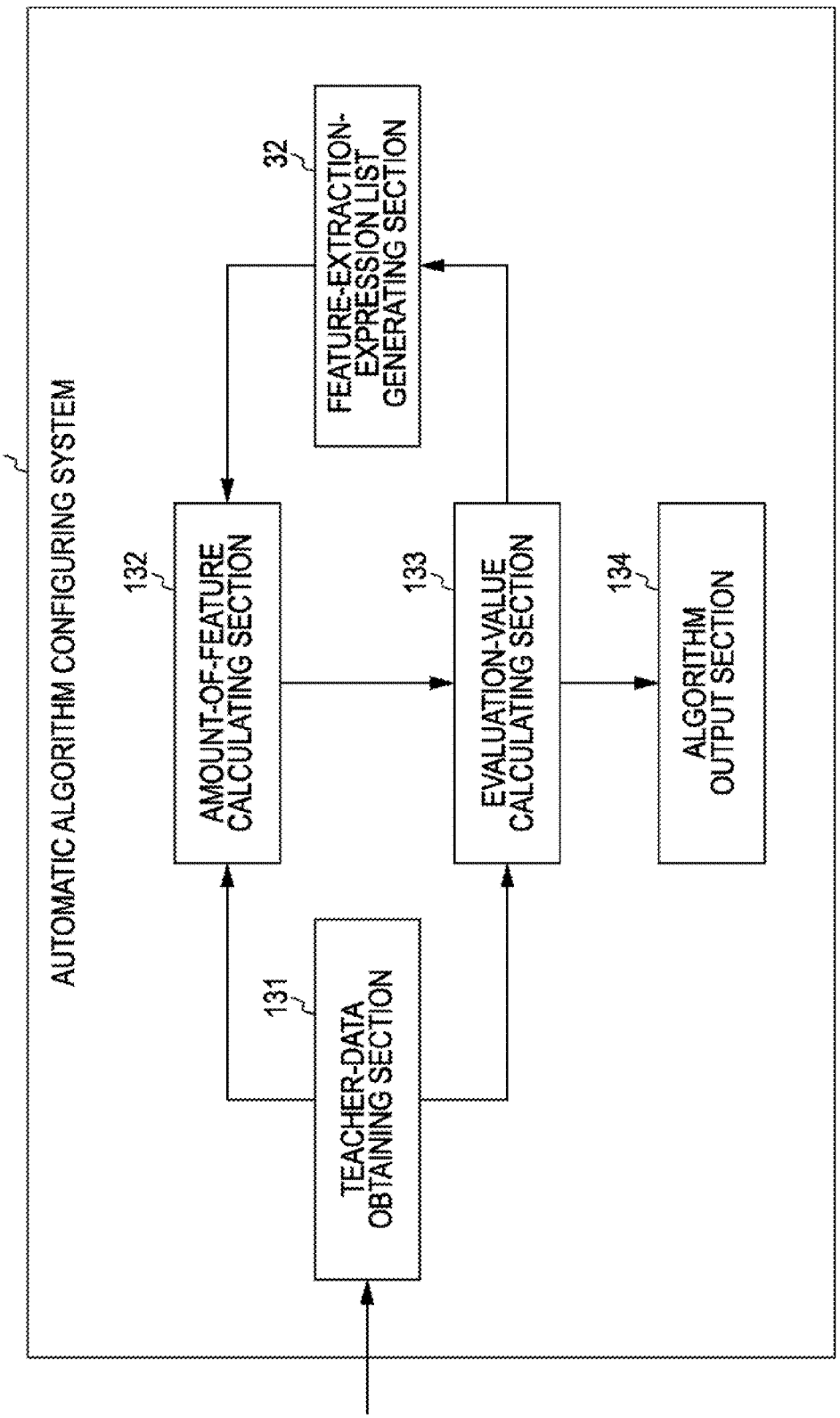
FIG. 50 is a block diagram showing an automatic algorithm-configuring system according to another embodiment of the present invention.

FIG. 50 is a block diagram showing an automatic algorithm-configuring system 101 according to another embodiment of the present invention. Sections corresponding to those in the above-described embodiment are denoted by the same reference numerals, and descriptions thereof are not given.

The automatic algorithm-configuring system 101 includes a teacher-data obtaining section 131, a feature-extraction-expression list Generating section 32, an amount-of-feature calculating section 132, an evaluation-value calculating section 133, and an algorithm output section 134.

The teacher-data obtaining section 131 obtains waveform signals (waveform data) input as teacher data and the values of target variables to be extracted from the data, supplies the waveform signals to the amount-of-feature calculating section 132, and also supplies the values of the target variables of the waveform signals to the evaluation-value calculating section 133.

For example, as shown in FIG. 51, the teacher-data obtaining section 131 obtains I pieces of waveform data $DD_1$ to $DD_1$ and the values of the target variables thereof as teacher data, and supplies the waveform data $DD_1$ to $DD_1$ and the values of the target variables to the amount-of-feature calculating section 132 and the evaluation-value calculating section 133, respectively.

The amount-of-feature calculating section 132 performs calculation of the feature extraction expressions 1 to m, supplied from the feature-extraction-expression list generating section 32, with respect to the waveform data $DD_1$ to $DD_1$ supplied from the teacher-data obtaining section 131. The amount-of-feature calculating section 132 then supplies calculation results, i.e., the amounts of features of the waveform data $DD_1$ to $DD_1$, to the evaluation-value calculating section 133.

The amount-of-feature calculating section 132 calculates an average time taken for calculating each feature extraction expression and supplies the calculated average time to the evaluation-value calculating section 133.

FIG. 52 shows an example of the amounts of features and the average times which are calculated by the amount-of-feature calculating section 132 and supplied to the evaluation-value calculating section 133.

The evaluation-value calculating section 133 generates solution candidates, i.e., candidates of the Pareto optimal solutions.

First, the evaluation-value calculating section 133 randomly determines whether or not to use each of the amounts of features resulting from the feature extraction expressions 1 to m. When one or more Pareto optimal solutions are already held, the evaluation-value calculating section 133 can determine whether or not to use the amount of features resulting from each of the feature extraction expressions 1 to m by randomly selecting one solution from the held Pareto optimal solutions and causing mutation of the selected solution (by changing use/not-use of an arbitrary feature extraction expression).

FIG. 53A shows an example in which the use/not-use of the amount of features of each of feature extraction expressions 1 to m is randomly determined, and FIG. 53B shows an example in which the use/not-use of the amount of features resulting from each of the feature extraction expressions 1 to m is determined by causing mutation of a solution selected from the Pareto optimal solutions.

Figure 54:
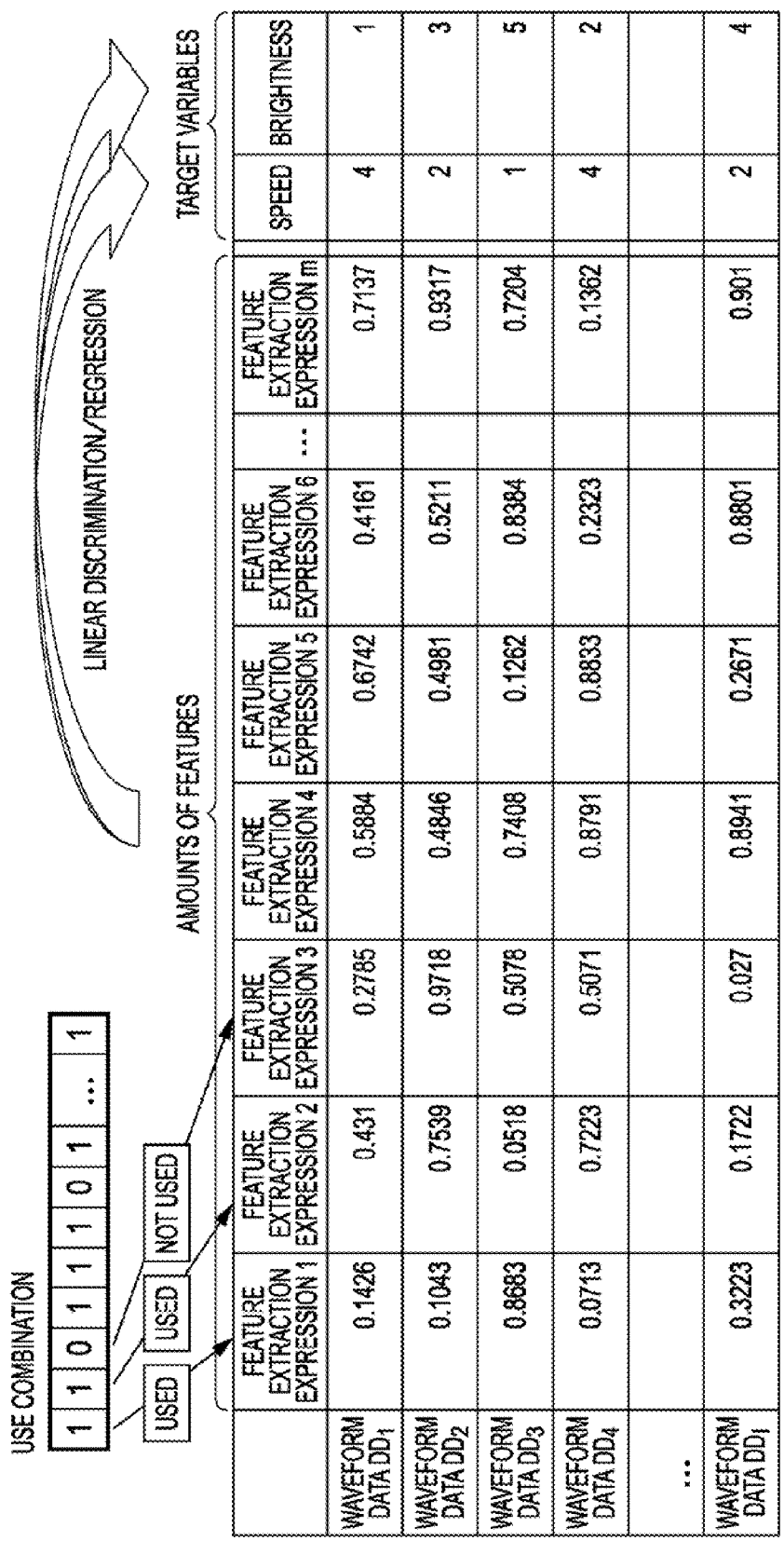
FIG. 54 shows examples of calculated amounts of features.

Next, the evaluation-value calculating section 133 generates (estimates) an information estimation expression (which is a solution candidate) based on a use combination of the determined m feature extraction expressions. That is, as shown in FIG. 54, the evaluation-value calculating section 133 associates the amounts of the features of the waveform data $DD_1$ to $DD_1$ with the target variables, the amounts of features and the target variables being supplied from the amount-of-feature calculating section 132, and assigns the associated values to an information estimation expression that is similar to expression (1) to determine linear combination coefficients $b_1$ to $b_m$ and intercept $b_0$ so that the squared error of estimated errors of each target variable becomes the smallest. The information estimation expressions are created with respect to both target variables of the speed and brightness.

Subsequently, using expression (2), the evaluation-value calculating section 133 calculates, for each target variable, an evaluation reference value (an amount-of-quantity reference) for evaluating the generated information estimation expression.

The evaluation-value calculating section 133 also calculates a total calculation time taken when the generated information estimation expression is used to calculate the target variable. More specifically, as shown in FIG. 55, of the average times taken for computation of the feature extraction expressions, the average times being supplied from the amount-of-feature calculating section 132, the sum of times excluding the average time of a feature extraction expression that is not used is the total calculation time of the generated information estimation expression. In the example shown in FIG. 55, since the feature extraction expression 3 is not used, the average time (0.3 ms) of the feature extraction expression 3 is not included in the total calculation time.

FIG. 56 shows a speed evaluation reference value, a brightness evaluation reference value, and a total calculation time, which are obtained by performing calculation on an information estimation expression that is a solution candidate.

Next, the evaluation-value calculating section 133 compares the speed evaluation reference value, the brightness evaluation reference value, and the total calculation time of the solution candidate with a speed evaluation reference value, a brightness evaluation reference value, and a total calculation time of a currently held Pareto optimal solution, and deletes a non-Pareto optimal solution.

FIG. 57 shows an example in which the solution candidate is compared with p Pareto optimal solutions that are currently held.

In the example shown in FIG. 57, the Pareto optimal solution 3 is inferior to the solution candidate in all evaluation indices of the speed evaluation reference value, the brightness evaluation reference value, and the total calculation time, and is thus deleted from the Pareto optimal solutions as a non-Pareto optimal solution.

For each Pareto optimal solution or solution candidate, the evaluation-value calculating section 133 holds information indicating use/not-use of each feature extraction expression, parameters (the linear combination coefficients $b_1$ to $b_m$ and the intercept $b_0$) of the information estimation expression for each target variable (information type), an evaluation reference value for each target variable (information type), and a total calculation time.

Next, by using the remaining Pareto optimal solutions, the evaluation-value calculating section 133 determines evaluation values of the feature extraction expressions. The basic concept of determining evaluation values of the feature extraction expressions is similar to that in the embodiment described above. In the present embodiment, specifically, since multiple target variables (information types) and multiple Pareto optimal solutions (information estimation expressions) exist, the evaluation-value calculating section 133 determines a value obtained by summing a contribution rate $C_i$ of the ith amount of features of the Pareto optimal solutions with respect to all target variables (information types).

That is, using a contribution rate $C(o,X_i,T_j)$ of the amount "$X_i$" of features of the Pareto optimal solution o (o=1 to p) with respect to the ith target variable (information type) $T_j$ (j=1 to k), the contribution rate $C_i$ in expression (3) noted above can be rewritten as:

$$C(o,X_i,T_j)=b_{oji} \div \mathrm{StDev}(X_i) \times \mathrm{StDev}(T_j) \times \mathrm{Correl}(X_i,T_j) \qquad (4)$$

The evaluation values of the feature extraction expressions can be calculated from $\mathrm{SUM\_C}_i$ in expression (5) in which the contribution rates $C(o,X_i,T_j)$ are summed with respect to all target variables of all Pareto optimal solutions.

$$\mathrm{SUM\_C}_i = \sum_{o=1}^{p}\sum_{j=1}^{k} C(o, X_i, T_j) \qquad (5)$$

The evaluation-value calculating section 133 calculates the evaluation value $\mathrm{SUM\_C}_i$ (represented by expression (5)) of the feature extraction expressions and supplies a calculation result to the feature-extraction-expression list generating section 32.

When a predetermined condition is reached by performing processing for updating the Pareto optimal solution and calculating the evaluation value of each feature extraction expression a predetermined number of times, the evaluation-value calculating section 133 supplies ultimately remained Pareto optimal solutions to the algorithm output section 134.

The algorithm output section 134 selects an optimum algorithm from the supplied Pareto optimal solutions, depending on whether to place importance on accuracies of speed and brightness or on the requested processing speed (the total calculation time). The algorithm output section 134 then outputs the selected algorithm. Which algorithm is to be selected may be determined in accordance with, for example, a user instruction.

Figure 58:
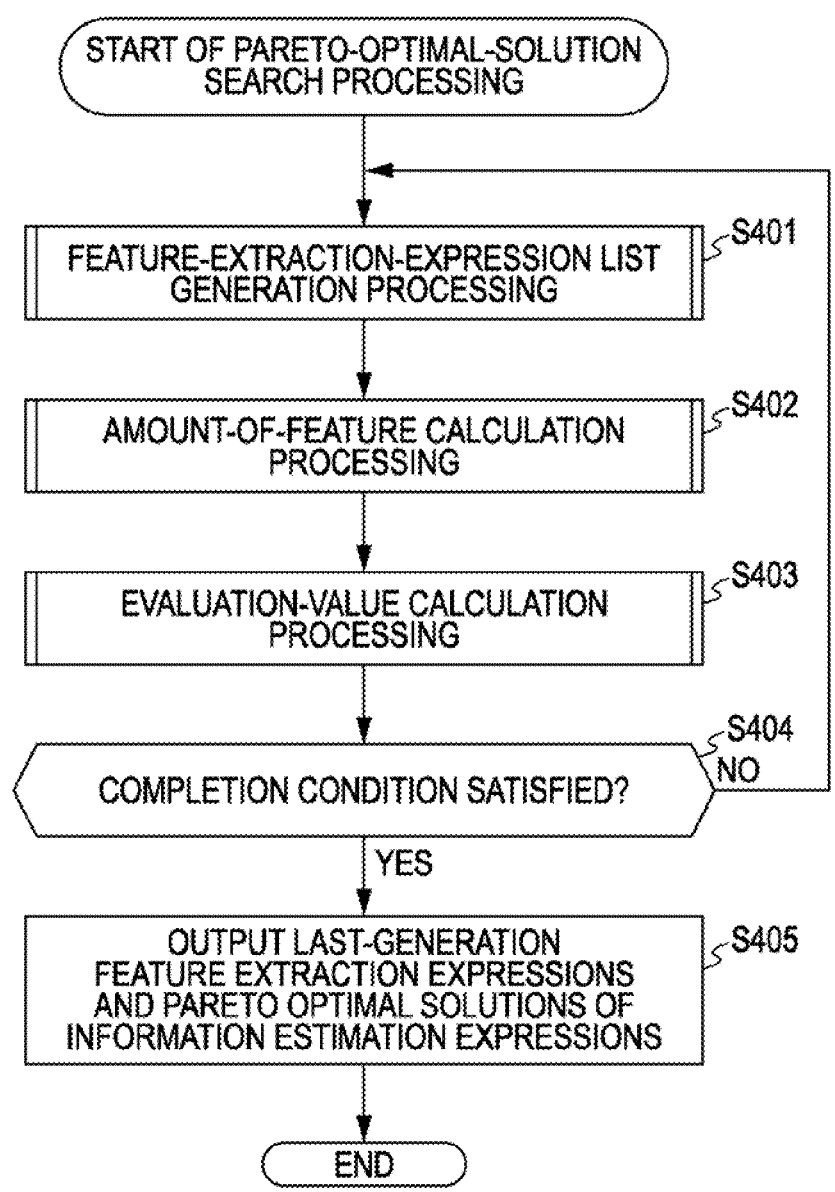
FIG. 58 is a flowchart illustrating Pareto-optimal-solution search processing.

The Pareto optimal solution search processing performed by the feature-extraction-expression list generating section 32, the amount-of-feature calculating section 132, and the evaluation-value calculating section 133 will be described next with reference to a flowchart shown in FIG. 58.

First, in step S401, on the basis of evaluation values of the current-generation feature extraction expressions 1 to m, the evaluation values being supplied from the evaluation-value calculating section 133, the feature-extraction-expression list generating section 32 executes feature-extraction-expression list generation processing for generating next-generation feature extraction expressions 1 to m (a feature-extraction-expression list). This processing is analogous to the processing in step S2 described above and shown in FIG. 38, and thus detailed description thereof is not given hereinbelow.

In step S402, the amount-of-feature calculating section 132 executes amount-of-feature calculation processing. That is, with respect to the waveform data $DD_1$ to $DD_1$ supplied from the teacher-data obtaining section 131, the amount-of-feature calculating section 132 calculates an amount of features resulting from each feature extraction expression and an average time taken for calculating each feature extraction expression. Details of the amount-of-feature calculation processing are described below with reference a flowchart shown in FIG. 59.

In step S403, the evaluation-value calculating section 133 executes evaluation-value calculation processing. That is, the evaluation-value calculating section 133 generates a solution candidate that is a Pareto solution candidate, compares the solution candidate with currently held Pareto optimal solutions, performs Pareto-optimal-solution update involving deletion of a non-Pareto solution, and calculates evaluation values of the feature extraction expressions on the basis of the remaining Pareto optimal solutions. Details of the evaluation-value calculation processing are described below with reference a flowchart shown in FIG. 61.

In step S404, the evaluation-value calculating section 133 determines whether or not a completion condition is satisfied. More specifically, for example, when the processing in step S401 to S403 described above is repeatedly executed a preset number of times or when an operation for stopping is detected, the evaluation-value calculating section 133 determines that the completion condition is satisfied.

When it is determined in step S404 that the completion condition is not satisfied, the process returns to step S401 and the processing subsequent thereto is repeated.

On the other hand, when it is determined in step S404 that the completion condition is satisfied, the process proceeds to step S405. In step S405, the evaluation-value calculating section 133 outputs the last-generation feature extraction expressions and the Pareto optima solutions of the information estimation expressions to the algorithm output section 134, thereby ending the processing.

For example, depending on whether to place importance on accuracies of speed and brightness or on the processing speed (the total calculation time), the algorithm output section 134 selects an optimum algorithm from the Pareto optimal solutions supplied from the evaluation-value calculating section 133, as appropriate. The algorithm output section 134 then outputs the selected algorithm.

Figure 59:
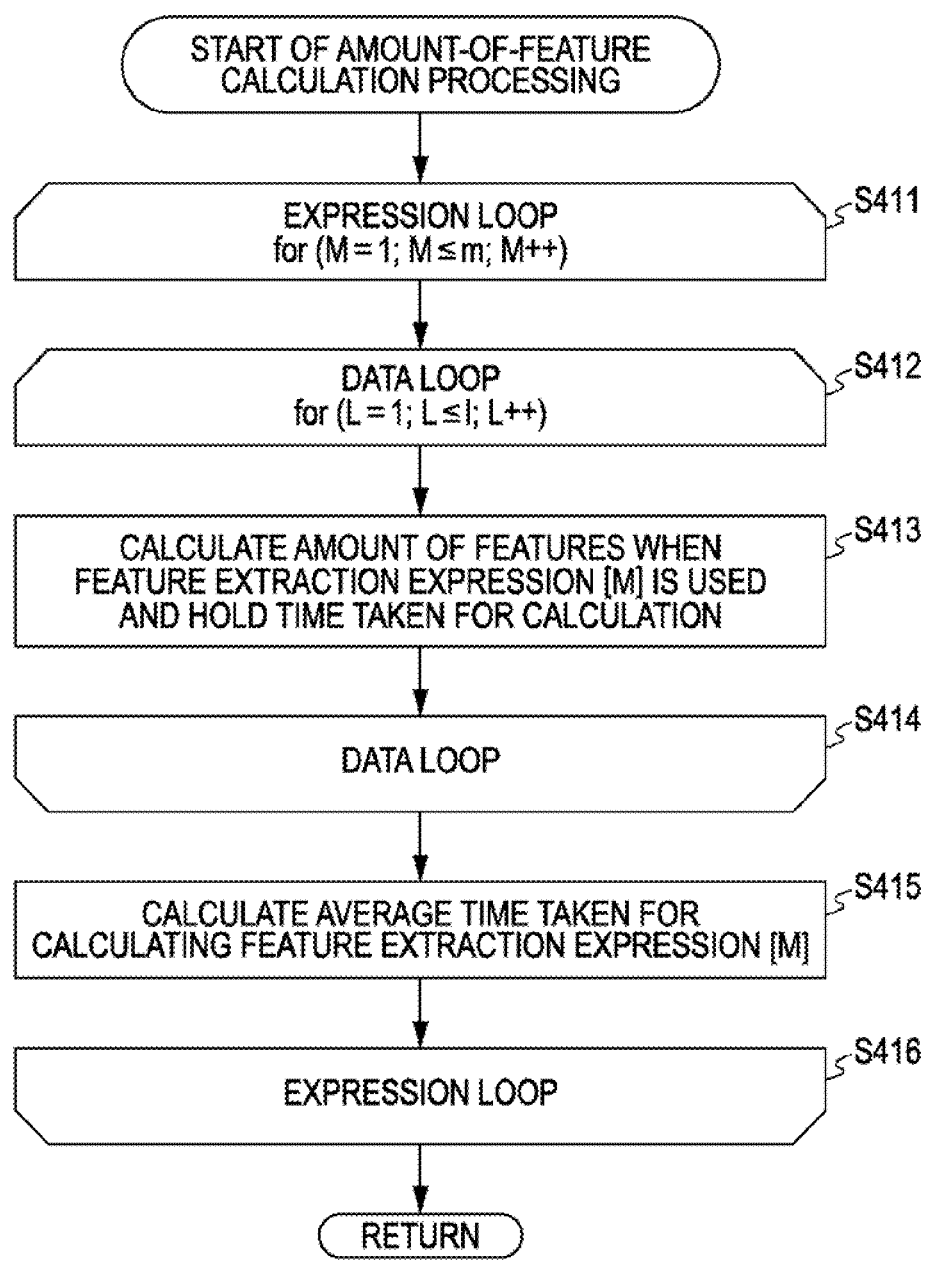
FIG. 59 is a flowchart illustrating amount-of-feature calculation processing.

The amount-of-feature calculation processing executed in step S402 shown in FIG. 58 will be described next with reference to a flowchart shown in FIG. 59.

In step S411, the amount-of-feature calculating section 132 obtains the feature-extraction-expression list from the feature-extraction-expression list generating section 32, initializes an expression loop parameter M to 1, and starts an expression loop. The expression loop is repeated a number of times corresponding to the number "m" of feature extraction expressions included in the feature-extraction-expression list.

In step S412, the amount-of-feature calculating section 132 initializes a data loop parameter L to 1 and starts a data loop. The data loop is repeated a number of times corresponding the number "l" of pieces of the waveform data DD obtained by the teacher-data obtaining section 131.

In step S413, the amount-of-feature calculating section calculates an amount of features when the Mth feature extraction expression (the feature extraction expression [M]) is used with respect to waveform data $DD_L$ and holds a time taken for the calculation.

In step S414, the amount-of-feature calculating section determines whether or not the data loop parameter L is smaller than a maximum value l. When it is determined in step S414 that the data loop parameter L is smaller than the maximum value l, the data loop parameter L is incremented by 1. The process then returns to step S413 and the processing subsequent thereto is repeated.

On the other hand, when it is determined in step S414 that the data loop parameter L is not smaller than the maximum value l, (i.e., is equal to the maximum value l), the data loop is exited and the process proceeds to step S415.

In step S415, the amount-of-feature calculating section calculates an average time taken for calculating the feature extraction expression [M]. That is, the amount-of-feature calculating section 132 calculates an average time of the calculation times of the feature extraction expressions [M] for the waveform data $DD_1$ to $DD_l$, the calculation times being calculated in step S413 and being held.

In step S416, the amount-of-feature calculating section 132 determines whether or not the expression loop parameter M is smaller than a maximum value m. When it is determined in step S416 that the expression loop parameter M is smaller than the maximum value m, the expression loop parameter M is incremented by 1. The process then returns to step S412 and the processing subsequent thereto is repeated. On the other hand, when it is determined in step S416 that the expression loop parameter M is not smaller than the maximum value m (i.e., is equal to the maximum value m), the expression loop is exited. The process then returns to step S402 in FIG. 58 and proceeds to step S403.

The evaluation-value calculation processing executed in step S403 shown in FIG. 58 will be described next with reference to a flowchart shown in FIG. 60.

In step S431, the evaluation-value calculating section 133 determines whether or not to use the amount of features resulting from each of the feature extraction expressions 1 to m. The evaluation-value calculating section 133 can determine whether or not to use the amount of features resulting from each of the feature extraction expressions 1 to m by changing use/not-use of one selection (through mutation of one selection) randomly selected from the held Pareto optimal solutions. However, when the processing in step S431 is performed for the first time, the use/not-use of the amount of features is randomly determined since no Pareto optimal solutions are held.

In step S432, the evaluation-value calculating section 133 initializes a target variable loop parameter K to 1 and starts a data loop. The target variable loop is repeated a number of times corresponding to the number "k" of information types for the target variables.

In step S433, the evaluation-value calculating section 133 generates (estimates) an information estimation expression that serves as a solution candidate and that is used for estimating the amount of information corresponding to the target variable K when the use combination of the m feature extraction expressions determined in step S431 is used.

In step S434, using expression (2) noted above, the evaluation-value calculating section 133 calculates an evaluation reference value for evaluating an information estimation expression for estimating the amount of information corresponding to the target variable K.

In step S435, the evaluation-value calculating section 133 determines whether or not the target variable loop parameter K is smaller than a maximum value k. When it is determined in step S435 that the target-variable loop parameter K is smaller than the maximum value k, the target variable loop parameter K is incremented by 1. The process then returns to step S433 and the processing subsequent thereto is repeated.

On the other hand, when it is determined in step S435 that the target variable loop parameter K is not smaller than the maximum value k, (i.e., is equal to the maximum value k), the target variable loop is exited and the process proceeds to step S436.

In step S436, on the basis of the average time of each feature extraction expression supplied from the amount-of-feature calculating section 132, the evaluation-value calculating section 133 calculates a total calculation time taken when the generated information estimation expression is used to calculate the target variable.

In steps S437 to S440, the evaluation-value calculating section 133 updates the Pareto optimal solutions. That is, in step S437, the evaluation-value calculating section 133 adds the solution candidate to the Pareto optimal solutions, initializes a solution loop parameter o to 1, and starts a solution loop. The solution loop is repeated a number of times corresponding to the total number "p" of currently held Pareto optimal solutions including the solution candidate(s).

In step S438, the evaluation-value calculating section 133 determines whether or not a solution having a higher speed and a higher accuracy than the oth Pareto optimal solution (hereinafter, also referred to as the "Pareto optimal solution [o]") exists. When it is determined in step S438 that a solution having a higher speed and a higher accuracy than the Pareto optimal resolution [o] exists, the process proceeds to step S439. In step S439, the evaluation-value calculating section 133 deletes the Pareto optimal solution [o] from the Pareto optimal solutions.

On the other hand, when it is determined in step S438 that no solution having a higher speed and a higher accuracy than the Pareto optimal resolution [o] exists, the process proceeds to step S440. In step S440, the evaluation-value calculating section 133 determines whether or not the solution loop parameter o is smaller than a maximum value p. When it is determined in step S438 that the solution loop parameter o is smaller than the maximum value p, the solution loop parameter o is incremented by 1. The process then returns to step S438 and the processing subsequent thereto is repeated.

On the other hand, when it is determined in step S438 that the solution loop parameter o is not smaller than the maximum value p, (i.e., is equal to the maximum value p), the solution loop is exited and the process proceeds to step S441.

In step S441, the evaluation-value calculating section 133 determines whether or not the processing in which the solution candidate is generated and the Pareto optimal solution is searched for is repeated a predetermined number of times. When it is determined in step S441 that the processing in which the Pareto optimal solution is searched for has not been repeated the predetermined number of times, the process returns to step S431 and the processing subsequent thereto is repeated.

On the other hand, when it is determined in step S441 that the processing in which the Pareto optimal solution is searched for has been repeated the predetermined number of times, the process proceeds to step S442. In step S442, using the remaining Pareto optimal solutions, the evaluation-value calculating section 133 executes evaluation-value determination processing for determining evaluation values of the feature extraction expressions.

Figure 60:
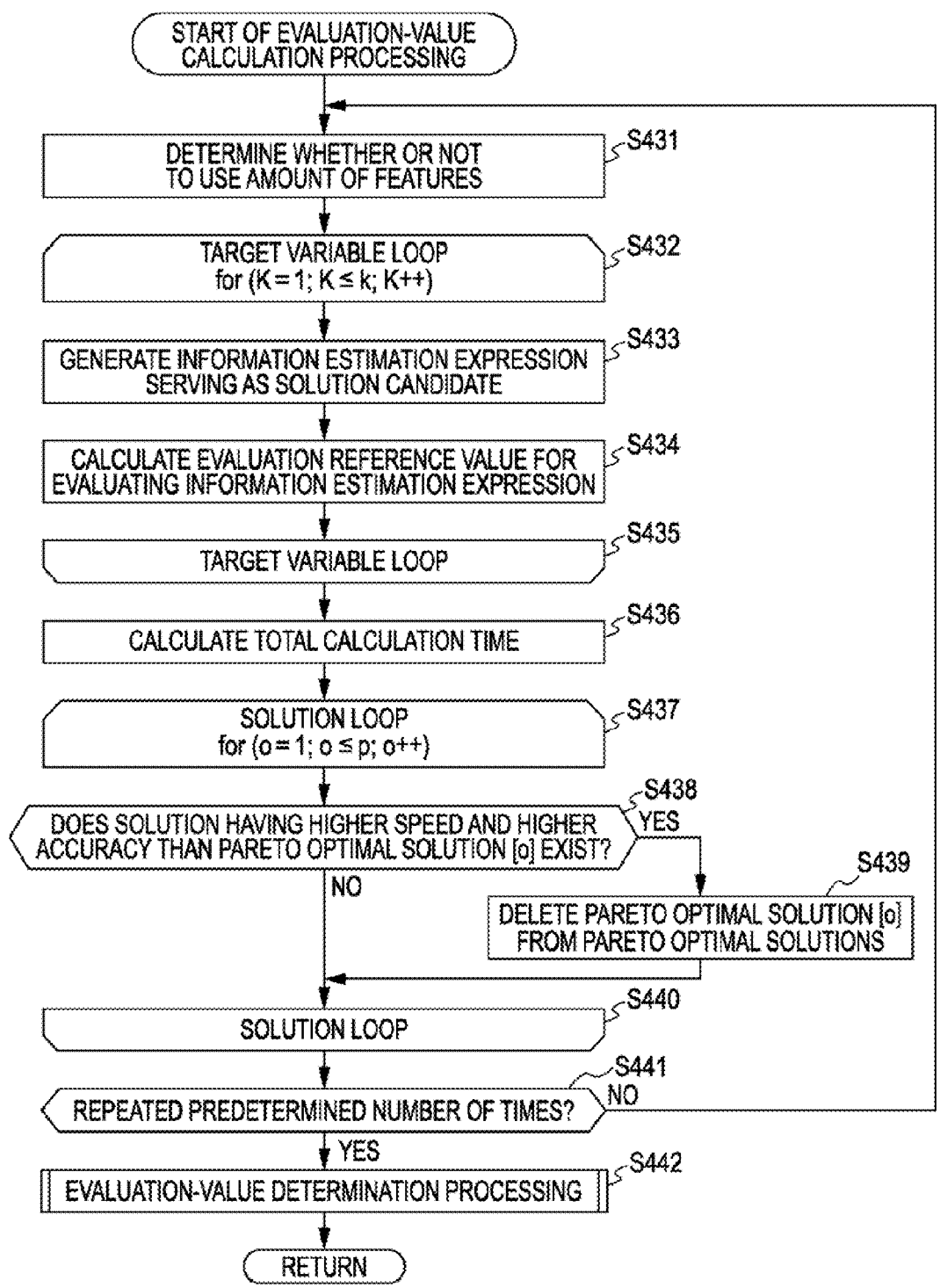
FIG. 60 is a flowchart illustrating evaluation-value calculation processing.
Figure 61:
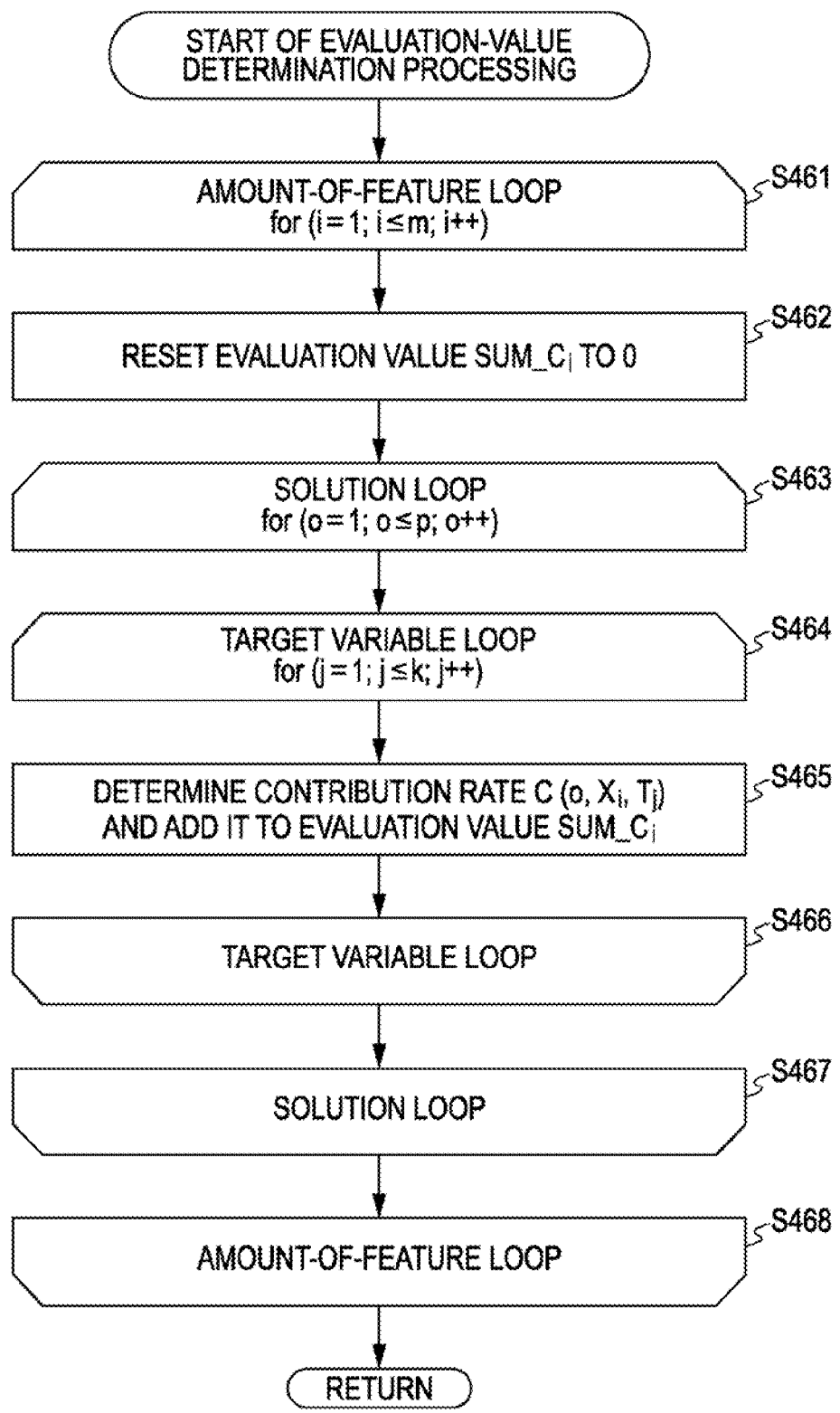
FIG. 61 is a flowchart illustrating evaluation-value determination processing.

FIG. 61 is a flowchart showing details of the evaluation-value determination processing in step S442 shown in FIG. 60.

First, in step S461, the evaluation-value calculating section 133 initializes an amount-of-feature loop parameter i to 1 and starts an amount-of-feature loop. The amount-of-feature loop is repeated a number of times corresponding to the number "m" of feature extraction expressions included in the feature-extraction-expression list.

In step S462, the evaluation-value calculating section 133 resets the evaluation value $SUM\_C_i$ of the ith feature extraction expression, the evaluation value being given by expression (5) noted above.

In step S463, the evaluation-value calculating section initializes a solution loop parameter o to 1 and starts a solution loop. The solution loop is repeated a number of times corresponding to the total number "p" of currently held Pareto optimal solutions.

In step S464, the evaluation-value calculating section initializes a target variable loop parameter j to 1 and starts a target-variable loop. The target variable loop is repeated a number of times corresponding to the number "k" of information types for the target variables.

In step S465, the evaluation-value calculating section determines a contribution rate $C(o, X_i, T_j)$ of the ith amount "$X_i$" of features of the Pareto optimal solution o with respect to the jth target variable $T_j$, and adds the determined contribution rate to the evaluation value $SUM\_C_i$.

In step S466, the evaluation-value calculating section determines whether or not the target variable loop parameter j is smaller than a maximum value k. When it is determined in step S466 that the target-variable loop parameter j is smaller than the maximum value k, the target variable loop parameter j is incremented by 1. The process then returns to step S465 and the processing subsequent thereto is repeated.

On the other hand, when it is determined in step S466 that the target variable loop parameter j is not smaller than the maximum value k, (i.e., is equal to the maximum value k), the target variable loop is exited and the process proceeds to step S467.

In step S467, the evaluation-value calculating section 133 determines whether or not the solution loop parameter o is smaller than a maximum value p. When it is determined in step S467 that the solution loop parameter o is smaller than the maximum value p, the solution loop parameter o is incremented by 1. The process then returns to step S464 and the processing subsequent thereto is repeated.

On the other hand, when it is determined in step S467 that the solution loop parameter o is not smaller than the maximum value p, (i.e., is equal to the maximum value p), the solution loop is exited and the process proceeds to step S468.

In step S468, the evaluation-value calculating section 133 determines whether or not the amount-of-feature loop parameter i is smaller than the maximum value m. When it is determined in step S468 that the amount-of-feature loop parameter i is smaller than the maximum value m, the amount-of-feature loop parameter i is incremented by 1. The process then returns to step S462 and the processing subsequent thereto is repeated.

On the other hand, when it is determined in step S468 that the amount-of-feature loop parameter i is not smaller than the maximum value m (i.e., is equal to the maximum value m), the amount-of-feature loop is exited. The process then returns to step S442 in FIG. 60, further returns to S403 in step FIG. 58, and proceeds to step S404 in FIG. 58.

As described above, the automatic algorithm-configuring system 101 creates, as a Pareto optimal solution in an initial state, a single algorithm by randomly determining use/not-use of the amount of features resulting from each of the extraction expressions 1 to m supplied from the feature-extraction-expression list generating section 32. On the basis of the Pareto optimal solution in the initial state, the automatic algorithm-configuring system 101 creates a solution candidate of a Pareto optimal solution by randomly determining use/not-use of the amount of features resulting from each of the feature extraction expressions 1 to m or by determining use/not-use of the amount of features resulting from each of the feature extraction expressions 1 to m through mutation of one solution randomly selected from held Pareto optimal solutions. The automatic algorithm-configuring system 101 then compares the evaluation reference value and the total calculation time of the solution candidate with the evaluation reference values and the total calculation times of the Pareto optimal solutions held as solution candidates, to thereby determine multiple Pareto optimal solutions in which the degrees of importance to be placed on the accuracies or the processing speeds of the target variables are varied from each other.

With this arrangement, for extraction of the speed and the amount of brightness of an input new signal, the automatic algorithm-configuring system 101 can present multiple information extraction algorithms serving as Pareto optimal solutions in which the degrees of importance to be placed on the accuracies or the processing speeds of the target variables are different from each other. That is, the automatic algorithm-configuring system 101 can present multiple algorithms having a tradeoff relationship in evaluation indices.

The user then can select an optimum algorithm in accordance with the degree of importance of the accuracy or the processing speed of each target index and can obtain an extraction result of the target variable.

In the information processing apparatus 1 shown in FIG. 1, the automatic algorithm-configuring section 13 and the tradeoff analyzing section 14 can be replaced with an information extracting block that includes the teacher-data obtaining section 131, the amount-of-feature calculating section 132, the evaluation-value calculating section 133, and the feature-extraction-expression list generating section 32 provided in the automatic algorithm-configuring system 101. In such a case, the information processing apparatus 1 can be used as an apparatus for performing information extraction processing for extracting a speed and the amount of brightness from an input new signal.

In the automatic algorithm-configuration technology of the related art, only an algorithm for the highest performance (the highest accuracy) is determined. Thus, unlike a case in which an algorithm is manually configured, it is difficult to configure an algorithm that is capable of performing processing with a minimum amount of resource and a desired accuracy while satisfying a request. However, the information processing apparatus 1 and the automatic algorithm-configuring system 101 according to the embodiments of the present invention can generate an algorithm that can perform such processing.

The above-described series of processing can be executed by hardware or software. In such a case, the above-described processing may be executed by a computer 200 as shown in FIG. 62.

Figure 62:
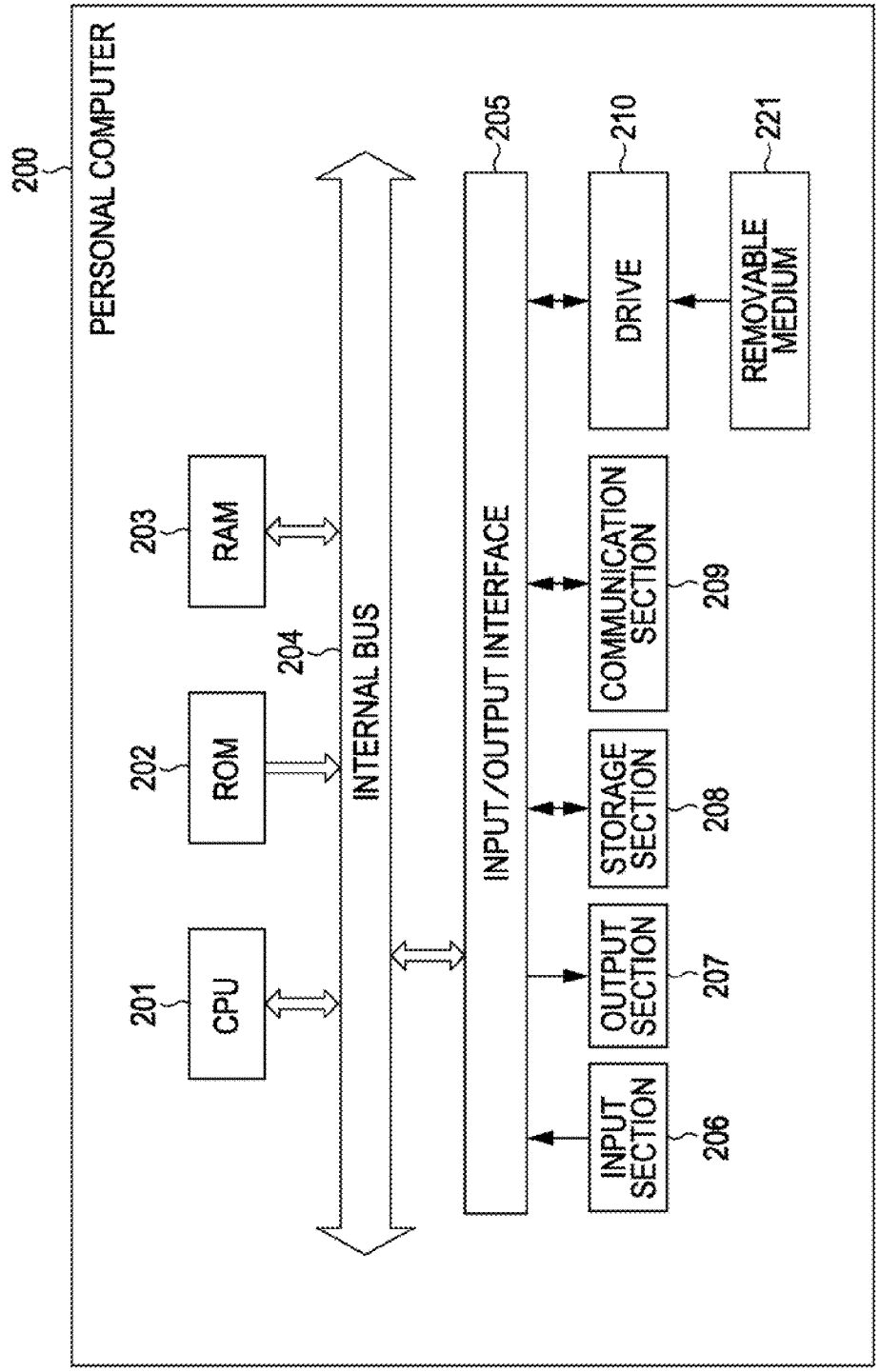
FIG. 62 is a block diagram showing an example of the configuration of a computer according to one embodiment of the present invention.

In FIG. 62, a CPU (central processing unit) 201 executes various types of processing in accordance with a program stored in a ROM (read only memory) 202 or a program loaded from a storage section 208 into a RAM (random access memory) 203. The RAM 203 stores data and so on that are used when the CPU 201 executes various types of processing and so on, as appropriate.

The CPU 201, the ROM 202, and the RAM 203 are interconnected through an internal bus 204. The internal bus 204 is also connected to an input/output interface 205.

An input section 206, an output section 207, the storage section 208, and a communication section 209 are also connected to the input/output interface 205. The input section 206 includes, for example, a keyboard and a mouse. The output section 207 includes, for example, a speaker and a display, such as a CRT (cathode ray tube) display or an LCD (liquid crystal display). The storage section 208 includes, for example, a hard disk. The communication section 209 includes a modem, a terminal adapter, or the like. The communication section 209 performs communication processing through a network including a telephone line or a CATV (cable television) network.

A drive 210 may also be connected to the input/output interface 205, to which a removable medium, such as a magnetic disk, an optical disk, a magneto-optical disk, or a semiconductor memory, is attached as appropriate. A computer program read from the removable medium 221 is installed to the storage section 208, as appropriate.

The program executed by the computer 200 may be a program that time-sequentially performs processing according to the sequence described hereinabove or may be a program that performs processing concurrently or upon call.

Herein, the steps shown in the flowcharts not only include processing that is time-sequentially performed according to the described sequence, but also include processing that is concurrently or individually executed without being necessarily time-sequentially processed.

The present application contains subject matter related to that disclosed in Japanese Priority Patent Application JP 2008-183019 filed in the Japan Patent Office on Jul. 14, 2008, the entire content of which is hereby incorporated by reference.

Embodiments of the present invention are not limited to the above-described embodiments, and various changes can be made thereto without departing from the spirit and scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   an algorithm configuring section that configures an amount-of-feature extraction algorithm that determines whether an input signal has a particular characteristic by using a genetic search technique, the algorithm comprising:
      feature extraction expressions that specify:
         a type of the input signal, the type indicating a type of data representing the input signal; and
         operations to be performed on the input signal; and
      an information estimation expression including a linear combination of the feature extraction expressions, wherein the information estimation expression uses first-order values output from the feature extraction expressions to estimate information indicating features of the input signal;
   a tradeoff analyzing section that generates pareto optimal solutions by selecting information estimation expressions having maximum values of evaluation indices;
   an optimum algorithm determining section that selects, from the pareto optimal solutions, an optimum algorithm that matches a requested condition of the evaluation indices; and
   a storage for storing the algorithm.

2. The information processing apparatus according to claim 1, wherein performing the operations specified by each feature extraction expression on the input signal produces a scalar value.

3. The information processing apparatus according to claim 1, wherein the tradeoff analyzing section generates pareto optimal solutions in an initial state by using algorithms having different numbers of feature extraction expressions, the algorithms being created by deleting the feature extraction expressions one by one from the algorithm configured by the algorithm configuring section.

4. The information processing apparatus according to claim 3, wherein the tradeoff analyzing section updates the pareto optimal solutions by randomly changing use or not-use of each feature extraction expression in the pareto optimal solutions in the initial state.

5. The information processing apparatus according to claim 1, wherein the tradeoff analyzing section uses, as a pareto optimal solution in an initial state, the algorithm configured by the algorithm configuring section.

6. The information processing apparatus according to claim 1, wherein the optimum-algorithm determining section determines, of the pareto optimal solutions, the optimum algorithm on a basis of requested processing time and accuracy.

7. The information processing apparatus according to claim 1, further comprising an evaluation-value calculating section that determines evaluation values of the feature extraction expressions in the information estimation expression, wherein the algorithm configuring section updates the feature extraction expressions in the information estimation expression, on a basis of the determined evaluation values of the feature extraction expressions.

8. The information processing apparatus according to claim 7 wherein when the algorithm configuring section configures multiple information estimation expressions as algorithms, a total value of contribution rates of the same feature extraction expressions in the information estimation expressions is used as the evaluation value of the corresponding feature extraction expression.

9. A computer-implemented information processing method comprising:
    configuring, using a processor, an amount-of-feature extraction algorithm that determines whether an input signal has a particular characteristic by using a genetic search technique, the algorithm comprising:
        feature extraction expressions that specify:
            a type of the input signal, the type indicating a type of data representing the input signal; and
            operations to be performed on the input signal; and
        an information estimation expression including a linear combination of the feature extraction expressions, wherein the information estimation expression uses first-order values output from the feature extraction expressions to estimate information indicating features of the input signal; and
    generating pareto optimal solutions by selecting information estimation expressions having maximum values of evaluation indices; and
    selecting, from the pareto optimal solutions, an optimum algorithm that matches a requested condition of the evaluation indices.

10. The computer-implemented method according to claim 9, wherein optimizing includes generating pareto optimal solutions in an initial state by using algorithms having different numbers of feature extraction expressions, the algorithms being created by deleting the feature extraction expressions one by one from the algorithm.

11. The computer-implemented method according to claim 9, wherein in an initial state, the algorithm configured in the configuring step is used as-as a pareto optimal solution.

12. The computer-implemented method according to claim 9, wherein determining pareto optimal solutions includes updating the pareto optimal solutions by randomly changing use or not-use of each feature extraction expression in the pareto optimal solutions in the initial state.

13. The computer-implemented method according to claim 9, wherein the optimum algorithm is determined on a basis of requested processing time and accuracy.

14. The computer-implemented method according to claim 9, further comprising:
    determining evaluation values of the feature extraction expressions in the information estimation expression, and
    updating the feature extraction expressions in the information estimation expression, on a basis of the determined evaluation values of the feature extraction expressions.

15. The computer-implemented method according to claim 14, wherein in the configuring step, a total value of contribution rates of the same feature extraction expressions in the information estimation expressions is used as the evaluation value of the corresponding feature extraction expression.

16. A non-transitory computer-readable medium storing instructions for causing a computer to execute operations comprising:
    configuring an amount-of-feature extraction algorithm that determines whether an input signal has a particular characteristic by using a genetic search technique, the algorithm comprising:
        feature extraction expressions that specify:
            a type of the input signal, the type indicating a type of data representing the input signal; and
            operations to be performed on the input signal; and
        an information estimation expression including a linear combination of the feature extraction expressions, wherein the information estimation expression uses first-order values output from the feature extraction expressions to estimate information indicating features of the input signal;
    generating pareto optimal solutions by selecting information estimation expressions having maximum values of evaluation indices; and
    selecting, from the pareto optimal solutions, an optimum algorithm that matches a requested condition of the evaluation indices.

* * * * *